US010305829B2

(12) United States Patent
Peruri et al.

(10) Patent No.: US 10,305,829 B2
(45) Date of Patent: May 28, 2019

(54) DATABASE SYSTEMS AND METHODS FOR INTEGRATING DATA ITEMS COLLECTED FROM MULTIPLE DATA SOURCES

(71) Applicant: VoterCircle, Inc., Los Altos, CA (US)

(72) Inventors: Sangeeth Peruri, Los Altos, CA (US); Vivek Katta Vishwanath Prasad, Bangalore (IN)

(73) Assignee: VoterCircle, Inc., Los Altos, CA (US)

( * ) Notice: Subject to any disclaimer, the term of this patent is extended or adjusted under 35 U.S.C. 154(b) by 283 days.

(21) Appl. No.: 15/154,868

(22) Filed: May 13, 2016

(65) Prior Publication Data

US 2016/0337278 A1 Nov. 17, 2016

Related U.S. Application Data

(60) Provisional application No. 62/162,549, filed on May 15, 2015.

(51) Int. Cl.
*G06F 7/00* (2006.01)
*G06F 17/30* (2006.01)
*H04L 12/58* (2006.01)
*G06Q 50/26* (2012.01)
*G06Q 50/00* (2012.01)
*G06F 21/62* (2013.01)
(Continued)

(52) U.S. Cl.
CPC ............ *H04L 51/046* (2013.01); *G06F 16/13* (2019.01); *G06F 16/24* (2019.01); *G06F 16/288* (2019.01);
(Continued)

(58) Field of Classification Search
CPC . H04L 51/046; H04L 51/28; G06F 17/30386; G06F 17/30604;
(Continued)

(56) References Cited

U.S. PATENT DOCUMENTS 7,606,796 B2 * 10/2009 McGeachie ............ G06Q 10/10
7,783,658 B1 * 8/2010 Bayliss ................... G06F 16/35
707/765

(Continued)

*Primary Examiner* — Binh V Ho
(74) *Attorney, Agent, or Firm* — Knobbe, Martens, Olson & Bear, LLP

(57) ABSTRACT

Embodiments of the present disclosure relate to a database system for collecting and integrating electronic data items from multiple data sources. Embodiments of the present disclosure also relate to a database system for determining the relationships between related data items from multiple data sources, so that the related data items may be integrated in a way that protects the privacy of those data items. The system may, for example, identify related data items by matching data items between the multiple data sources according to a pre-defined matching process. The related data items may be selectively integrated and stored across one or more databases. The relationship between the related data items may be preserved by generating associations between the related data items and storing those associations with those data items. This allows related data items to be easily located through the associations, which essentially allows for the grouping of data items to be performed across multiple databases. The associations may also be used to restrict user access to data items that are relevant to the user, which can be used to prevent unauthorized access to certain data items and secures their privacy.

9 Claims, 29 Drawing Sheets

(51) Int. Cl.
*G06F 16/13* (2019.01)
*G06F 16/24* (2019.01)
*G06F 16/28* (2019.01)
*G06F 16/951* (2019.01)

(52) U.S. Cl.
CPC ........ *G06F 16/951* (2019.01); *G06F 21/6227* (2013.01); *G06F 21/6245* (2013.01); *G06Q 50/01* (2013.01); *G06Q 50/26* (2013.01); *H04L 51/28* (2013.01)

(58) Field of Classification Search
CPC ......... G06F 17/30091; G06F 17/30864; G06F 17/6245; G07C 13/00; G06Q 50/26; G06Q 50/01
USPC ........................................................ 707/722
See application file for complete search history.

(56) References Cited

U.S. PATENT DOCUMENTS 9,600,804 B2* 3/2017 Tien .................... G06Q 10/105
2004/0199391 A1* 10/2004 Yoon ....................... G10L 15/26
  704/275
2005/0149527 A1* 7/2005 Berlin .................... G06Q 90/00
2006/0287987 A1* 12/2006 McGeachie ............ G06Q 10/10
2007/0192122 A1* 8/2007 Routson ................. G06Q 30/02
  705/1.1
2007/0288302 A1* 12/2007 Singh ..................... G06Q 10/00
  705/35
2008/0119134 A1* 5/2008 Rao ........................ G06Q 30/02
  455/3.05
2010/0281020 A1* 11/2010 Drubner ................ G06F 16/245
  707/722
2012/0072437 A1* 3/2012 Ouellette ............... G06Q 90/00
  707/758
2012/0143713 A1* 6/2012 Dittus ................ G06Q 30/0251
  705/26.3
2015/0134603 A1* 5/2015 Melamed ............ G06F 11/1453
  707/609
2015/0235199 A1* 8/2015 Lindenberg ........ G06Q 30/0603
  705/7.32
2016/0034467 A1* 2/2016 Churi .................... G06Q 30/02
  707/748

* cited by examiner

Campaign
　Dashboard >
　Settings >
　Voter File >
　Target Criteria >
　Surveys >
　　Info >
Virtual Precinct
　Supporters >
　Assignments >
　Canvassing Stats >
　Message >
　Templates >
Reports
Contacts
　Manage >
　Import >
　Groups >
Events 1804 — Search supporters

1802

1808

Supporters per page  100

1806
× name
× email

② supporters found
clear all   select page
showing 1-2 of 2   (<<)(<)(>)(>>)
　　　　　　　　　　select all
1810

| rank | name | email | precinct |
|------|------|-------|----------|
| 1 | John Johnson | john.johnson@email.com | 361 |
| 2 | Bruce Banner | bruce.banner@email.com | 27 |
| ... | | ... | ... | reset filters choose criteria ▾

| 845 Accepted contacts | 2939 Ambiguous contacts | 159 Low score/Rejected | 2841 Outside contacts | search...

| Name | Email | Age | Location | Accuracy |
|---|---|---|---|---|
| Gary Oldman | gary.oldman@email.com | 48 yrs | Mountain View, CA | 000% |
| Gary Matt Oldman | gary.m.oldman@email.com | 49 yrs | Palo Alto, CA | |
| Gary Lee Oldman | gl.oldman@email | 52 yrs | San Francisco, CA | |
| Tom Jones | tom.jones@email.com | 36 yrs | Los Altos, CA | 000% |
| Tom Lee Jones | tom.l.jones@email.com | 45 yrs | Palo Alto, CA | |
| Tommy Jones | tommy.jones@email.com | 43 yrs | Mountain View, CA | |
| ... | | | | ... | showing 1-100 of 2939

*Fig. 20*

| 845 Accepted contacts | 2939 Ambiguous contacts | 159 Low score/Rejected | 2841 Outside contacts | search...

| Contact name | Voter file name | Contact email | Age | Location | Accuracy |
|---|---|---|---|---|---|
| Claire Matthews | Clarence Matthews | claire.matthews@email.com | 32 yrs | Mountain View, CA | 000 |
| Jamie Nelson | James Todd Nelson | jamie.nelson@email.com | 50 yrs | Palo Alto, CA | 000 |
| ... | | ... | | ... | ... | showing 1-100 of 159 reject | undo reject | group | go to inbox

*Fig. 21*

DATABASE SYSTEMS AND METHODS FOR INTEGRATING DATA ITEMS COLLECTED FROM MULTIPLE DATA SOURCES

CROSS-REFERENCE TO RELATED APPLICATIONS

Any and all applications for which a foreign or domestic priority claim is identified in the Application Data Sheet as filed with the present application are hereby incorporated by reference under 37 CFR 1.57.

This application claims benefit of U.S. Provisional Patent Application No. 62/162,549, filed May 15, 2015, and titled "SYSTEMS FOR EFFECTIVE EMAIL CANVASSING AND LOCAL COMMUNITY-BASED SOCIAL NETWORKING". The entire disclosure of that application is hereby made part of this specification as if set forth fully herein and incorporated by reference for all purposes, for all that it contains.

TECHNICAL FIELD

This disclosure relates generally to data processing, database and file management, and database systems and methods for the collection and integration of electronic data items from various data sources. Embodiments of the present disclosure further relate to the matching of those data items, generating associations between those data items, storing those data items and associations, and determining user access to those data items based on the associations in order to secure the data items for privacy purposes.

BACKGROUND

Electronic databases provide for storage and retrieval of electronic data items. Data items in such databases may be electronically updated. In some scenarios, a system may be configured to access information on multiple data sources. For example, a system may access multiple databases in order to access and retrieve data items stored within those databases for use.

However, some of the data items across those multiple databases may be related, and the operation of the system may involve the integration and use of related data items originating from multiple databases. For example, there may be data items across multiple databases pertaining to the same unique entity. Accordingly, the system may need to identify the data items in each database that relate to that specific unique identity.

To do this, some systems may require the relationships between related data items from different databases to be specified, so that those data items may be properly integrated and used. In some cases, these relationships can be specified in advance. However, in other cases the relationships may not be explicitly known in advance, especially if the databases used are dynamic in nature.

Thus, it may be useful for a system to be able to efficiently match data items from different databases in order to automatically determine any relationships between those data items, so that related data items may be identified and properly integrated for use by the system. It may also be useful for related data items to be integrated in a way that preserves their relationship, especially if those data items are stored by the system in separate databases. Furthermore, for security and privacy purposes it may also be useful for those related data items to be integrated in a way that allows users to only access data items relevant to the user.

SUMMARY OF THE DISCLOSURE

The systems, methods, and devices described herein each have several aspects, no single one of which is solely responsible for its desirable attributes. Without limiting the scope of this disclosure, several non-limiting features will now be discussed briefly.

Embodiments of the present disclosure relate to a database system (also herein referred to as "the system") for accessing and collecting data items from multiple data sources. The system may, for example, access and collect data items from different databases. Some of the databases may be provided by multiple users.

Embodiments of the present disclosure also relate to systems for automatically determining the relationships between related data items from multiple data sources in real-time. The system may, for example, match data items between multiple data sources using a set of search rules. Aspects of the matching process, such as accuracy, may be used to determine related data items across the multiple data sources. A determination of a successful match may be obtained without human intervention, although a human may be able to verify the results of the matching process or reclassify matches.

Embodiments of the present disclosure also relate to systems that implement the matching process in a fast, efficient, and scalable manner in order to process data items and perform matches in a way that cannot be duplicated by a human being. The system may, for example, perform hundreds of matches at a time in order to determine the relationships between hundreds of thousands of related data items in real-time.

Embodiments of the present disclosure also relate to systems that selectively and efficiently integrate related data items from multiple data sources by storing those related data items across one or more databases. For example, the system can store part of the related data items in one database and store the other related data items in another database. The system may preserve the relationship between these related data items stored in different databases, such as by generating associations that are stored with those data items in the different databases. The associations may link together relevant data that is in different databases. This allows related data items to be easily located through the associations, which essentially allows for the grouping of data items to be performed across multiple databases.

Embodiments of the present disclosure also relate to systems that use those associations in order to restrict user access to data items relevant to the user. Related data items can be stored across multiple databases with their relationships preserved by associations. Access to those databases may be user-dependent, so that the related data items can be divided up into multiple databases based on the functionality and users associated with each database. Furthermore, access to data items in other databases that are not associated with the user can be governed by the associations. This can be used to prevent unauthorized access to certain data items and secures their privacy.

In some embodiments, a database computing system is disclosed that comprises a plurality of databases for facilitating transmission of campaign information between a campaign manager and a large plurality of voters via a campaign supporter who has an association with the voters for a given campaign, the system preventing access by the campaign manager to voter communication information for privacy purposes. The system comprises a network interface that is coupled to the internet network for receiving and transmitting one or more packet flows among the components of the system; a population dataset comprising public information about the voters including at least the name of each voter for a given campaign; a plurality of contact datasets, wherein the supporter gives the system access to at least one of the plurality of contact datasets, wherein that contact dataset contains at least one contact comprising data items associated with at least one type of contact information; a plurality of campaign databases, at least one of the campaign databases corresponding to the campaign; a plurality of upgraded contact databases, at least one of the upgraded contact databases corresponding to the supporter; a large plurality of voter computing devices; a plurality of supporter computing devices, wherein at least one of the supporter computing devices is used by the supporter; a campaign manager computing device used by the campaign manager; a database system server comprising at least one computer processor; and a computer readable storage medium storing program instructions configured for execution by the computer processor in order to cause the computing system to: receive, over the network, the contact dataset and a request from the supporter to match the contact in the contact set with the voters for the given campaign; access the contact dataset to retrieve the contact; determine a relationship between the supporter and the contact; receive, over the network, the population dataset; access the population dataset to retrieve the voters; perform a matching process between the contact and the voters from the population dataset without human intervention, the matching process comprising: determining a set of contact information available in the contact, the set of contact information including the at least one type of contact information of the contact; comparing the set of contact information with the public information for the voters in the population dataset to determine a matching voter; and upon determining a matching voter, determining the relationship between the contact and the matching voter; storing in the campaign database for that campaign matching voter information including the matching voter name; assigning the matching voter to a virtual precinct corresponding to the supporter by appending to the stored voter information a supporter identification configured to identify the supporter; storing in the upgraded contact database for the supporter the contact from the contact dataset including the at least one type of contact information; appending to the stored contact in the upgraded contact database a campaign identification configured to identify the given campaign; and preventing access by the campaign manager to the stored contact in the upgraded contact database. The program instructions configured for execution by the computer processor also cause the computing system to: receive a message template from the campaign manager and a request to send a message to at least some of the voters in the virtual precinct of the supporter, wherein the message is sent by the supporter or on behalf of the supporter and not by the campaign manager; generate a message recipient list using the campaign database and the upgraded contact database; transmit the message template and the message recipient list to the supporter; and transmit the message to the voters without human intervention or access by the campaign manager.

In some embodiments, the program instructions configured for execution by the computer processor further cause the computing system to: generate user interface data for displaying a user interface on the supporter computing device used by the supporter, wherein the user interface is configured to allow the supporter to verify the matching voter; and wherein determining the relationship between the contact and the matching voter involves checking that the supporter has verified the matching voter.

In some embodiments, the matching voter may be assigned to more than one virtual precinct, each virtual precinct corresponding to a single supporter.

In some embodiments, the matching voter may only be assigned to virtual precincts in which the corresponding supporter provided a contact used to determine the matching voter in the population dataset.

In some embodiments, the matching process is a real-time, automated matching process.

In some embodiments, the matching process is performed using one or more microservices.

In some embodiments, the program instructions configured for execution by the computer processor further cause the computing system to: send the contact to a persistent subrequest queue; and retrieve the contact from the persistent subrequest queue.

In some embodiments, the program instructions configured for execution by the computer processor further cause the computing system to: pre-process the contact retrieved from the persistent subrequest queue to modify the at least one type of contact information of the contact.

In some embodiments, the program instructions configured for execution by the computer processor further cause the computing system to: send the pre-processed contact to a pre-processed subrequest queue, wherein the pre-processed subrequest queue is distinct from the persistent subrequest queue; and retrieve the pre-processed contact from the pre-processed subrequest queue.

Additional embodiments of the disclosure are described below in reference to the appended claims, which may serve as an additional summary of the disclosure.

In various embodiments, computer systems are disclosed that comprise one or more hardware computer processors in communication with one or more non-transitory computer readable storage devices, wherein the one or more hardware computer processors are configured to execute the plurality of computer executable instructions in order to cause the computer system to operations comprising one or more aspects of the above-described embodiments (including one or more aspects of the appended claims).

In various embodiments, computer-implemented methods are disclosed in which, under control of one or more hardware computing devices configured with specific computer executable instructions, one or more aspects of the above-described embodiments (including one or more aspects of the appended claims) are implemented and/or performed.

In various embodiments, computer readable storage mediums storing software instructions are disclosed, wherein, in response to execution by a computing system having one or more hardware processors, the software instructions configure the computing system to perform operations comprising one or more aspects of the above-described embodiments (including one or more aspects of the appended claims).

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIGS. 11-23 illustrate example user interfaces of one embodiment of the system.

Figure 1:
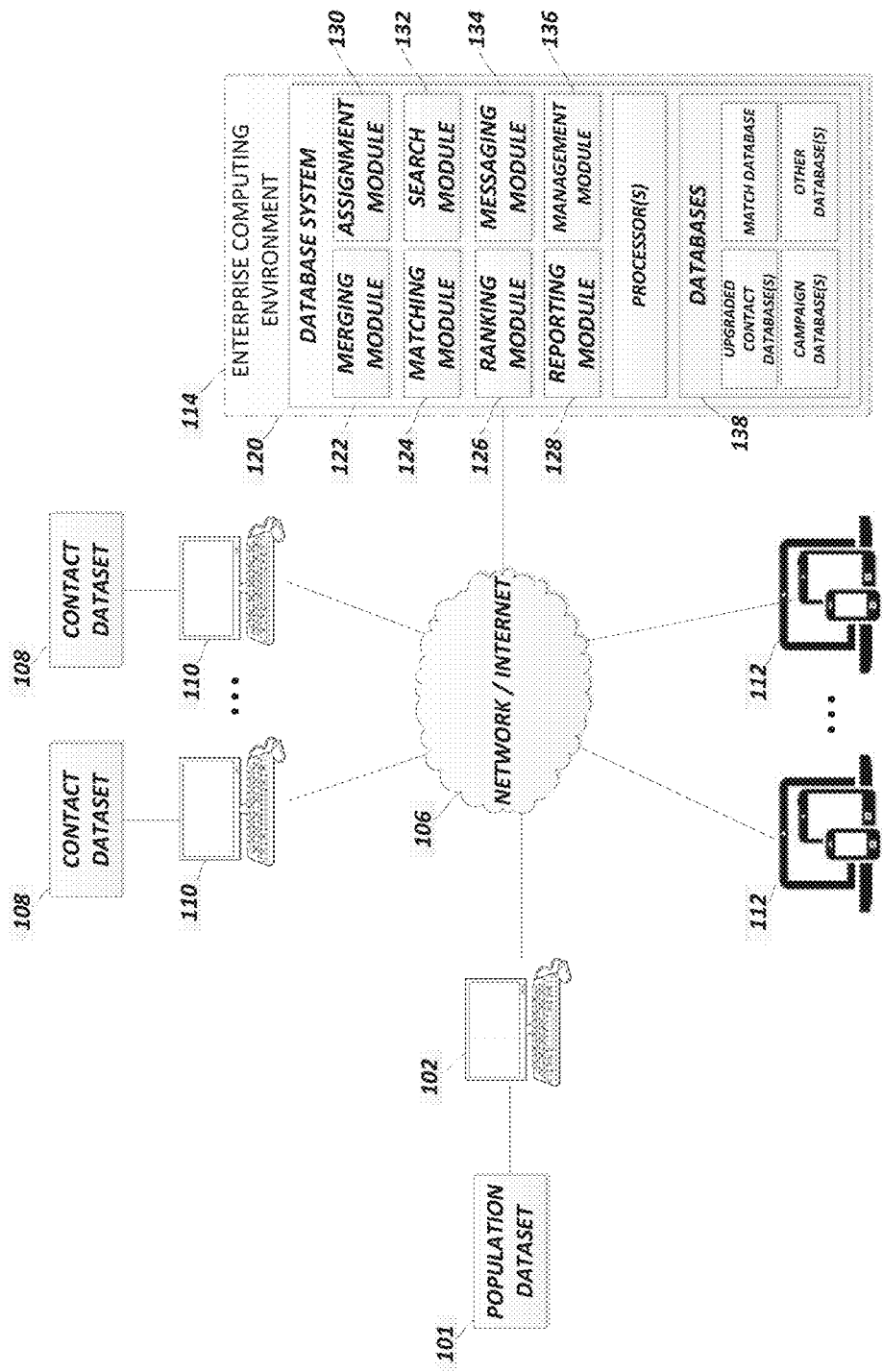
FIG. 1 is a system diagram that illustrates components of one embodiment of the system.

Throughout the drawings, reference numbers may be reused to indicate correspondence between referenced elements. Nevertheless, use of different numbers does not necessarily indicate a lack of correspondence between elements. And, conversely, reuse of a number does not necessarily indicate that the elements are the same.

DETAILED DESCRIPTION OF SPECIFIC EMBODIMENTS

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Introduction

This introduction provides examples intended to facilitate understanding of the database system disclosed herein, and the examples are not intended to be limiting.

In many cases, a computing system may combine information from multiple databases in order to carry out the functions of the system. One example of such information is contact information for individuals (e.g., names, email addresses, phone numbers, home addresses, and so forth), which is frequently stored as electronic data items in databases to be used by a service or application. For example, an email service or application may maintain a database, often referred to as an address book or contact list, which contains a list of contacts for individuals known by a user. Each contact contains the individual's contact information, which may include the individual's name, one or more email addresses for reaching the individual, one or more phone numbers for reaching the individual (e.g., home number and cell number), one or more addresses for reaching the individual (e.g., a mailing address), and so forth. In this scenario, if a user wishes to send an email to an individual in their contact list, the email address for that individual can be retrieved from their contact and used to send the email.

To build on this example, one instance in which a system combines information from multiple databases could be a system tasked with combining data items in contact lists with data items from other databases, such as populating missing contact information in a user's contact list. For example, the contacts in a user's contact list may only have email addresses and not the phone numbers associated with each individual. This example system may be configured to provide a correct phone number for each individual in the contact list, such as by referring to a separate reference database containing those phone numbers (e.g., another user's contact list, a phone directory, and so forth).

However, this example system faces many challenges in retrieving the correct phone number for each individual. The system has to determine the data items across multiple data sources that are applicable to a specific individual. This is done by matching certain data items between the contact list and the reference database (e.g., checking if the reference database contains the name of an individual in the contact list). Through this matching process, the system can identify the individuals of the contact list that are within the reference database.

This matching would be simple to do if all of the data sources used the same name for the individual to reference data items associated with the individual. However, this is not always the case. In some cases a contact may not have the name of the individual, while in other cases, the name for an individual may be different across the data sources. A solution may require sets of data items to be matched.

However, the set of data items available for each individual may be different across the data sources, which makes it difficult to perform matching using a singular approach. The approach used by the system may depend on the data items available for each individual in their contact, and the commonality of those data items with the data items in the reference database. Furthermore, the contact list and the reference database may be in different data formats, and the data items in the contact list and the reference database may also be in different formats. This can make it difficult to perform any direct comparisons between data items from the separate data sources. A system may have to first convert the formats of some of the data items in order to be able to match them. These issues demonstrate many of the difficulties that arise for any system that combines or matches data items coming from multiple data sources.

Accordingly, this disclosure relates to systems and methods for automatically determining, in real-time, the relationships between data items taken from multiple databases in order to identify related data items. This may be done using a set of pre-defined matching processes for matching varying sets of data items retrieved from multiple databases, and the matching may be performed depending on the available data items and their commonality across the multiple databases. When matching data items from different databases, the efficiency of the matching may be improved if the data items being matched are in the same format, and this disclosure also relates to systems and methods that allow data items from multiple databases to be efficiently converted into a common format for matching. Thus, the features disclosed herein are useful for dealing with the dynamic nature of databases and may be generalized and applied to any system that requires the use of combined information obtained from multiple databases.

In many cases, a computing system may also integrate the data items retrieved from a database in order to improve the efficiency and speed of the system. For example, this integration process may involve converting retrieved data items into a format that is more usable by the system, and then storing those data items into an internal database. Integration of data items may be straight forward when the system is utilizing data items from a single data source. However, the integration of data items can become significantly more complex if data items are being retrieved from multiple data sources.

One easy way to integrate data items retrieved from multiple data sources may be to simply combine those data items and store them into a single database. Take the previous example; after the system retrieves the phone number for an individual from the separate reference database, the system may save that phone number along with all the other contact information for the individual in a single database.

However, it may be difficult to provide varying levels of user access to the individual data items stored within this single database. Typically, a user will be provided all-or-none access to these data items based on their access to the single database. For example, if these data items are stored in a single text file and provided to a user, that user would be able to see all of the contact information for the individual—including the phone number that was retrieved. The user's overbroad access can create a data security and privacy issue If that phone number was not intended to be exposed to the user. Alternatively, the user may not be provided the text file, in which case the user would not have access to any of the data items. Instead, it may be desirable to provide a user access to some of the contact information for the individual while denying that same user access to the individual's phone number.

One way to do this is to store those data items across multiple databases. For example, the data items that the user should have access to may be stored in one database that is provided to the user, while the other data items are stored in another database kept away from the user. However, there is a relationship between the phone number and the rest of the contact information for the individual (they belong to the same individual), and that relationship was determined by the system during the matching process. If these related data items are separated and stored across multiple databases then that relationship is lost. If the system wants to use all of those data items together, then the system would have to re-match those data items each time—leading to a loss of efficiency.

Instead, the systems disclosed herein may integrate related data items by automatically generating associations that preserve the link between those related data items when they are stored across multiple databases. These associations may be stored together with the data items within each of those databases. The associations can be used to quickly locate all of the related data items among the multiple databases. For example, the phone number of the individual can be stored with an association in one file while the rest of the contact information for that individual is stored with an association in a separate file. The association stored with the phone number allows the other file containing the rest of the contact information to be quickly located, and it also specifies where in that file the contact information is located. The association stored with the rest of the contact information allows the file containing the phone number to be quickly located, and it also specifies where in that file the phone number is located. A user can be provided access to the file containing the phone number without fear of the user viewing the rest of the contact information, as the user would not be able to utilize the association to locate or access the file containing that contact information. At the same time, the system could provision any of that contact information to the user purely on an as-needed basis, because the system has access to both files and can locate and access all of the related data items as if they were in a single database. Thus, the associations allow for the grouping of related data items across multiple databases by preserving the relationship between those data items, and the associations can be used to restrict user access to only data items that are relevant to that user.

Accordingly, this disclosure relates to systems and methods for integrating related data items and storing them across multiple databases. This disclosure also relates to systems and methods for generating associations and storing them with data items across multiple databases, allowing for the link between related data items to be preserved even when those data items are in separate databases. The disclosure also relates to system and methods for using associations to govern and restrict user access to sets of data items or entire databases. Thus, the features disclosed herein are useful for storing and securing related data items and may be generalized and applied to any system that integrates data items obtained from multiple databases.

Canvassing and Distributed Outreach

The systems and methods discussed herein include many data integration features related to matching, associating, storing, and securing related data items retrieved from multiple databases. These systems and methods may be especially useful for the case of mapping social relationships for canvassing and distributed outreach, an application which can take advantage of all of those data integration features.

As such, this disclosure describes systems and methods within the non-limiting context of mapping social relationships for canvassing and distributed outreach. However, this is done purely for exemplary purposes in order to provide the reader a better understanding of the technical and practical benefits provided by the many aspects and features of the system. The systems and methods discussed herein provide numerous technological improvements and practical benefits in the fields of data processing, data integration, database efficiency, and data access and security. Aspects and features of the systems and methods discussed herein may be applicable towards any context, including any system that retrieves related data items from multiple data sources.

Canvassing is the systematic initiation of contact with individuals, and it is typically used during civic engagements. Non-limiting examples of civic engagements include voter registration, constituent outreach (e.g., a town wants to reach out to its residents), government outreach, non-profit outreach, and political campaigns (e.g., for elected officials).

This application primarily discusses canvassing in the context of political campaigns. However, the systems described herein may be used for any kind of canvassing. Canvassing can play an important role over the course of any political campaign. Campaigns, political parties, or issue groups will often contact individuals in order to identify supporters, persuade undecided voters, and add voters to the voter list. Successful canvassing may result in improved voter turnout and election outcomes for the political campaign.

The typical canvassing process starts with a list or database of contacts (i.e., contact information for individuals to be contacted). A campaign manager may use that list and distribute those contacts to one or more campaign supporters, who may perform any form of canvassing with the contact information—including door-to-door canvassing, in-person canvassing, social canvassing, phone canvassing, text (SMS) canvassing, email canvassing, and so forth. For example, with phone canvassing, a campaign supporter may proceed to call a set of individuals one-by-one. The campaign supporter may inquire those individuals about how they plan to vote. Individuals who are planning to support the campaign may be asked to volunteer as supporters, while those who are undecided may be attempted to be persuaded to support the campaign in some fashion.

Canvassing may be performed through distributed outreach, in which the supporters of a campaign self-organize on behalf of the campaign to distribute canvassing and reach out to a large number of voters. One type of distributed outreach is friend-to-friend outreach, in which the supporters contact their friends. This leverages the pre-existing social relationships that exist between the supporters and their friends, which can improve the effectiveness of canvassing since the voters being contacted are more likely to respond favorably when contacted by people they already know.

Canvassing may also be performed through targeted outreach, in which the campaign attempts to contact individuals that meet specific target criteria (e.g., the individuals belong to specific groups, demographics, and/or interests). For example, a campaign that is seeking to improve their support from voters of a younger demographic may specifically target voters in that younger demographic for canvassing.

The systems and methods described herein can be used to effectively implement canvassing and distributed outreach by layering those processes on top of social relationships that are mapped out using the data integration features described herein. In other words, the system accesses related data items from multiple data sources that pertain to the social relationships between individuals, and then converts, matches, associates, stores, and secures those related data items in order to map out those social relationships. Once the system has mapped out those social relationships, those social relationships and the integrated data items can be further used to carry out canvassing and distributed outreach.

The system may carry out the mapping of social relationships based on the contacts within one or more contact datasets (e.g., contact lists). The contact datasets may be imported by one or more supporters, who are providing the contacts for individuals known to them. Each contact may contain various types of contact information for the individual, including their name, email, address, etc. If the contact dataset is an email contact list, then the contact information for an individual will often include their email address. The system may then attempt to compare each contact against a population dataset, which contains data items for one or more unique individuals. Some of those data items for the one or more unique individuals may include contact information (e.g., name, email, address, etc.) that can be matched against the contact information for the contact. Some examples of population databases include registered voter data, city government records, property tax rosters, citizen lists, and so forth—essentially any database containing data items that can be used to identify unique individuals.

Thus, data items for each contact are matched against data items in the population dataset. In some cases, sets of data items in each contact are matched against sets of data items in the population dataset, and which data items are matched can depend on which data items are available in both the contact and the population dataset. The system performs the matching in order to identify a relationship between data items being matched—in particular, the system is seeing if the contact pertains to one of the unique individuals in the population dataset. In a system configured for campaign canvasing, the population dataset could be a voter file that contains registered voter data for a population that matches the scope of the campaign. Thus, the unique individuals in the population dataset would be voters, and the system would be matching contacts to the voters in the population dataset. This application may refer to voters that have been successfully matched by the system as a matched contact-voter.

The data items for a contact will often include various types of contact information. The voter file will also contain various types of contact information for voters. Thus, if contact information from the contact matches contact information for a voter, the system may infer that the contact pertains to that voter. The system may adjust the matching depending on what types of contact information are in the contact, as well as what types of contact information are available in the voter file for the voter. In general, the system may seek to use contact information that is common to both the contact and the voter file for the matching process.

For a campaign, this matching can be performed for every contact within a contact dataset, and for every contact dataset that is imported. The total number of contacts processed by the system may be tremendous, since the number of contacts grows exponentially as the number of supporters importing contact datasets increases. There may be a tremendous volume of data associated with that many contacts. Thus, the system may be able to quickly and efficiently process and match hundreds of thousands, if not millions, of contacts—a feat which cannot be replicated in a person's head or with pen and paper. Furthermore, since the matching of each contact is independent of one another, the system may be configured to process and match the contacts in parallel, which reduces the time needed to process all of the contacts. Additional information about these technical benefits associated with the system are discussed in regards to FIGS. 10 and 10A.

A successful match between a contact and a voter means that the data items for the contact and the data items in the voter file for that voter are related, because they all pertain to the same person. All of these related data items are relevant to the voter. Accordingly, the system can integrate these data items in a way that preserves that relationship. At the same time, there is a relationship between the voter those data items pertain to and whichever supporter imported the contact, as they are friends in real life. There may be a data item used to identify the supporter within the system, such as a supporter ID, which is now related to any data items for the identified person due to that relationship. Accordingly, the system may also integrate the data items for the identified person in a way that preserves that relationship.

It should be noted that multiple contacts can be matched to a voter or unique individual. For example, one supporter may import a contact that is matched to a voter, while another supporter also imports a different contact that is matched to the same voter. In this case, both supporters have imported contact information for the same person, who they are friends with. According, the system can integrate all the related data items for the voter in a manner that preserves both supporters' relationship to that voter.

The system may integrate any relevant, related data items by ensuring they are in the proper format and storing them across multiple internal databases. To preserve relationships between data items, the system may generate associations and store them with the data items across the multiple databases. These associations may be useful for grouping related data items across the databases, and they may also be used for identifying relationships between supporters and voters (since the data items for the voter are being associated with data items that identify the supporter).

Once all of the contacts imported by supporters have been matched to voters and the data items for each voter have been integrated while preserving the aforementioned relationships, the system can map out all of the relationships between the supporters and the matched voters based on the associations. For example, the system may be able to determine which supporters submitted a contact for a specific voter, and those supporters would be inferred as having a pre-existing social relationship with that voter.

The system may also group voters together with supporters based on those relationships that have been mapped out by the system, such as by assigning voters to one or more virtual precincts. Each virtual precinct may include a group of voters that are managed by a supporter with whom all of those voters have a pre-existing social relationship with. This grouping may be done easily with the associations generated from the integration process. Thus, some associations may also be referred to as virtual precinct associations because they are used in defining the virtual precincts.

These virtual precincts are particularly useful for canvassing and distributed outreach, since they can be used to provide each supporter a set of individuals who were matched to a voter based on contacts supplied by that supporter. These individuals within the virtual precinct all have a pre-existing relationship with the supporter, and the supporter already has access to their contact information. Thus, the virtual precinct can be used to supply the supporter a list of voters for friend-to-friend outreach on behalf of the campaign. The system enables this friend-to-friend outreach to be conducted at an incredible scale, since the system would handle the virtual precincts for thousands of campaigns, each containing thousands of supporters and voters—if not more.

As previously mentioned, the associations in the system may also be used to restrict and govern user access to specific data items—which is very desirable in the context of canvassing and distributed outreach because it allows access to data items to be determined from the virtual precinct. For example, it may be very desirable to allow a supporter to access contact information they uploaded for contacting a voter, while keeping that contact information away from other users, since that contact information can be used maliciously (e.g., for spamming the voter). The system may store the contact information for a voter supplied by a supporter separately from other related data items pertaining to that voter. A supporter managing a virtual precinct may be able to view their imported contact information for all the voters grouped into their virtual precinct. However, other users—including other supporters—would not be able to see that contact information. Supporters would only be able to see the contact information for voters in their own virtual precinct, which protects the contact information of those voters. At the same time, the system may provide the supporters the ability to edit, update, and maintain any contact information for the voters in their virtual precinct. The supporters may maintain their own virtual precincts by updating canvassing results for voters, editing incorrect contact information, flagging voters as potential supporters, deleting voters, and so forth. Supporters may also be able to access relevant data items for voters in their virtual precinct stored in other databases.

The system may also provide the means for performing canvassing with the contact information depending on the canvassing approach. For example, if text-based (SMS) canvassing is the desired approach, the system may be able to use the virtual precinct associations to look up contact information and automatically determine the phone numbers associated with the voters that are to be contacted by a supporter, and the system may sent out a SMS text to those voters on the supporter's behalf. If email canvassing is the desired approach, the system may be able to determine the email addresses associated with voters to be contacted by the supporter, and the system may send out an email to those voters on the supporter's behalf.

In some cases, the canvassing and distributed outreach can be initiated and managed by a campaign manager. The campaign manager may be able to determine a group of voters to send a message to, but the campaign manager would not be able to directly view the contact information for those voters (due to how the system integrated the contact information). Instead, the campaign manager would send a message to the supporters managing the virtual precincts for those voters. The supporters would review and customize the message before sending it to the voters within their virtual precinct.

It is important to note that, although the campaign manager does not have direct access to the contact information for the voters, the system allows the campaign manager to determine a target group of voters to send the message to for the purposes of target outreach. This is because the data items for the voters include identifying characteristics, such as the demographic (age, gender, nationality, etc.) and histories, for the voters. The campaign manager has access to those data items due to how they are integrated by the system, and they are used to determine a subset of voters that meet a set of target criteria specified by the campaign manager (e.g., all males between the ages of 20-30). The campaign manager could initiate canvassing of that target group of voters, such as by drafting an email to those voters that is tailored to target that demographic (e.g., discussing issues that 20 to 30-year-old males are particularly interested in). The canvassing approach may even be chosen based on that demographic (e.g., phone canvassing for an older group of individuals who are more comfortable with phone calls than emails). Tailoring the canvassing based on the target group of voters makes it more likely they will respond favorably to being contacted.

The campaign manager would then send out the draft email to supporters to send to those target voters in their virtual precinct, making those supporters the point of contact for those target voters and leveraging the pre-existing relationship between each supporter and the target voters in their virtual precinct. This also increases the likelihood that the target group of voters will responds favorably to being contacted. Thus, the systems herein allow campaigns to perform targeted distributed outreach by combining targeted outreach (targeting specific voters) with distributed outreach (with the supporters as the point of contact), in order to greatly increase the receptiveness of the voters being contacted and maximize the campaign support that is received by them.

Embodiments of the disclosure will now be described with reference to the accompanying figures. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

Terms

In order to facilitate an understanding of the systems and methods discussed herein, a number of terms are defined below. The terms defined below, as well as other terms used herein, should be construed broadly to include the provided definitions, the ordinary and customary meaning of the terms, and/or any other implied meaning for the respective terms. Thus, the definitions below do not limit the meaning of these terms, but only provide exemplary definitions.

User: Any entity that may access or utilize features of the database (e.g., to provide user input). Non-limiting examples of a user include a person, a group of people, a legal entity (e.g., a company, business, partnership, corporation, and/or the like), and/or the like.

User Input (also referred to as "Input"): Any interaction, data, indication, etc., received by the system from a user, a representative of a user, an entity associated with a user, and/or any other entity. Inputs may include any interactions that are intended to be received and/or stored by the system; to cause the system to access and/or store data items; to cause the system to analyze, integrate, and/or otherwise use data items; to cause the system to update to data that is displayed; to cause the system to update a way that data is displayed; and/or the like. Non-limiting examples of user inputs include keyboard inputs, mouse inputs, digital pen inputs, voice inputs, finger touch inputs (e.g., via touch sensitive display), gesture inputs (e.g., hand movements, finger movements, arm movements, movements of any other appendage, and/or body movements), and/or the like. Additionally, user inputs to the system may include inputs via tools and/or other objects manipulated by the user. For example, the user may move an object, such as a tool, stylus, or wand, to provide inputs. Further, user inputs may include motion, position, rotation, angle, alignment, orientation, configuration (e.g., fist, hand flat, one finger extended, etc.), and/or the like. For example, user inputs may comprise a position, orientation, and/or motion of a hand or other appendage, a body, a 3D mouse, and/or the like.

Database (also referred to as a "dataset"): Any data structure (and/or combinations of multiple data structures) for storing and/or organizing data, including, but not limited to, relational databases (e.g., Oracle databases, mySQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Individual: An individual may be a digital or conceptual abstraction of any entity associated with a set of data items that are integrated or contained in a database. Non-limiting examples of an entity include a person, a group of people, a legal entity (e.g., a company, business, partnership, corporation, and/or the like), and/or the like. For example, a database may contain a phone number that is associated with individual A and a separate database may contain an email address associated with individual B, but in real life the individual A and individual B may be the same person. The ordinary meaning of this term also applies.

Unique Individual: A unique individual may be any unique entity that exists in real life. To reiterate the previous example, a database may contain a phone number that is associated with individual A and a separate database may contain an email address associated with individual B, but in real life the individual A and individual B may be the same person (the unique individual). Non-limiting examples of a unique entity include a person, a legal entity (e.g., a company, business, partnership, corporation, and/or the like), and/or the like.

Contact Information: Contact information may include any information that is relevant for contacting an individual, through any means of communication. Non-limiting examples of contact information include the individual's name, an email address, a physical address (e.g., mailing address or residency), a phone number, a social media account name or identifier, and so forth.

Contact Dataset: Any database containing one or more contacts. The contacts may include various types of contact information for one or more individuals. Non-limiting examples of contact datasets include a contact list, address book, and so forth, such as those used for sending emails.

Population Dataset: Any database containing data items pertaining to one or more unique individuals. Population dataset is a broad term, and non-limiting examples of population datasets include voter records, city government records, property tax rosters, citizen lists, and so forth. At least some of the data items in the population dataset can be used to identify or contact those unique individuals, and non-limiting examples of those data items include contact information, such as name, phone number, address, email, and so forth.

Campaign: A campaign may be a civic or political campaign. A campaign may also be a discrete application of the database system for furthering the goals of a civic or political campaign through the use of campaign canvassing and distributed outreach. A campaign within the database system may involve one or more campaign managers, one or more supporters, and one or more voters. The ordinary meaning of this word also applies.

Campaign Manager: A campaign manager may be a user of the system described herein that oversees canvassing and distributed outreach in order to further the goals of the campaign.

Voter: A voter may be a unique individual identifiable within a population dataset, such as a voter file containing registered voter data. A voter may be contacted as the target or recipient of canvassing in a campaign. The ordinary meaning of this word also applies.

Supporter: A supporter may be any entity that supports a campaign in the system, typically by contributing contact datasets, managing virtual precincts, or performing canvassing and distributed outreach. Non-limiting examples of an entity include a person, a group of people, organizations, a legal entity, and/or the like. An entity can be the supporter of multiple campaigns at the same time. Campaign managers and voters may become supporters. The ordinary meaning of this word also applies.

Virtual Precinct: A group of one or more voters and a supporter for a campaign. A campaign may have many virtual precincts.

Database System Overview (FIGS. 1-7)

FIGS. 1-7 illustrate various components, features, functions, and processes associated with embodiments of database systems configured based on the example context for canvassing and distributed outreach.

FIG. 1 is a system diagram that illustrates components of one embodiment of the database system.

The campaign manager computing device 102 may be a computing device used by a campaign manager to manage a campaign. The campaign manager may use the campaign manager computing device 102 to import a population dataset 101 that is used by the database system 120. The database system may be able to generate user interface data used to render user interfaces to be displayed on the campaign manager computing device 102, and through those user interfaces the campaign manager may be able to manage various aspects of the canvassing and distributed outreach process for a campaign.

There may be one or more supporter computing devices 110 which are used by campaign supporters. The supporter computing devices 110 may have access to one or more contact datasets 108 containing contacts. They are used to import contacts into database system 120, which may integrate and store data items from the contacts in databases 138.

There may also be one or more voter computing devices 112, which may be used by voters to receive contact from supporters. The voter computing devices 112 may include any kind of electronic computing device capable of receiving transmitted information, including desktop computers, laptops, tablets, mobile phones, smart phones, and so forth.

A Network 106 may be used to link the various components, such as the campaign manager computing device 102, the supporter computing devices 110, and the voter computing devices 112, with the Enterprise Computing Environment 114. The Network 106 may include any collection of wired or wireless signals used by the devices and components of the system to communication with each other, and in some embodiments the Network 106 refers to the Internet.

In some embodiments, the Enterprise Computing Environment 114 may be a server or a collection of servers used to provide a service, such as cloud computing cluster. In some embodiments, the Enterprise Computing Environment 114 may comprise any business-oriented system, device, application, service, or information technology configured to benefit a company's operations.

Running on the Enterprise Computing Environment 114 may be the Database System 120. The Database System 120 may comprise one or more processors. The Database System 120 may also comprise the Merging Module 122, the Matching Module 124, the Ranking Module 126, the Reporting Module 128, the Assignment Module 130, the Search Module 132, the Messaging Module 134, and the Management Module 136. The Matching Module 124 and the Search Module 132 may be used in matching data items from multiple data sources in order to identify related data items. The Merging Module 122 and the Assignment Module 130 may be used in integrating related data items into the system and generating associations for those data items, such by generating the associations used for assigning voters to a virtual precinct. The Messaging Module 134 may be used to send messages between users of the Database System 120, such as when a supporter sends a message to a voter through the Database System 120. The Management Module 136 may be used by the campaign manager to manage aspects of the campaign. In some embodiments, there may be a Ranking Module 126 used in deciding which virtual precincts a voter is assigned to. In some embodiments, there may be a Reporting Module 128 used to report out the statistics associated with the canvassing and distributed outreach performed throughout the campaign.

The Database System 120 may comprise databases 138, which may have multiple roles. Examples of databases 138 shown in the figure include upgraded contact databases, campaign databases, match databases, and other databases. The other databases may include a names database, a synonyms database, a normalizations database, and a database containing invalid contact information. Additional information is provided in regards to FIG. 6C for examples of databases 138, the contents of those databases, and the roles of those databases.

Figure 2:
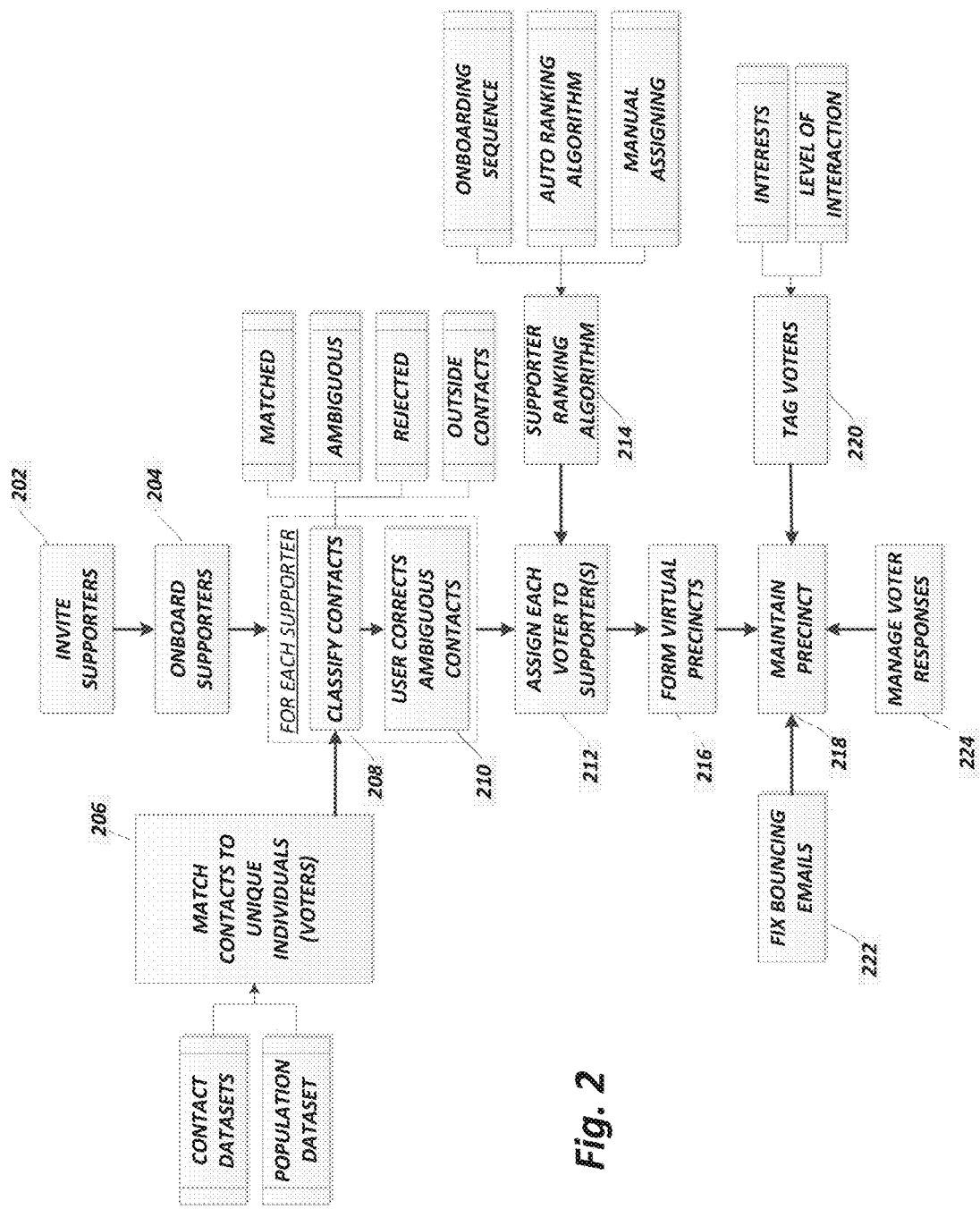
FIG. 2 is a flowchart illustrating the integration of data items in one embodiment of the system.

FIG. 2 is a flowchart illustrating the integration of data items in one embodiment of the system.

At block 202, individuals may be invited to become supporters of the campaign due to varying circumstances. In some cases, the campaign manager may choose to also become a supporter of the campaign, since supporters message voters directly. However, in some embodiments the campaign manager may be able to directly message voters through the system (in some of such embodiments, the campaign manager may not even have access to contact information and the system sends a message on the campaign manager's behalf). In some cases, the campaign manager may add supporters to the campaign, such as by importing their contact information (e.g., email addresses). Invitation emails may be sent to those email addresses containing an embedded link that may be clicked on to become a supporter. In some cases, voters may have received prior emails from the system and demonstrated interest in becoming a supporter of the campaign. In some cases, voters may have received an email containing an embedded link that can be clicked on to become a supporter. Clicking on the link may send the recipient to a user interface of system, where they may register and sign-up to become a supporter for the campaign that they received an email for.

At block 204, the system may run the newly-registered supporters through an onboarding process that introduces the supporters to the various aspects and features of the system. In some embodiments, the onboarding process may walk the supporters through the various aspects and features of the system step-by-step, which may drastically reduce the time needed for a supporter to familiarize themselves with the system and their role within the campaign for canvassing and distributed outreach. In some embodiments, the onboarding process may provide instruction to supporters for importing their contact datasets. For example, a supporter may wish to import a contact list of individuals that the supporter knows personally and has an existing relationship with (e.g., friends, family, co-workers, and so forth). Importing the contact list allows a campaign manager to leverage the existing relationships between the supporter and those individuals in the contact list. Some of those individuals may eventually become interested in the campaign themselves, and they may decide to become supporters as well—further growing the network of supporters. As new supporters join the campaign and import their contacts, the number of total voters that can be contacted grows exponentially to quickly expand the reach of the campaign. The onboarding process may also explain to the supporter how to reclassify contacts after the system has attempted to match those contacts with voters. The reclassification of contacts is described further in regards to block 210. Example user interfaces related to the onboarding of supporters may be seen in FIGS. 19 to 23.

At block 206, once a supporter imports a contact dataset, the system may match those contacts against a population dataset, which may be a voter file containing registered voter data. More specifically, the system may match data items containing contact information from the contact against data items containing contact information from the population dataset, in order to match the contact to a voter in the voter file. This is done for every contact in the contact dataset imported by the supporter, in attempts to match as many contacts to voters from the voter file as possible. It should be noted that the system is performing this matching process for the contacts in all the contact datasets that are imported for a campaign, and those contact datasets can be imported by one or more supporters. Thus, the system is matching the contacts for all the supporters.

In some cases, the system may determine that there are multiple potential voters within the voter file that a contact may be matched to. In other cases, a contact may not get matched at all. This is because the contacts provided by the supporters may contain varying amounts and types of contact information; some contacts may be missing certain contact information, such as a missing a name, an address, a phone number, an email, and so forth, which may make it difficult for the system to identify a single matching voter. However, the system will attempt to match each contact with a single voter to the best of its ability based on the contact information available for the contact. The matching of data items is described in further detail in regards to FIGS. 3A and 3B.

At block 208, the system may classify each of the contacts into different categories based on the accuracy and quality for the matching process of that contact. For example, the system may use a matching process of high accuracy to produce a match between a contact and a single voter from the registered voter data. That contact may be classified as "matched". If there was a high quality match, such as if the contact is an exact match to a voter, then that contact may also be classified as a successful match. The system may also use a matching process in which a contact is partially matched with multiple voters that are all potential matches. That contact may be considered "ambiguous" because it is unclear to the system which voter is the right match. The system may also use a matching process in which the match accuracy between a contact and a voter is too low (e.g., below a certain threshold). That contact may be considered "rejected" because it could not reliably matched. In some cases, there may also be no match at all. If the contact was not matched with any voter in the voter file, the contact may be classified as "outside contacts". Thus, all of the contacts matched at block 206 may be classified into one of these categories.

At block 210, the supporter may be able to reclassify the classifications for their contacts in a user interface provided by the system. In particular, the supporter may be able to correct "ambiguous" contacts by seeing the different potential voters that the system has matched to the contact. The supporter may be presented certain contact information for those voters taken from the voter file, which they may compare to the contact information for their contact in order to select the correct match based on their knowledge of the individual. Identifying the correct match would reclassify the contact as "matched". In some embodiments, the system may provide the supporter with the ability to manually change or edit contact information for ambiguous contacts in order to update any contact information that is incorrect or incomplete. Furthermore, the supporter may be able to reclassify contacts that the system considers "matched" as "rejected", as well as reclassify "rejected" contacts as "matched". Once a supporter verifies a contact in the "matched" category, the contact is then considered an "accepted" match. In some embodiments, contacts that are either an "accepted" match or "matched" with high quality can be considered to be a successful match, which allows the system to assume that the matched voter is a good friend or acquaintance of the supporter who imported the contact.

At block 212, each matched voter may be assigned to one or more supporters. Generally, the voters must be assigned to supporters that imported contacts matched to those voters. However, there may be many supporters that have imported contacts matched to a voter, and there may be a maximum threshold for how many supporters that each voter can be assigned to. For example, seven supporters may have imported contacts for a voter but the system may only allow that voter to be assigned to three of those supporters. This threshold can be useful in canvassing to limit the maximum number of supporters that may simultaneously contact a specific voter, which can prevent that the voter from being contacted too many times. In some cases, a campaign manager may be able to set that maximum threshold.

Thus, the system may have to determine which subset of supporters to assign the voter to within the overall set of supporters that imported a contact for the voter. This assigning process may involve a supporter ranking algorithm 214 for determining which supporters a voter is assigned to. In some embodiments, there may be an automatic ranking mode or algorithm used by the system to assign voters to supporters. In some embodiments, voters may be assigned to supporters based on the seniority of the supporters as determined by the sequence in which the supporters were onboarded. In other words, the voters may be assigned to the supporters that imported their contacts first. In some embodiments, the campaign manager may be able to manually assign voters to supporters. An example supporter ranking algorithm is described in regards to FIG. 4.

By assigning voters to supporters, the system is creating groups of voters for each supporter known as virtual precincts. For example, Voter A may be assigned to Supporter A and a Supporter B, while Voter B is assigned to a Supporter B and a Supporter C. In this case, Voter A and Voter B have both been assigned to Supporter B and can be considered part of Supporter B's virtual precinct. It should be noted that these virtual precincts are abstract concepts; the system is not creating an entirely separate data structure for each virtual precinct that keeps track of the voters and supporter in each virtual precinct. Instead, these virtual precincts are indirectly implemented by the system by the way the system integrates and stores related data items for the voters in a virtual precinct. In other words, Supporter B's virtual precinct is derived from the associations used by the system to link the data items for Voter A and Voter B to data items for Supporter B.

Thus, at block 216, once the voters have all been assigned to supporters, the system forms virtual precincts based on those assignments through the integration of the data items pertaining to those voters. Conceptually and practically, each virtual precinct may be thought of as a group of voters (and their data items) and a specific supporter that those voters have been assigned to. The supporter is guaranteed to have a pre-existing relationship with all of the voters in that virtual precinct because the supporter imported contacts for those voters. These virtual precincts can be used in canvassing and distributed outreach by having the supporter become the point of contact for the voters in their virtual precinct, which leverages those pre-existing relationships between the supporter and the voters. Virtual precincts can be better understood by referring to FIG. 10C, and their implementation is also described in regards to FIGS. 6C and 6D. The use of virtual precincts in canvassing and distributed outreach may be better understood by referring to FIGS. 5, 6A, 6B and 7.

Each supporter manages their own virtual precinct. Within a campaign, each supporter can only have one virtual precinct, although a supporter may be part of more than one campaign. At block 218, each supporter may be able to maintain their own virtual precinct. In some embodiments, the system may provide various user interfaces that the supporters may use to manage their virtual precinct. Examples of ways that a supporter may manage their virtual precinct are shown in blocks 220, 222, and 224.

For example, at block 220, the supporter may apply "tags" to the various voters in their virtual precinct based on the interests of the voter and the level of interaction (e.g., the relationship) between the supporter and the voter. These tags are essentially notes for the voters stored by the system and they can provide useful information to a campaign manager looking to initiate canvassing. For example, these tags may be useful for targeted outreach; a campaign manager may use the tags in defining the set of target criteria used to determine the voters to be contacted. As a specific example, a supporter may tag a handful of voters in their virtual precinct as interested in preserving the environment. The campaign manager may desire to send a specific email on environmental issues to voters who are interested in the environment, and this tagging would allow the campaign manager to target those specific voters in the supporter's virtual precinct. Targeted outreach may be better understood by referring to FIGS. 6A, 6B, 6D, and 7.

At block 222, the supporter may be able to edit and update the contact information for voters in their virtual precinct. Contact information for the voters may change over time. For example, a voter may create and use a new email address while abandoning the old email address. If the supporter sends an email to the old email address, the email may bounce back to the supporter. In this scenario, the supporter may be able to manually update the contact information for that voter with the new email address.

At block 224, the supporter may be able to manage any voter responses resulting from the canvassing. For example, the supporter may send out emails to voters in the virtual precinct. Some of those voters may reply to the email. The supporter may read and manage those responses.

Figure 3A:
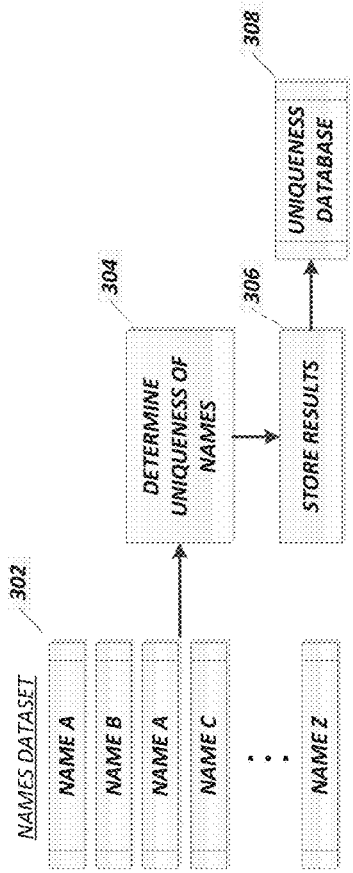
FIG. 3A is a flowchart illustrating the matching of data items in one embodiment of the system.
Figure 3B:
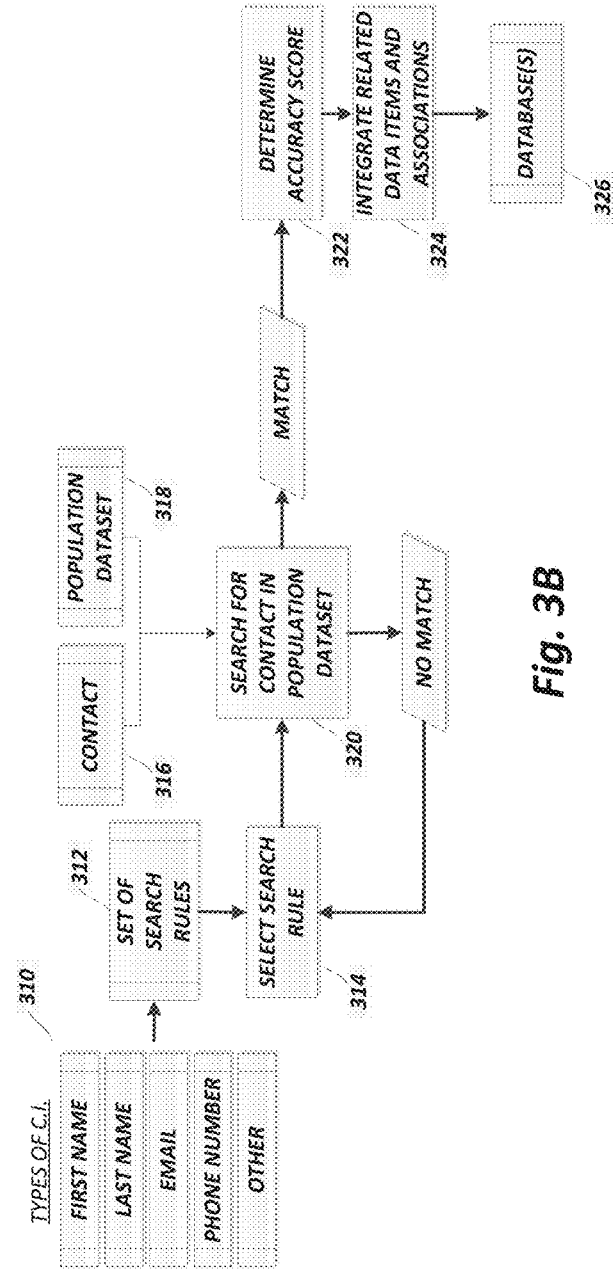
FIG. 3B is a flowchart illustrating the matching of data items in one embodiment of the system.

FIGS. 3A and 3B are flowcharts illustrating the matching of data items in one embodiment of the system. More specifically, they illustrate some of the processes used to match data items across multiple databases in order to identify related data items. The effective matching of data items across multiple databases allows for the mapping of the social relationships used in canvassing and distributed outreach.

FIG. 3A is a flowchart that provides an overview of how name uniqueness may be assessed in one embodiment of the system.

To map social relationships, the system may match data items (contact information) for a contact against data items (also contact information) for voters in a voter file. This allows the system to determine if those data items, which are retrieved from separate databases, are related. This matching process depends on what types of contact information is available for the contact, since only the types of contact information common between the contact and the voter can be matched.

In some cases, the types of contact information available for matching may be lacking. For example, a contact may only include a first and last name for an individual. The system may attempt to match the first name and/or the last name against the names of the voters in the voter file. Generally, even if the first name of the contact matches the first name of a voter in the voter file, that may not provide a high quality match between the contact and the voter since many voters could share the same first name (e.g., there could be many people with the name "John"). Matching last names may also not be determinative of a contact matching a voter. Matching first name and last name may provide a better indication that a contact matches a voter since the chances of two people having the same first name and last name are lower.

However, the frequency or "uniqueness" of the first name and the last name play also play a huge role in determining the conclusiveness of a name-based match. Matching a first name and/or a last name may actually be sufficient for concluding that a contact matches a voter if the names are very rare. Put generally, data items that occur frequently provide little probative value for identifying related data items across multiple databases, while rare data items provide more probative value. Thus, the system configured to identify related data items across multiple databases may also take into consideration the "uniqueness" of any of the data items being matched.

FIG. 3A describes an example process in which the "uniqueness" of names can be assessed for the matching process. The system may use one or more names datasets 302 which contain the names of a large number of individuals. Examples of name datasets 302 include census data, a phone directory, a population dataset, and so forth.

At block 304, the system may determine the uniqueness of each name within the names dataset 302. This determination may be performed through a variety of methods. In some embodiments, the system may keep a count of how many times each specific name occurs within the names dataset 302. For example, names dataset 302 is shown having "Name A", "Name B", "Name C"—all the way to "Name Z". "Name A" is shown occurring twice, such that there are two instances of "Name A" within the names dataset 302. The system may determine how many instances of each name occur in the names dataset 302. Since "Name A" occurs more frequently than "Name Z", the system may infer that "Name Z" is more unique than "Name A". The number of occurrences may be used directly as the metric for "uniqueness", or those numbers may be used to calculate some other metric usable for "uniqueness".

At block 306, the system may store the "uniqueness" values determined for each name in a uniqueness database 308 for future use, so that block 304 would not have to be performed repeatedly during the matching process. During the matching process, the system may consult the uniqueness database 308 in order to determine the "uniqueness" of data items being matched. Thus, the system may be able to determine beforehand some quantitative measure of "uniqueness" for various data items and store those values to be used during the matching process.

FIG. 3B is a flowchart that provides an overview of how a contact may be matched to voter in one embodiment of the system.

As previously mentioned, each contact within a contact dataset contains various types of contact information which can be matched against contact information in a population database, which may be a voter file containing registered voter data. However, the types of contact information in each contact available for matching may vary between contacts. Thus, there may not be a single set of contact information that can be uniformly used to match contacts to voters. Put generally, the matching of data items across multiple databases may depend on the types of data items available and common across the databases.

Accordingly, the system discussed herein utilizes a matching process that changes based on the types of contact information available and common between each contact and the population dataset. The exact matching algorithm used for each contact may be selected from a plurality of pre-defined matching algorithms, which are configured for matching varying combinations of contact information. Each matching algorithm may be associated with an accuracy that is at least in part based on the types of contact information being matched. The exactness of the matches between the contact information for the contact and the contact information for the voter may speak on the strength or quality of the match resulting from the matching algorithm. Thus, both the accuracy of the matching algorithm used and the strength of the match may affect how conclusively the system determines a contact to be matched to a voter. In some embodiments, if there is a high quality match of high accuracy between a contact and a voter, then the system may infer that the supporter who imported the contact is friends with the voter (e.g., by considering the contact as a successful match).

Thus, the system described herein may be able to automatically assess (without human intervention) aspects of a match (such as the strength, quality, accuracy, and likelihood) between data items from separate databases in order to determine if those data items are related. This reduces the need for a human being to have to specify beforehand or confirm those data items are related.

With reference to the figure, a supporter may import a contact 316 into the system. The contact 316 includes one or more types of contact information for an individual. The types of contact information provided may include a name, email, phone number, address, and so forth.

A population dataset 318 is also provided to the system. In some embodiments, a different user such as a campaign manager may import the population dataset 318. The population dataset 318 may also contain various types of contact information for numerous individuals in a certain population. Examples of some of the types of contact information include a name, email, phone number, address, and so forth. Thus, there may be certain types of contact information that are common to both the contact 316 and the population dataset 318 which can be matched.

A pre-defined set of matching algorithms may exist, and they are referred to in the figure as the search rules 312. Each search rule may be configured for matching a specific combination of contact information, and each search rule may also instruct the system how to match those types of contact information. Examples of the types of contact information 310 are shown in the figure, such as a first name, last name, email, phone number, address, and so forth. Additional examples of types of contact information can be seen in FIG. 10E within the data items 1092 and the data items 1094.

Each search rule may be associated with an accuracy score, which depends on the combination of contact information matched under that search rule. For example, a search rule configured for matching five different types of contact information may be considered more accurate than a search rule configured for matching two types of contact information. In some embodiments, the accuracy score for each search rule may be arbitrary. In some embodiments, the set of search rules 312 includes a total of 30 search rules. These 30 search rules may be ordered by decreasing accuracy score, and the system may be configured to apply these search rules, rule-by-rule in order of decreasing accuracy, for each contact 316. The system may go through this set of search rules 312 until a match is found for the contact 316.

For example, the first search rule in the list may involve the system attempting to match a first name, a last name, and an email for the contact 316 to first names, last names, and emails of voters within the population database 318. If all three of these data items are matched, this first search rule may specify that the match has a particular accuracy score. This accuracy score would be used by the system, along with the match quality of those three data items, to determine whether the contact 316 matches a voter in the population database 318 (which would make the data items for the contact 316 related to the data items for the voter).

As another example, the second search rule in the list may involve the system attempting to match a first name, last name, and a phone number for the contact 316 to first names, last names, and phone numbers of voters within the population database 318. If all three of these data items are matched, this second search rule may specify that the match has a particular accuracy score which can be used to determine whether the contact 316 matches a voter in the population database.

At some point further into the search rules, there may be a name-based search rule that involves the system attempting to match just a first name and a last name of contact 316 to the first names and the last names of voters within the population database 318. Since not as many types of contact information are being matched, the system may identify more than one potential voter that matches the contact 316. More specifically, multiple potential matches may be identified if there are a number of voters in the population database 318 having the same name as the contact 316. In that case, the system may query the uniqueness database 308 described in FIG. 3A to determine the "uniqueness" of the name of contact 316 and adjust the accuracy score based on that "uniqueness". The uniqueness database is also shown in FIG. 6C.

At some point even further into the search rules, there may be a fuzzy-match search rule that involves the system attempting to match a first name and a last name of the contact 316 to first names and last names of voters within the population dataset 318, with the requirements that there must be a perfect match between the last names (an as-is match) and only a fuzzy match between the first names. In some embodiments, the accuracy score associated with this search rule may be adjusted based on aspects of the first name fuzzy match. For example, a large difference between the first names may adjust the accuracy score downward. In some embodiments, the first name fuzzy match may be based on an n-gram search. For example, the n-gram search may involve a value of 3 for n, such that three letters are matched at a time (e.g., "Bil" of the name "Bill" is used in the fuzzy matching).

The fuzzy match is not necessarily restricted to first names. In some embodiments, other types of contact information such as emails, phone numbers, and addresses may be matched on an as-is or fuzzy basis depending on the search rule. Furthermore, the fuzzy matching does not need to be exact. There may be various filters or thresholds that need to be met in order for a match to be identified. For example, there may be a 90% threshold, such that if 90% of the data items being compared were the same, the system would consider it to be a match.

In some embodiments, the fuzzy matching of names may utilize a synonym database. This synonym database may contain a list of similar or related names to the name of the contact 316, which may be used instead for the matching process. For example, names like "Dick" and "Richard", or "Jim" and "James", would be considered to be synonyms. The system may be able to determine that a contact 316 has the name "Richard" and also perform the fuzzy matching process using the name "Dick". This synonym database is additionally shown in FIG. 6C.

With further reference to the figure, at block 314, the system may select the appropriate search rule from the set of search rules 312 to use in a given situation based on the types of contact information available for the contact. In some embodiments, the system may start at the first search rule in a list of search rules and proceed down the list systematically until a match is found.

At block 320, the system may compare the data items for the types of contact information of contact 316 specified by the search rule to the data items for voters in the population database 318. If a match between the contact 316 and a voter is not identified, then at block 314 the system may select a different search rule and proceed back to block 320 in order to search for a match again using the new rule.

If however, a match between the contact and a voter is found, then at block 322 the system may determine an accuracy score for the match. In some embodiments, the accuracy score may be dependent on the search rule used to identify the match, as well as any adjustments made based on the strength of the match. Based on the accuracy score and any other aspects of the match, the system may determine whether the contact 316 was successfully matched to the voter. In some cases, the system may infer that the contact 316 was successfully matched to the voter, while in other cases the supporter that imported the contact 316 may need to verify the match in order for the match to be considered successful.

At block 324, for a successful match the system may integrate related data items into the system. The related data items may include the contact information from the contact 316, the data items from the population dataset 318 pertaining to the voter matched to the contact 316, as well as data items pertaining to the supporter that imported the contact 316. For example, the related data items may include the email of the contact 316, as well as the name, phone number, address, etc. for the matched voter from the population database 318. In some embodiments, the system may check to see if the data items from the population database 318 have already been integrated and stored within the system, in order to prevent those data items from being stored again. This provides a technical benefit to the system by eliminating any duplicate data items for a voter retrieved from the population database 318. This reduces the number of data items stored and makes it faster and more efficient to search through all the data items pertaining to the voter and it may also be useful for allowing the associations to function properly.

The system may also determine a virtual precinct to group the matched voter to (e.g., such as the virtual precinct managed by the supporter). The system may also generate associations to be stored with the related data items, which may be stored across multiple databases 326. These associations allow the relationship between the related data items to be retained. In some embodiments, the associations may include virtual precinct associations which are used in defining the virtual precinct for the voter. For example, a data item for a supporter ID or the name of a supporter may be used as a virtual precinct association and stored with data items for the voter in order to group the voter into that supporter's virtual precinct. Additional information about the integration process is provided in FIGS. 6C, 6D, 10B, and 10C.

In some embodiments, the related data items and their associations are stored across multiple internal databases 326. For example, the system may store some data items into a campaign database, some data items into an updated contact database, and some data items into a match database. Examples of these databases are shown and described in FIG. 6C.

With further reference to FIG. 3B, it should be noted that in some embodiments, a match database may be available that stores data items from previous, successful matches. Thus, when a contact 316 is imported and is missing some types of contact information, the system may be configured to search through match database to see if similar contacts have already been successfully matched. Data items from those contacts that were successfully matched may be used to populate the missing contact information in the contact 316. For example, the email address of the contact 316 may be compared to the email addresses within the match database. If the email address is matched, then missing contact information in the contact 316 may be populated using the match database. This allows previous, successfully matched contacts to be used in enhancing the matching of future contacts.

Figure 4:
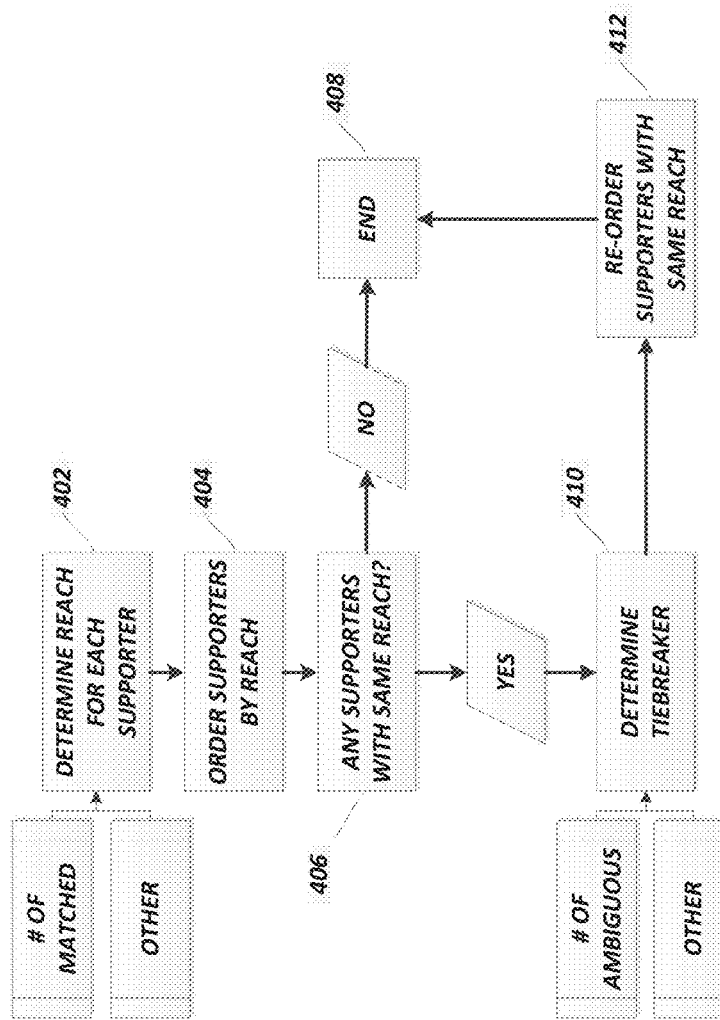
FIG. 4 is a flowchart illustrating the determination of associations in one embodiment of the system.

FIG. 4 is a flowchart illustrating the determination of associations in one embodiment of the system. More specifically, FIG. 4 is a flowchart that provides an overview of one example of how voters may be assigned to supporters to form virtual precincts.

At block 402, the system may determine the "contribution" or "reach" of every supporter. In some embodiments, the reach of a supporter is calculated as the number of contacts imported by the supporter that have been classified as "matched" or "accepted". However, in other embodiments the reach of the supporter may be calculated in any other manner.

At block 404, the supporters in the campaign are ranked and ordered according to their reach.

At block 406, the system will determine whether any of the supporters have the same reach. In some embodiments, this arises when multiple supporters have the same number of imported contacts that have been classified as "matched" or "accepted" (e.g., two different supporters both have twenty "matched" contacts). If there are no supporters with the same reach, then the ranking determined at block 408 is used in assigning voters.

However, if there are multiple supporters with the same reach, then at block 410 the system may use a tiebreaker in order to rank those supporters. In some embodiments, the tiebreaker may be the number of "ambiguous" contacts imported by the supporter. In the unlikely event that multiple supporters also have the same number of "ambiguous" contacts, then another tiebreaker could be used. In other embodiments, the tiebreaker may be calculated or resolved in any other manner.

At block 412, the supporters with the same reach for which the tiebreaker was used is then re-ordered based on the results of the tiebreaker.

At block 408, once all the supporters have been successfully ranked and ordered, that order may be used in assigning voters to virtual precincts. In some embodiments, the ranks of the supporters may be visible to the campaign manager.

In some embodiments, there may be a manual assignment mode in addition to the automatic ranking of supporters. The system may allow ranks to be manually assigned to supporters. For example, the campaign manager may be able to go through the ranking from the automatic process and re-order supporters individually (e.g., move one supporter all the way to the top of the rankings).

Figure 5:
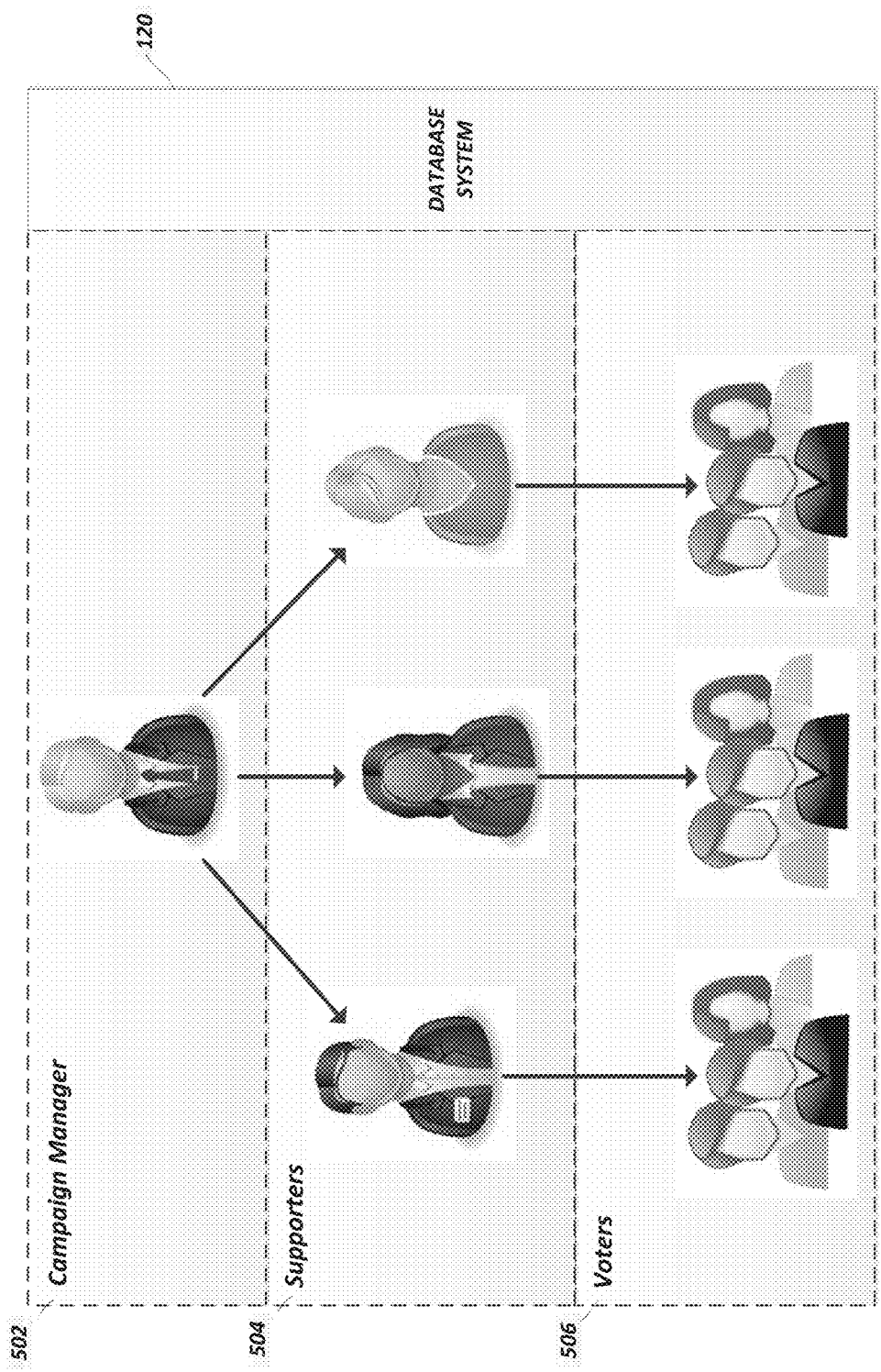
FIG. 5 illustrates the various users of one embodiment of the system.

FIG. 5 illustrates the various users of one embodiment of the database system. More specifically, the figure illustrates a hierarchy of various groups of individuals, including a Campaign Manager 502, Supporters 504, and Voters 506. The Database System 120 may be configured to map out the social relationships between all of these individuals, as well as enable the canvassing and distributed outreach of the Voters 506.

As shown in the figure, there may be one or more Campaign Managers 502. They may initially recruit Supporters 504 to assist in the campaign. The Campaign Manager 502 may also become a supporter. Supporters 504 may utilize Database System 120 to import their contacts. The Database System 120 maps out the social relationships between the Supporters 504 and the Voters 506 using the imported contacts. The Voters 506 are grouped into one or more virtual precincts based on the Supporters 504 they have a social relationship with. Each Supporter 504 is in charge of managing a virtual precinct containing a group of Voters 506.

The Campaign Manager 502 may wish to send a message to the Voters 506, but the Campaign Manager 502 does not have access to the contact information for the Voters 506. Instead, the Database System 120 enables the Campaign Manager 502 to first draft a message that is sent to Supporters 504. The Supporters 502 customize the message and then send it to Voters 506 in their virtual precinct. Thus, the Supporters 504 act as a communications liaison or point of contact between the Campaign Manager 502 and Voters 506.

As a security feature, the Campaign Manager 502 may not be permitted to directly contact Voters 506 directly, and any contact information (i.e., emails) for the Voters 506 is not provided to Campaign Manager 502. This is done for security purposes (to keep Campaign Manager 502 from contacting Voters 506 they have no relationship with), as well as for practical purposes (it improves the effectiveness of canvassing by mandating that the Voters 506 be contacted by people they already know—emails received by the Voters 506 from Supporters 504 are more likely to be read). This features are described in more detail in regards to FIGS. 6A, 6B, 6C, and 6D. In some embodiments, the Campaign Manager 502 may be able to create target groups of Voters 506 for messaging using a set of target criteria. This is described in more detail in regards to FIGS. 6A and 6B.

Figures 6A, 6B:
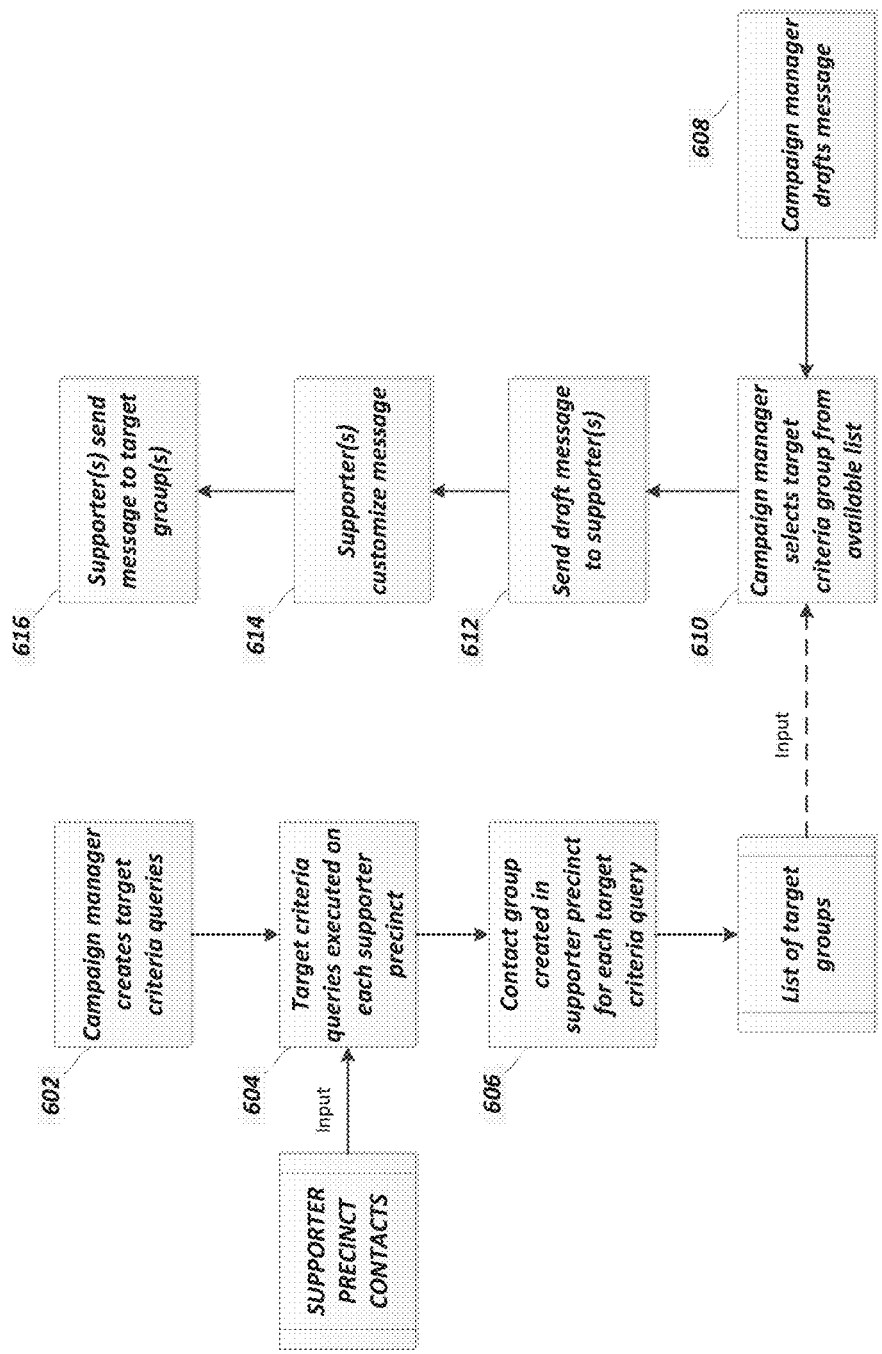
FIG. 6A is a flowchart that illustrates user access restriction to data items as implemented in one embodiment of the system.
FIG. 6B is a flowchart that illustrates user access restriction to data items as implemented in one embodiment of the system.
Figure 6C:
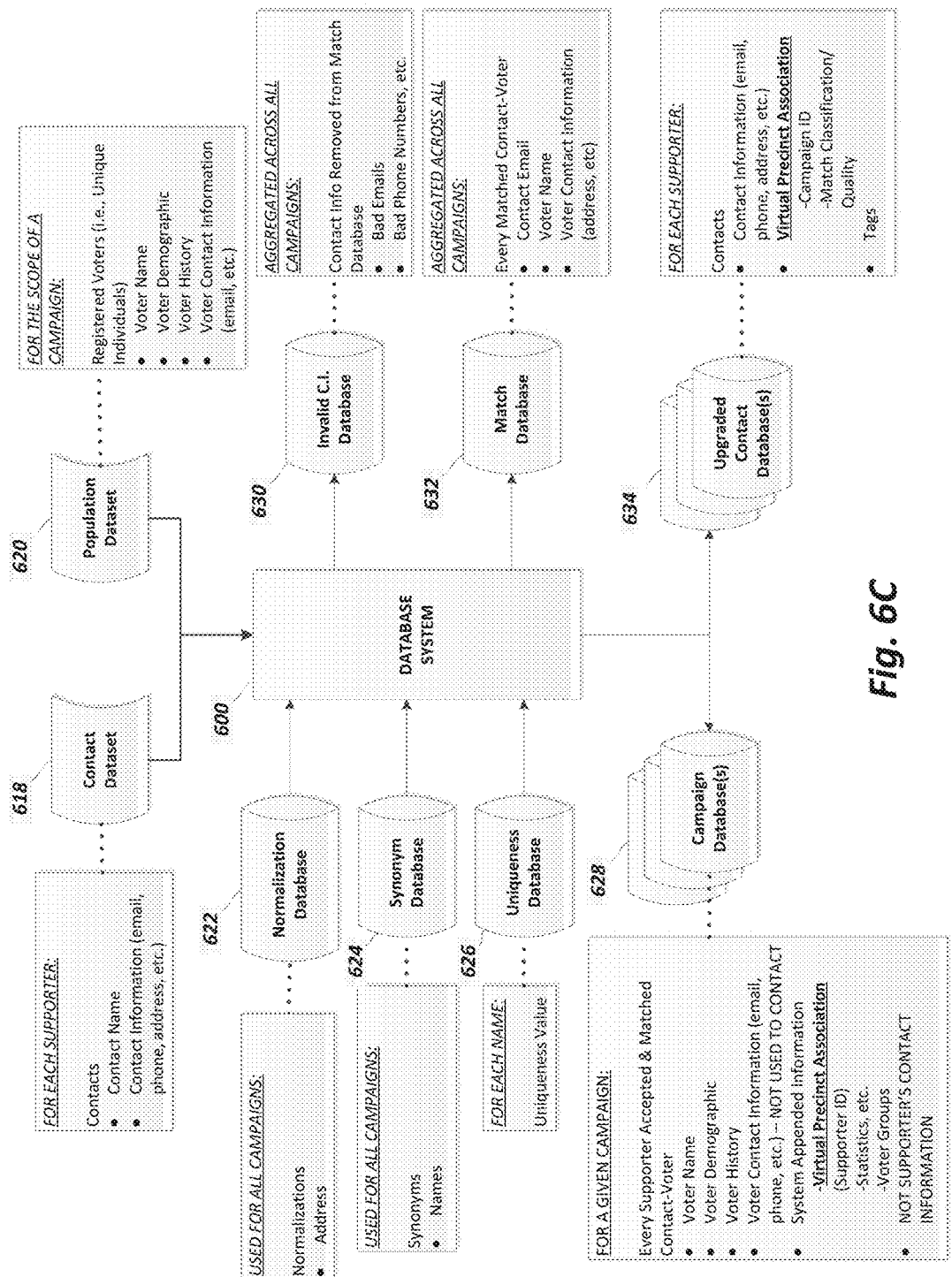
FIG. 6C is a system diagram that illustrates some of the databases used in one embodiment of the system.

FIG. 6A is a flowchart that illustrates user access restriction to data items as implemented in one embodiment of the system. More specifically, the figure shows how a campaign manager is prevented from accessing the contact information associated with voters and cannot contact the voters directly. Instead, the campaign manager defines a target group of voters to contact and sends a draft message to supporters. The supporters customize the draft message and are the ones who send the message to the voters, since the supporters have access to the contact information of the voters.

As previously described, the system may provide users different levels of access to data items, such as based on the relevancy of those data items to the user. A supporter that manages a virtual precinct may have a high-level of access to the related data items pertaining to the voters in their virtual precinct. The supporter may be able to view, modify, perhaps even delete, some of those data items. This reflects the role of the supporter as a manager of the virtual precinct. In particular, the manager of each virtual precinct must be able to edit and update contact information for voters in their precinct, making the data items for those voters relevant to the manager. In comparison, a supporter may have a much lower level of access to related data items pertaining to voters who are not in their virtual precinct. For example, the supporter may not be able to view or access those data items at all. This reflects the fact that the supporter has no social relationship at all to voters not in their virtual precinct, and thus should not be granted access to the data items for those voters.

At the same time, the campaign manager may have access to certain data items for the voters in the campaign, such as the data items for those voters that were obtained through the population dataset. Since the campaign manager may have imported the population dataset, it makes sense that the campaign manager would be provided access to data items from it. Additionally, the data items from the population dataset are relevant to the campaign manager because they allow the campaign manager to search for all the voters in the campaign that fit a certain set of target criteria. At the same time, the campaign manager is not provided access to the contact information from the contacts imported by the supporters. This prevents the campaign manager from contacting the voters in the campaign, who the campaign manager has no relationship with. The contact information is irrelevant to the campaign manager, who is still able to search out voters in the campaign to target without the contact information. Additional information regarding this feature is provided in FIG. 6C.

At block 602, a campaign manager may create target criteria queries for the voters in the campaign. In some embodiments of the system, the campaign manager may be able to define or select a set of target criteria to identify the voters in the campaign that fit that set of criteria. This may be done for the purposes of targeted outreach, as the campaign manager can use the search results is to narrow down the list of voters based on the chosen target criteria and send a message the voters that meet the target criteria. For example, the campaign manager may want to send a message to all voters in the age range of 20 to 30. The campaign manager may create a target criteria query through a user interface of the system. For example, in some embodiments, there may be a list of pre-defined fields for defining ranges or specifying keywords, while in other embodiments the campaign manager may be allowed to have more control over search parameters using string-based and/or Boolean queries (e.g., age>20 && age<30).

At block 604, the system may search through the data items pertaining to voters in the campaign in order to determine the voters that fit the target criteria query. More specifically, the system may search through data items containing voter contact information or voter demographic information for each voter within the campaign database (as well as any system-appended information for that voter). For any voters that fit the target criteria, the system may use any virtual precinct associations stored with the data items in order to identify the supporters whose virtual precincts those voters are assigned to. The system may perform a proxy search through the contact information for those voters, which are stored in the upgraded contact databases of those supporters. However, the campaign manager is not given direct access to the imported contact information for those voters (hence the term proxy search). The purpose of the proxy search is for the system to identify the methods available for contacting each of those target voters. Some voters in a virtual precinct may be contacted through email, while other voters in that virtual precinct may need to be contacted through a phone call, and so forth.

At block 606, the system may create a contact group (or "target group") associated with each virtual precinct based on the voters in those virtual precincts that met the target criteria query. These various target groups may be saved in lists of target groups to later be used by the campaign manager, as seen in FIG. 6B. Thus, the system allows these groups of target voters meeting the target criteria to be referenced and contacted later on, without revealing the contact information of those target voters to the campaign manager. These target groups for each virtual precinct can also be used to generate a recipient list that is sent to the supporter of each virtual precinct when the campaign manager wishes to contact the target voters. The recipient list may identify the target voters within a virtual precinct to be contacted by the supporter of that virtual precinct.

FIG. 6B is a flowchart that illustrates user access restriction to data items as implemented in one embodiment of the system. More specifically, it illustrates how supporters are used to contact voters in one embodiment of the system.

As previously mentioned, the campaign manager may be able to utilize the results of a targeted search of voters in the campaign by using the various target groups created. Each target group may be identified within the upgraded contact database for the supporter whose virtual precinct that target group pertains to. In some embodiments, the voters of a target group may be tagged within the upgraded contact database and identified as belong to that target group. Those target groups allow the campaign manager to reference target voters to be contacted without being to view or access contact information for those voters directly. Furthermore, the use of target groups may improve the efficiency of the system if the campaign manager is repeatedly contacting the same target voters. Those target voters only need to be identified once, rather than each time the campaign manager seeks to initiate contact. The target groups are also small in size and can be reused.

At Block 608, the campaign manager may draft a message that they wish to send out to the supporters of the virtual precincts associated with the target voters. The campaign manager may confirm the message they wish to send.

At Block 610, the campaign manager may select one or more target criteria groups from the list of target groups. A target group may refer to one or more voters of a virtual precinct that meet the target search criteria. These target groups were generated based on the set of target search criteria provided by the campaign manager.

At Block 612, the campaign manager may decide to send the draft message to the supporters of the virtual precincts associated with the selected target groups. The system may send the draft message to those supporters on the behalf of the campaign manager by using the target groups to determine the supporters that should receive the draft message. The system may also send these supporters a recipient list, which will identify the target voters within that supporter's virtual precinct that should be contacted.

At Block 614, the supporters may review the draft message and further customize the message. They may customize the message by tailoring it to the relationship they have with the target voters in their virtual precinct.

At Block 616, the supporters may click send and send the customized message to the target voters within their virtual precinct. Thus, these target voters would not receive a message until the supporters decide to send the message. However, in some embodiments, the supporters may be able to select an opt-in feature, wherein draft messages sent to them by the campaign manager are automatically forwarded to the voters without the supporters having to click send. The draft messages may be forwarded without the supporters having the opportunity to customize the message. Thus, blocks 614 and 616 would not be used in the system.

FIG. 6C is a system diagram that illustrates some of the databases used in one embodiment of the system. More specifically, the figure illustrates some of the data items contained in various databases utilized with one embodiment of the system.

The database system 600 takes in a contact dataset 618 as an input, and the contact dataset 618 is supplied by a supporter of a campaign. The data format of the contact dataset 618 may vary, but the database system 600 may be configured to interpret the data format of the contact dataset 618. The contact dataset 618 contains a list of contacts, with each contact having contact information (e.g., a name, email, phone, address, and so forth). The types of contact information available for each contact within contact dataset 618 may vary. In some embodiments, the system is configured to remove duplicate contacts from imported contact datasets. In some embodiments, the system is configured to strip out junk contacts from imported contact datasets, with some examples of junk contacts including service and support emails.

The database system 600 also takes in a population dataset 620 as an input. The population dataset 620 may contain information for the unique individuals in a specific population. The scope of the population dataset 620 may match the scope of a campaign. For example, a campaign may be relevant to the population of a state. In that case, the population dataset 620 may contain information for the unique individuals in that state, and any individuals who are not within the population dataset 620 would not be relevant to the campaign. The population dataset 620 could be census data or registered voter data with the same scope as the campaign (e.g., the population dataset 620 could be limited in geographic scope to fit the scope of the campaign). A population dataset 620 that is based off of registered voter data may contain information for each voter, such as the voter's demographic, voting history, and certain contact information (such as the voter's name, email, phone number, and so forth). In some cases, the contact information in the population dataset 620 may be outdated or unreliable. That contact information may be useful for matching purposes, but it is not used by the system to perform canvassing and distributed outreach. However, in some embodiments, the contact information from the population dataset 620 may be used during canvassing to contact the voters. In some of such embodiments, the contact information from the population dataset 620 is used to contact a voter if imported contact information that has been supplied by a supporter is not available for the voter.

The database system 600 may match each contact in the contact dataset 618 against the voters in the population dataset 620, in order to identify the voter that corresponds to each contact. At a more technical level, the database system 600 must determine related data items between the contact dataset 618 and the population dataset 620 by matching data items in the contact dataset 618 to data items in the population dataset 620. This matching can be done using any combination of contact information available for the contact in the contact dataset 618.

However, the information in the contact dataset 618 may be presented in a slightly different format than the information in the population dataset 620, which makes it difficult to compare data items from the two sources. For example, the first name for an individual in the contact dataset 618 may be "Bill", while the first name for that same individual in the population dataset 620 may be "William". The database system 600 may have difficulty matching these names. Thus, the database system 600 may consult the normalization database 622 and the synonym database 624 in order to improve the matching process.

The synonym database 624 may contain lists of synonymous names. For example, the synonym database 624 may state that "William" is synonymous with "Bill", or that "Dick" is synonymous with "Richard." For each name within the contact dataset 618 that the database system 600 is attempting to match to the population dataset 620, the database system 600 may consult the synonym database 624 to retrieve any similar names and attempt to match all of those names as well. The synonym database 624 may be updated manually over time in order to accommodate any changes in synonymous names.

The normalization database 622 may contain lists of normalizations that are applicable to certain types of data items. For example, the normalization database 622 may state that "Street" can be represented as "St." in an address, or that "Avenue" can be represented as "Ave." If the address for an individual in the contact dataset 618 uses "Street", while the address for that same individual in the population dataset 620 uses "St.", the database system 600 may consult the normalization database 622 to ensure the addresses from both sources are in the same format before attempting a match. For instance, the database system 600 may convert all of the addresses in the contact dataset 618 to use "St." instead of "Street" if all of the addresses in the population dataset 620 use "St."

Furthermore, the normalization may be performed on any type of data item and not just addresses. For example, the contact dataset 618 may have phone numbers presented in a certain way (e.g., (555)555-5555) while the population dataset 620 contains phone numbers presented in a different way (e.g., 555.555.5555). Thus, the database system 600 may also convert phone numbers into the same format for matching purposes. The normalizations described herein are useful in resolving a related issue, which is that the contact dataset 618 can be in one of many database formats (e.g., TXT, CSV, VCF, etc.), and each of those database formats may store certain data items in a specific way. Thus, normalizing the data items themselves allows the database system 600 to be agnostic towards the exact database format used and increases the number of database formats compatible with the database system 600.

During the matching process itself, in which data items in the contact dataset 618 are matched to data items in the population dataset 620, the database system 600 may also consult the uniqueness database 626 and/or the match database 632. These databases are also used to address certain difficulties associated with the matching process and improve the matching process.

The uniqueness database 626 is used when the database system 600 is matching a name from the contact dataset 618 to names in the population dataset 620. The uniqueness database 626 may contain "uniqueness" ratings for a list of names (including first name and/or last name). The "uniqueness" of a name can be used in determining the accuracy and quality of a match. For example, the database system 600 may determine that a certain contact within the contact dataset 618 is a possible match with a voter in the population dataset 620, but the match is not exact. However, the name of that contact may be very unique, and it is highly unlikely that someone else would have the same name out of coincidence. This may increase the likelihood that the database system 600 has identified a match, which can be reflected in a higher accuracy and quality of the match. If instead, the name of the contact was not very unique, then the name itself may be less determinative of a match.

The match database 632 contains information for every matched contact-voter in which the match was either accepted by the supplier of the contact dataset 618 (e.g., the supporter) or there was determined to be high match quality. The match database 632 would be aggregated across all campaigns, which means the match database 632 contains information for every matched contact-voter resulting from every contact dataset that has been supplied to database system 600. In other words, the match database 632 may contain information from every successful match performed by the database system 600. For each matched contact-voter, this information may include the contact email address (e.g., the email address from the contact dataset 618), the voter name (e.g., from the population dataset 620), and the voter contact information (e.g., from the population dataset 620). In other words, the match database 632 may contain, for each successful match, the contact information for that unique individual taken from the population dataset 620 and their email taken from the contact dataset 618.

The match database 632 can be used as a reference database to populate missing data items in contact datasets, which can be useful to the matching process. It allows for previous, successful matches to improve the matching of contacts in the future. For example, a contact dataset 618 may contain a contact in which only an email and a first name is available. Those data items may be insufficient for matching the contact against the voters in population dataset 620. In this situation, the database system 600 may consult the match database 632 prior to the matching process. If that person had been successfully matched before (from a different contact dataset, a different campaign, etc.) then the match database 632 will contain that person's email address. The email from contact dataset 618 can be looked up within match database 632. If the email is found, the voter's name and voter contact information from the previous, successful match can be retrieved from match database 632 and used to fill in the missing data items for the contact for matching purposes. Although the individual has already been matched before, the database system 600 must still perform the match in order to determine if the individual fits within the scope of the campaign, by seeing if the contact can be matched against the voters in the population dataset 620.

There may also be an invalid contact information database 630, which contains contact information that has been removed from match database 632. In some situations, users of the database system 600 may be able to edit and update the contact information for a specific individual that has been successfully matched by the system. For example, the email address or phone number for the individual may change over time and the contact information for that individual in match database 632 would no longer be current. The information in match database 632 may be updated, and the invalid information would be moved to invalid contact information database 630. In some embodiments, the database system 600 may also consult the invalid contact information database 630 if a contact is missing certain data items. The email address of the contact can be looked up within the invalid contact information database 630. If the contact email is found, it may mean that the contact email is outdated and the email address has changed. The corrected email in match database 632 can be used instead to retrieve the voter name and voter contact information for populating the missing data items in contact dataset 618.

As the database system 600 determines matches for a campaign, the supplier of the contact used in the match (e.g., the supporter who provided the contact dataset 618) may verify the match. The information for any matched contact-voter that has been accepted by the supporter is put into the campaign database 628. For a given campaign, the campaign database 628 contains the voter name, the voter demographic, the voter history, and the voter contact information. For example, if a contact from the contact dataset 618 was successfully matched to a voter from the population dataset 620, then the campaign database 628 would include the voter name, voter demographic, voter history, and voter contact information taken from the population dataset 620. It should be noted that the voter contact information, which can include an email address or phone number, is not used by the system in contacting that individual during canvassing or distributed outreach. It should also be noted that the campaign database 628 does not contain any contact information provided by a supporter (e.g., contact information from the contact dataset 618). Thus, the campaign database 628 does not contain any information that is used by the database system 600 to contact individuals for canvassing and distributed outreach. This feature is important for privacy purposes.

Furthermore, the campaign database 628 may contain, for each matched contact-voter, system appended information. The system appended information may include any virtual precinct associations, any voter groups, and any statistics or commentary relevant to that individual. In some embodiments, a virtual precinct association may be a supporter ID (e.g., the ID or name of the supporter that imported a contact dataset containing the individual). An individual in the campaign database 628 may have more than one virtual precinct associations, such as in the case that individual was in contact datasets imported by multiple supporters. The virtual precinct association is used in canvassing and distributed outreach, and it is also useful for privacy purposes. That virtual precinct association informs the system how to retrieve the contact information for an individual in the campaign database 628, and without it the system would be unable to contact the individual.

When the contacts from contact dataset 618 have been matched, the database system 600 may generate an upgraded contact database 634 for the supplier of the contact dataset 618 (e.g., the supporter of the campaign) that includes all of the contacts imported by that supporter. Thus, there may be many upgraded contact databases 634, with each corresponding to a supporter in the campaign. For a supporter, the upgraded contact database 634 may contain all of the contacts present in their contact dataset 618, including the contact information available in their contact dataset 618. For example, if the contact dataset 618 had the email address for an individual, that email address would be in upgraded contact database 634. This retained contact information is the only way to contact individuals during canvassing and distributed outreach, and it is not stored within campaign database 628. This feature is useful for privacy purposes, since that contact information is visible only to the supporter.

The upgraded contact database 634 also contains any corresponding virtual precinct associations for each contact in the upgraded contact database 634. This may include a campaign ID, as well as a match classification or quality. A contact may not be associated with a campaign ID if it was not successfully matched to the population dataset of any campaign. Alternatively, a contact may be associated with multiple campaign IDs if the supporter is part of multiple campaigns and the contact was successfully matched to the population datasets of those campaigns. A contact that has a high match quality for a specific campaign will mean that the campaign database 628 for that campaign will contain information for that individual. Thus, the virtual precinct association in the upgraded contact database 634 links an individual in the upgraded contact database 634 to information for that individual in a specific campaign database 628. The virtual precinct association for an individual in a campaign database 628 links that individual to one or more supporters and their upgraded contact databases 634, in which the contact information for that individual can be found. Thus, the virtual precinct associations in the campaign database 628 and the upgraded contact database 634 serve as a way to associate related data items that are stored in separate databases. Those associations are useful for privacy purposes and user access restriction, since the associations serve as a convenient way to divide up sensitive information and restrict user access to relevant data items.

Figure 6D:
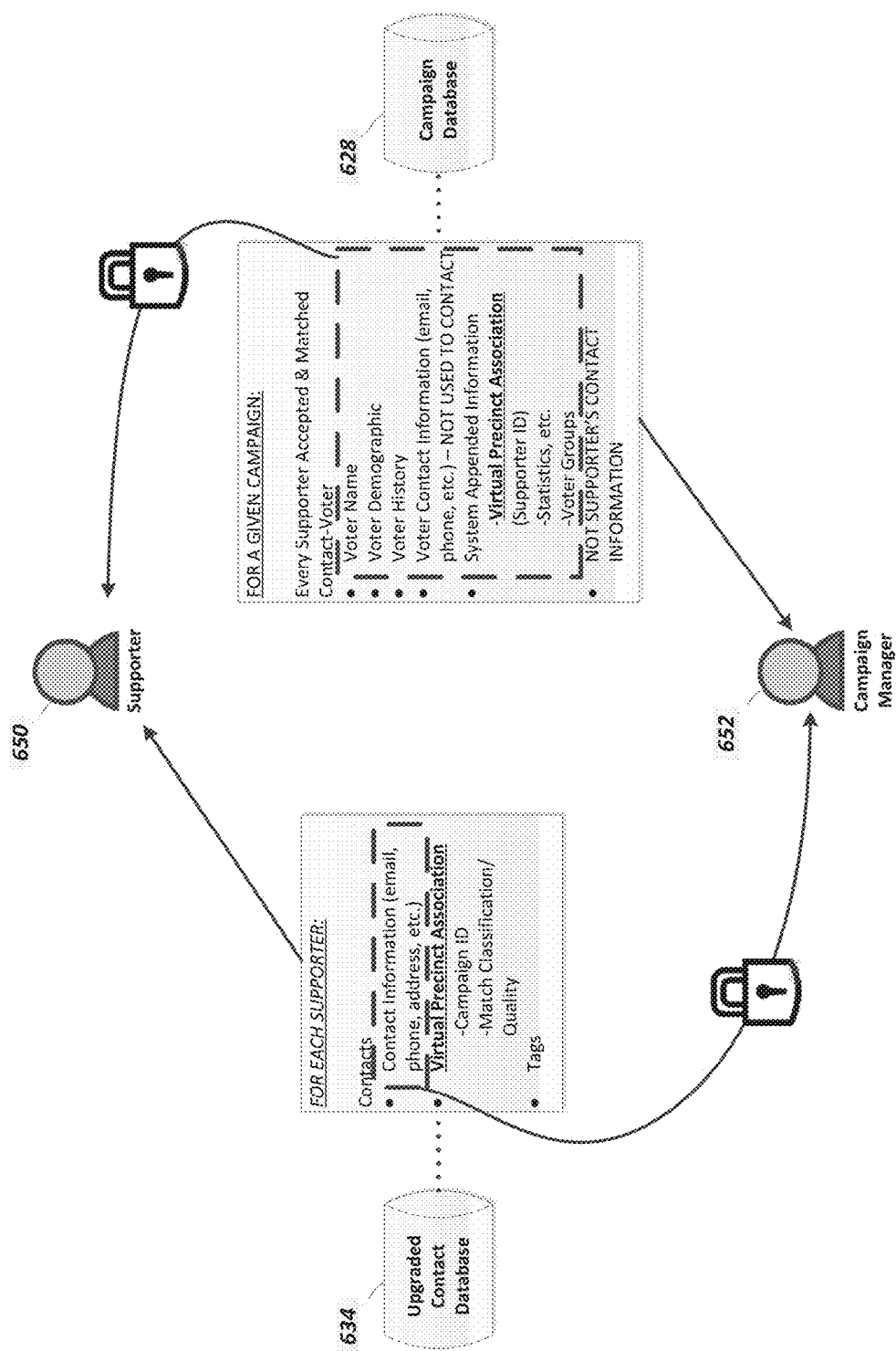
FIG. 6D illustrates user access restriction to data items as implemented in one embodiment of the system.

FIG. 6D illustrates user access restriction to data items as implemented in one embodiment of the system.

The upgraded contact database 634 and its contents, as well as the campaign database 628 and its contents, from FIG. 6C are also shown here. In this example, the supporter 650 imported the contact dataset containing the contacts that were matched against a population dataset for the campaign. Upon verifying the matched contacts, the system generated upgraded contact database 634 for the supporter 650, which contains all the contact information present in the contact dataset. The system also maintains a campaign database 628, which contains certain information associated with every successfully matched and verified contact, and not just those contacts that have been supplied by the supporter 650.

The supporter 650 has complete access to their upgraded contact database 634, as shown by an arrow in the figure. Thus, the supporter 650 may see each contact's contact information. The supporter 650 may change a contact's contact information within the upgraded contact database 634, such as if that contact updates their email address or phone number. The supporter may add "tags" for a contact, which is also stored within upgraded contact database 634. Finally, the supporter 650 may be able to view the virtual precinct associations for each contact in their upgraded contact database 634 to see which campaign a contact has been matched in, as well as the quality of that match.

The supporter 650 also has limited access to the campaign database 628, as shown by an arrow with a lock. The supporter 650 can view all the information in the campaign database 628 (such as the voter's name, demographic, history, statistics, etc.) that corresponds to a contact within their upgraded contact database 634. In other words, the supporter 650 may view the information in the campaign database 628 for any individuals that the supporter 650 supplied a contact for in a contact dataset, but the supporter 650 would not be able view information for any of the contacts supplied by other supporters in the campaign. In particular, the supporter 650 may be able to view the age and street name from the population dataset for a matched voter for the purposes of verifying the match. For example, the supporter 650 may be able to see the age and street name of a voter taken from a population dataset and see if matches the age and street name of the contact they provided in the contact dataset. If the ages and street names match, the supporter 650 may verify the match. Otherwise, the supporter 650 may reclassify the match (e.g., an ambiguous contact or rejected contact) so that the contact would not be part of the campaign. Other information for the voter obtained from the population dataset may also be released to the supporter 650 for matching purposes, and not just the age and the street name for the voter.

Thus, the supporter 650 is only provided access to data items within the campaign database 628 that are relevant to supporter 650. This access can conveniently be determined based on the virtual precinct associations for each contact within the upgraded contact database 634, which can be used to inform the campaign databases and the individuals within each of those campaign databases that the supporter 650 may access the information for.

A campaign manager 652 may use the system for canvassing and distributed outreach. Typically, the campaign manager 652 may invite one or more supporters, who will import their contact datasets used for matching and generating the campaign database 628.

The campaign manager 652 has unfettered access to the campaign database 628, as shown by the arrow. The campaign manager 652 may view, for every accepted and matched contact-voter, the voter's name, demographic, history, and contact information. However, that contact information is from the population dataset and not from any of the contact datasets supplied by supporters. Thus, the campaign database 628 does not give the campaign manager 652 the ability to contact any individuals directly using the contact information in the contact datasets. The campaign database 628 also contains system appended information, so that the campaign manager 652 may be able to see any statistics or notes associated with each individual in the campaign database 628, as well as any virtual precinct associations for that individual. There may be more than one virtual precinct that an individual belongs to, and a virtual precinct association may be the supporter ID or name of the supporter managing the virtual precinct that the individual belongs to. In order for an individual to be assigned to a supporter's virtual precinct, the individual must have been in the supporter's contact dataset. Thus, once a contact has been matched and the supporter who imported the contact has verified the match, a virtual precinct association can be generated and added to the campaign database 628 for that individual.

The campaign manager 652 may wish to send out a message to a group of individuals within the campaign database 628. However, as previously mentioned, the campaign database 628 does not contain the necessary contact information for those individuals. The contact information for those individuals is instead stored in the upgraded contact databases for the supporters that imported contacts for those individuals, and the campaign manager 652 is not provided direct access. This can be seen in the figure from the arrow with a lock that goes from the upgraded contact database 634 to the campaign manager 652.

However, the campaign manager 652 can identify the group of individuals for receiving the message using campaign database 628. Campaign database 628 includes voter demographics and voter histories. The campaign manager 652 may target a specific group of individuals to be recipients by specifying a set of target criteria. The system may go through the campaign database 628 and identify all of the individuals that meet those criteria. Those individuals will each have one or more virtual precinct associations stored within campaign database 628, which informs the system where the contact information for those individuals is located. For example, an individual in the campaign database 628 may have a virtual precinct association with the supporter 650, which informs the system that contact information for that individual is available within the upgraded contact database 634 that is associated with supporter 650.

At this point, the campaign manager 652 would not be able to directly access the upgraded contact database 634 to view the contact information for the individual. The system may prevent access using any kind of authentication, permission, or login method in order to prevent access to data items. In some cases, the system may access the upgraded contact database 634 to determine what kind of contact information is available (e.g., email or phone number) in order to convey the available methods of communication for contacting that individual. However, even if the campaign manager 652 can see if there is an email or phone number available for an individual, the campaign manager 652 does not know what the email or phone number is. Instead, the campaign manager 652 may provide a message to the supporter 650 to send on his behalf. The supporter 650 may revise that message and then send it to the individual using the contact information in upgraded contact database 634.

Thus, the figure shows how the virtual precinct associations, which are associations between related data items stored in separate databases, allow for related data items to be secured for privacy purposes in a fashion similar to a two-way virtual private network (VPN). In a VPN, privacy is maintained by allowing a client to only access information relevant to the client on the server. In this implementation, VPN-like privacy is similarly provided for the contact information and contacts. The supporter 650 may only view data items that are relevant to him in the campaign database 628, and the campaign manager 652 may only view data items that are relevant to him in the upgraded contact database 634.

Figure 7:
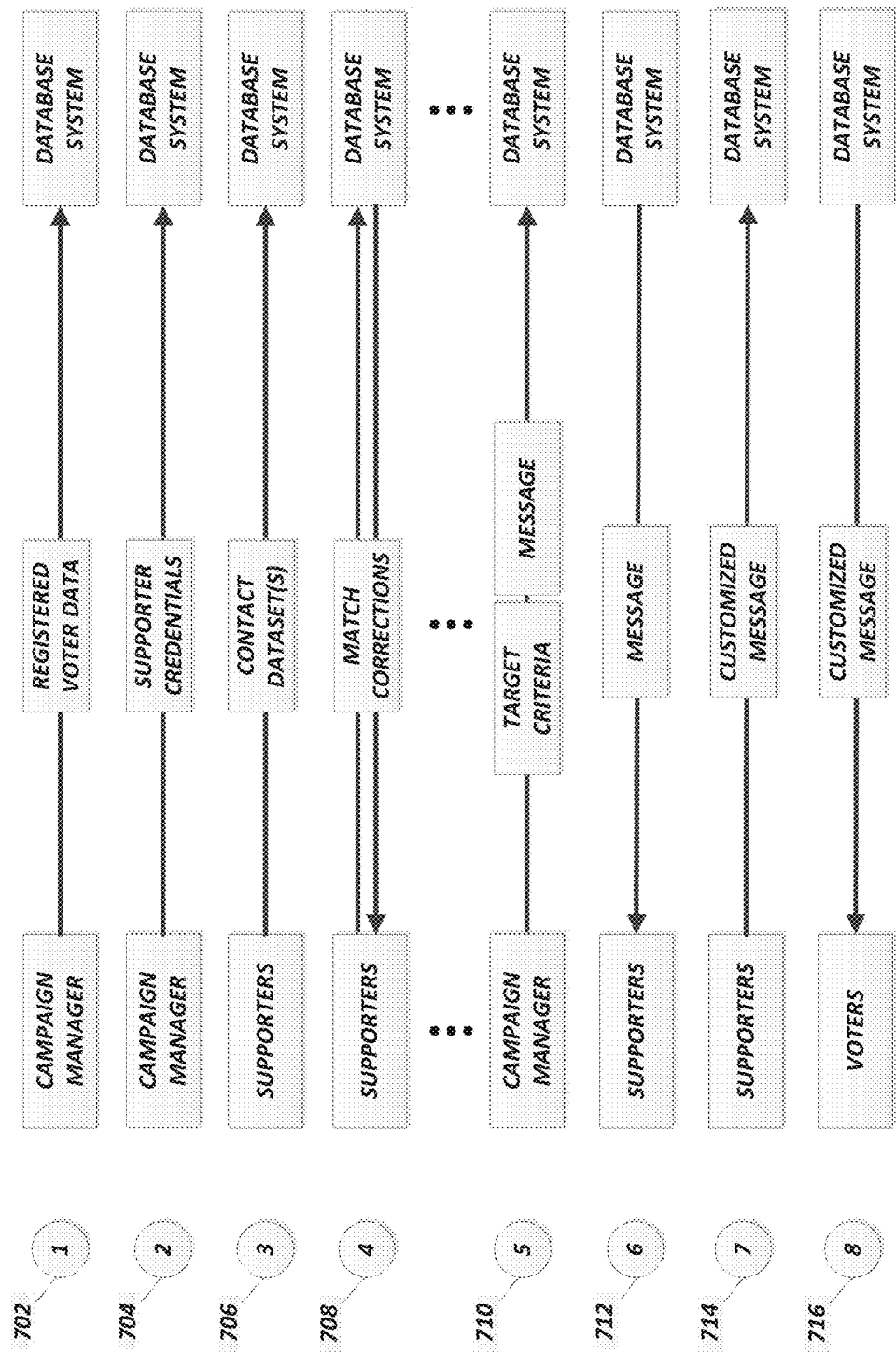
FIG. 7 illustrates an example operation of one embodiment of the system.

FIG. 7 illustrates the various inputs and outputs for one embodiment of the database system.

At Step 702 (Circle 1), the campaign manager may provide registered voter data to the database system that matches the scope of the campaign. This step may be optional, since the database system may have an up-to-date database with registered voter data and the campaign manager would not have to provide that data.

At Step 704 (Circle 2), the campaign manager may provide contact information for supporters to the database system. In some cases, there may already be existing supporter contact information if the campaign manager had run a campaign in the past, and the campaign manager may reuse that contact information. The database system may onboard those supporters to bring them into the campaign.

At Step 706 (Circle 3), the supporters may submit contact datasets to the database system for import. Afterwards, the database system will match contacts to voters in the registered voter data and then classify those contacts based on the match.

At Step 708 (Circle 4), the supporters may interact with database system in order to correct the classifications of any of their contacts. In particular, ambiguous contacts may be corrected at this stage.

At Step 710 (Circle 5), the campaign manager may provide a set of target search criteria and a draft message to the database system. The database system may search through the voters in the campaign to determine those target voters that fit the search criteria.

At Step 712 (Circle 6), the database system may forward the draft message of the campaign manager to the supporters of each target voter's virtual precinct.

At Step 714 (Circle 7), the supporters may further customize the message and choose to send it to the target voters in their virtual precinct. In some embodiments, the supporters may supply this customized message to the database system, which sends out the customized message to the target voters on the supporter's behalf.

At Step 716 (Circle 8), the database system may send the customized message from the supporters to the target voters in their virtual precinct that fit the search criteria.

Implementation Mechanisms (FIGS. 8-10E)

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface (GUI), among other things.

Figure 8:
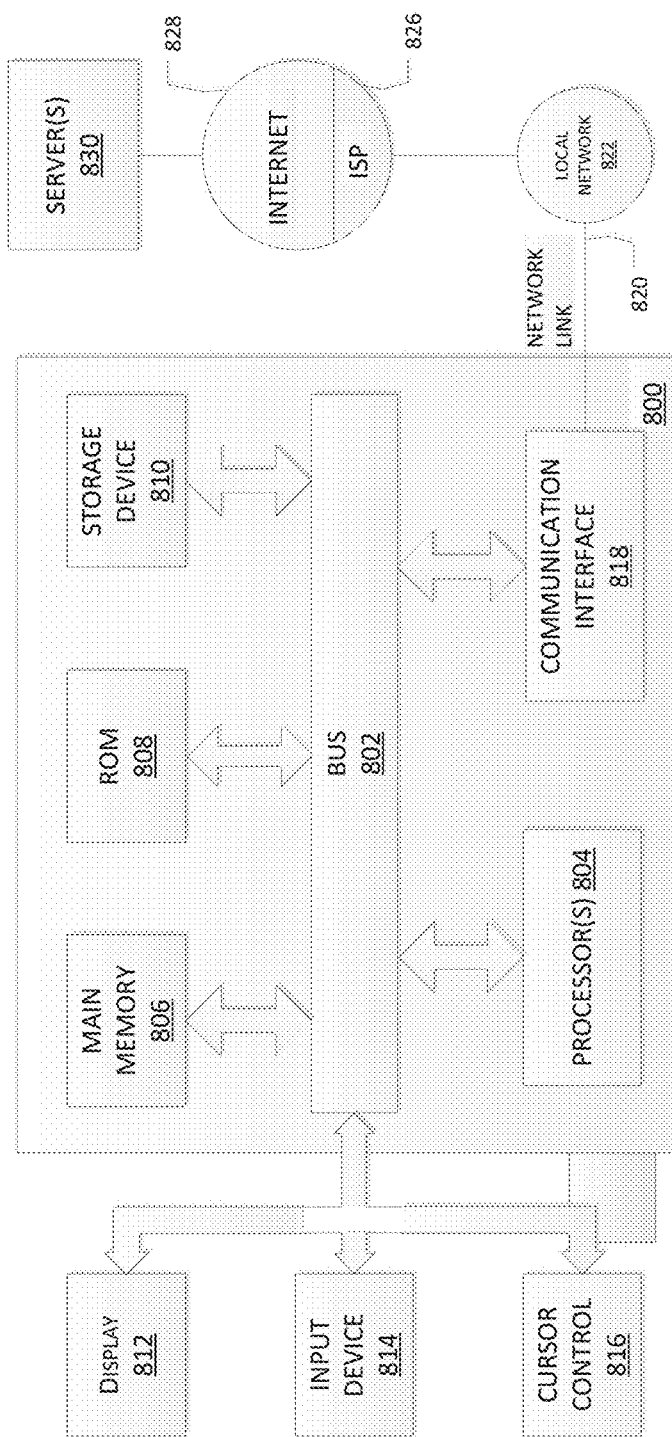
FIG. 8 is a block diagram that illustrates one embodiment of a computer system upon which the system may be implemented.

For example, FIG. 8 is a block diagram that illustrates an embodiment of a computer system upon which the database system may be implemented. For example, any of the computing devices discussed herein, such as the computing device 102, computing device 110, computing device 112, the enterprise computing environment 114, the database system 120, the database(s) 138, and so forth, may include some or all of the components and/or functionality of the computer system 800.

Computer system 800 includes a bus 802 or other communication mechanism for communicating information, and a hardware processor, or multiple processors, 804 coupled with bus 802 for processing information. Hardware processor(s) 804 may be, for example, one or more general purpose microprocessors.

Computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or USB thumb drive (Flash drive), and so forth, is provided and coupled to bus 802 for storing information and instructions.

Computer system 800 may be coupled via bus 802 to a display 812, such as a cathode ray tube (CRT) or LCD display (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (for example, x) and a second axis (for example, y), that allows the device to specify positions in a plane. In some embodiments, the same direction information and command selections as cursor control may be implemented via receiving touches on a touch screen without a cursor.

Computing system 800 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more instructions included in main memory 806. Such instructions may be read into main memory 806 from another storage medium, such as storage device 810. Execution of the sequences of instructions included in main memory 806 causes processor(s) 804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may retrieve and execute the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicate with a WAN). Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

Figure 9:
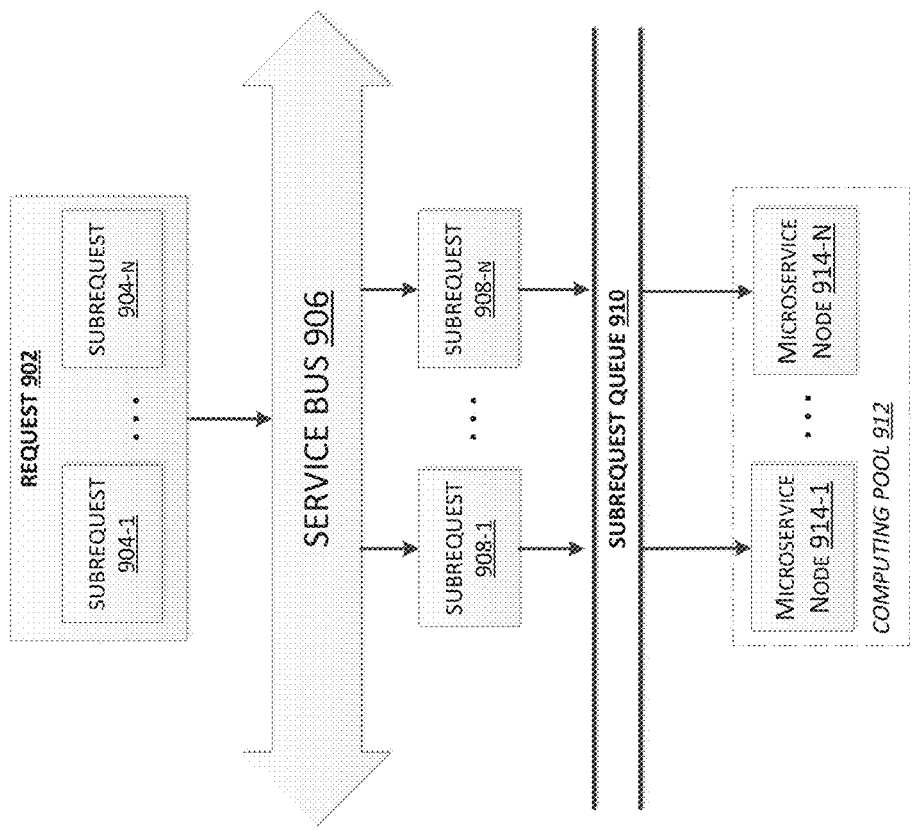
FIG. 9 is a block diagram that illustrates an example software architecture model upon which one embodiment of the system may be implemented.

FIG. 9 is a block diagram that illustrates an example software architecture model upon which an embodiment of the database system may be implemented. More specifically, the figure illustrates a service-oriented architecture patterned on an enterprise service bus model, upon which the database systems and methods described herein may be implemented.

It should be noted that the database system described herein may be implemented through any combination of hardware or software, and the software may follow any architectural model—not just the service-oriented architecture shown. However, embodiments of the database system implemented on a service-oriented architecture may provide numerous technological benefits, especially in regards to matching and determining associations between data items from various data sources. This approach utilizes a messaging paradigm and multiple, repeatable microservices so that the database system can be deterministic, reliable, fast, and highly scalable.

The service bus 906 may be configured to receive one or more requests 902, which may include subrequests 904-1 to 904-N. In some embodiments, a request 902 may be received from a user and it may include a contact database (e.g., a contact list) made up of a N-number of individual contacts, with each contact being one of subrequests 904-1 to 904-N. In some embodiments, the service bus 906 may be configured to accept a variety of requests 902 in different formats and convert them into the same format.

The service bus 906 may break down request 902 into individual subrequests 908-1 to 908-N and send those individual subrequests to a persistent subrequest queue 910, which queues individual subrequests resulting from all of the requests received by service bus 906.

There may be a computing pool 912 that includes one or more microservice nodes 914-1 to 914-N. In some embodiments, computing pool 912 may be a distributed computing platform or service, such as an enterprise cloud computing service. Any number of microservice nodes may be used, with each microservice node capable of processing a single subrequest from the subrequest queue 910 at a time. Additional microservice nodes may be added, which increases the rate that subrequests from subrequest queue 910 may be processed.

Subrequests from subrequest queue 910 may be processed through various microservices depending on the context that the database system is being implemented in. For example, if request 902 is a request from a user to import a contact list having 5000 contacts, the service bus 906 would treat each contact as a subrequest. Once the contact list is imported, the service bus 906 would separate the contact list out into the 5000 individual contacts. Individual contacts would then be queued into subrequest queue 910, where they can be dealt with by the microservice nodes 914-1 to 914-N. These microservice nodes may perform the processing needed to match each individual contact against data from a population database. More information regarding these microservices performed by the microservice nodes for evaluating the subrequests is provided in FIG. 10B.

This implementation architecture takes advantage of the fact that individual subrequests (e.g., contacts) can be evaluated and processed independently of one another. In this instance, individual contacts and their associated contact information get compared to data from a population database. Thus, there are many technological improvements from having each microservice node handle a separate subrequest. It makes the database system fast and highly scalable, since additional microservice nodes may be added to make the database system faster and increase the rate at which subrequests can be processed. Under this setup, the database system may be able to process thousands of contacts quickly. Additionally, this implementation architecture makes the database system deterministic and more reliable. If a single microservice node were to fail, the database system would continue to operate with the other microservice nodes continuing to process subrequests.

Figure 10A:
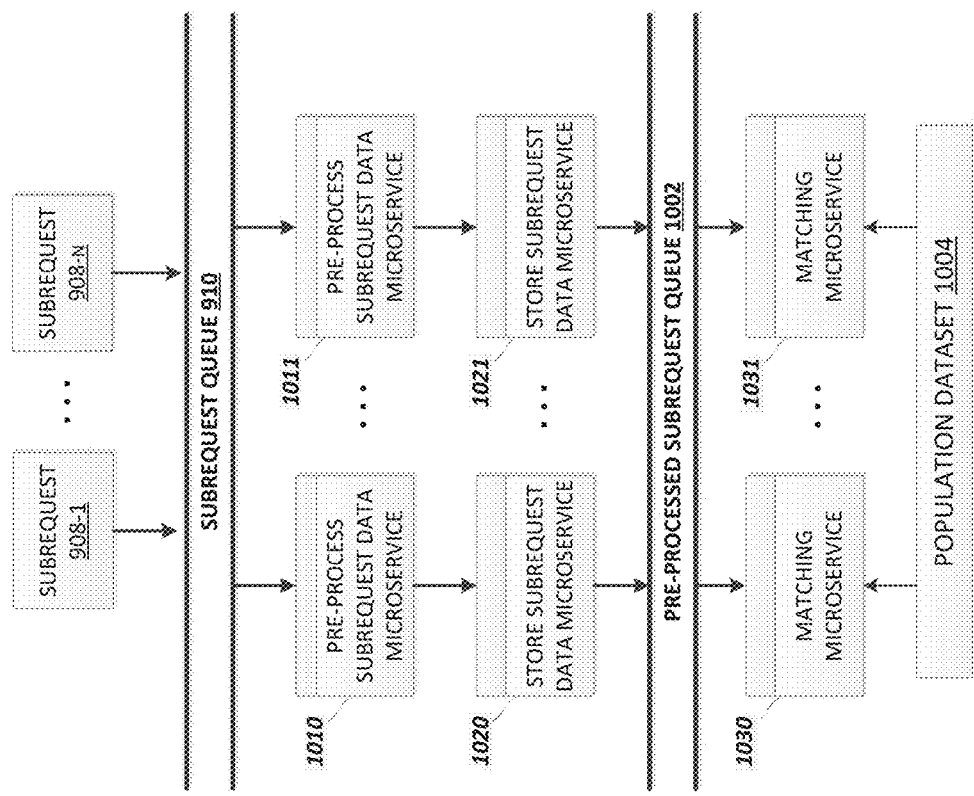
FIG. 10A is a block diagram that illustrates example processes performed in one embodiment of the system.

FIG. 10A is a block diagram that illustrates example processes performed under the example software architecture model of FIG. 9.

It should be noted that the various microservices may be performed across one or more microservice nodes, and the microservices may be distributed across those microservice nodes in any combination. In some embodiments, a single microservice node may be configured to handle one subrequest at a time by performing a variety of different microservices. In other embodiments, a single microservice node may be configured to perform a single type of microservice.

In this figure, once the individual subrequests 908-1 to 908-N are sent to subrequest queue 910, they are picked up by one or more microservice nodes. Each microservice node may handle a single subrequest at a time and perform a variety of microservices to process that subrequest. For example, one microservice node may utilize microservice 1010 in order to perform pre-processing on the subrequest data, utilize microservice 1020 to store that subrequest data, and then utilize microservice 1030 to determine data associations with the subrequest data. A separate microservice node may process a separate subrequest, utilizing microservice 1011 to perform pre-processing on the subrequest data, utilizing microservice 1021 to store that subrequest data, and then utilizing microservice 1031 to match data items in the subrequest data.

In some embodiments, the subrequests may be individual contacts and any associated contact information. A microservice 1010 would pre-process or clean the contact, such as by normalizing address fields in the contact information. In other words, microservice 1010 may format the contact information based on the formats used in population dataset 1004. For example, population dataset 1004 may abbreviate street names with "St.", while the address for a contact may use "Street". Microservice 1010 would change the address for the contact to be in line with the population dataset 1004. Afterwards, microservice 1020 may store the pre-processed contact in a database.

In some embodiments, the contacts may be sent to an optional pre-processed subrequest queue 1002, where they can be received by one or more microservices (e.g., microservices 1030 to 1031) configured to determine data associations with each contact based on the availability of those microservices—which may improve efficiency if the time needed to perform determination of data associations greatly varies between different contacts, or if the determination of data associations takes much more processing than the other microservices. In this scenario, microservices 1030 to 1031 would not need to be part of the same microservice node as any of the other microservices. Additional instances of microservices 1030 to 1031 can be opened up to improve the speed of the system if the determination of data associations becomes the bottleneck in processing the subrequests. In some embodiments, there is no pre-processed subrequest queue 1002. Microservice 1030 would, for example, receive the contact directly from microservice 1020 in a 1:1 hand-off.

Microservice 1030 may match a contact against the voters in the population dataset 1004. Additional information about the matching process is provided in regards to FIG. 3B. In some embodiments, if the contact is successfully matched to a voter, the microservice 1030 may assign the voter to a virtual precinct so that the data items for that voter can be integrated in a way that reflects the assigned virtual precinct.

Thus, as described throughout this application, the database system disclosed herein provides numerous technological and practical benefits associated with integrating data items from multiple sources by matching data items to determine related data items, generating associations for related data items, storing related data items and associations across multiple databases based on associations, and provisioning user access to those related data items using the associations.

More specifically, the database system provides for matching algorithms that allow for the accurate and efficient matching of data items across multiple data sources in order to automatically determine related data items, which reduces the need for a user to have to specify or confirm that the data items are related (as there may be thousands of data items). The system may determine the related data items by assessment of the strength or accuracy of the matches, along with the uniqueness of particular data items matched.

The matching efficiency is further improved by implementing the database system with a service-oriented architecture utilizing a messaging paradigm and a multiple of microservices, which makes the system faster, highly scalable based on the amount of data items needed to be processed and matched, more deterministic, and more reliable. In particular, the use of one or more queues accessible by microservices to process data items allows those data items to be simultaneously supplied from various users and data sources and quickly processed in parallel to reduce any bottlenecks associated with the matching process.

The database system also allows related data items retrieved from multiple data sources to be integrated by storing them across multiple internal databases along with associations. User-access to these data items may be provisioned based on these associations or how relevant the data items are to the user, allowing for different levels of access to be defined for related data items instead of defining access at the database level. This provides increases security and flexibility.

Figure 10B:
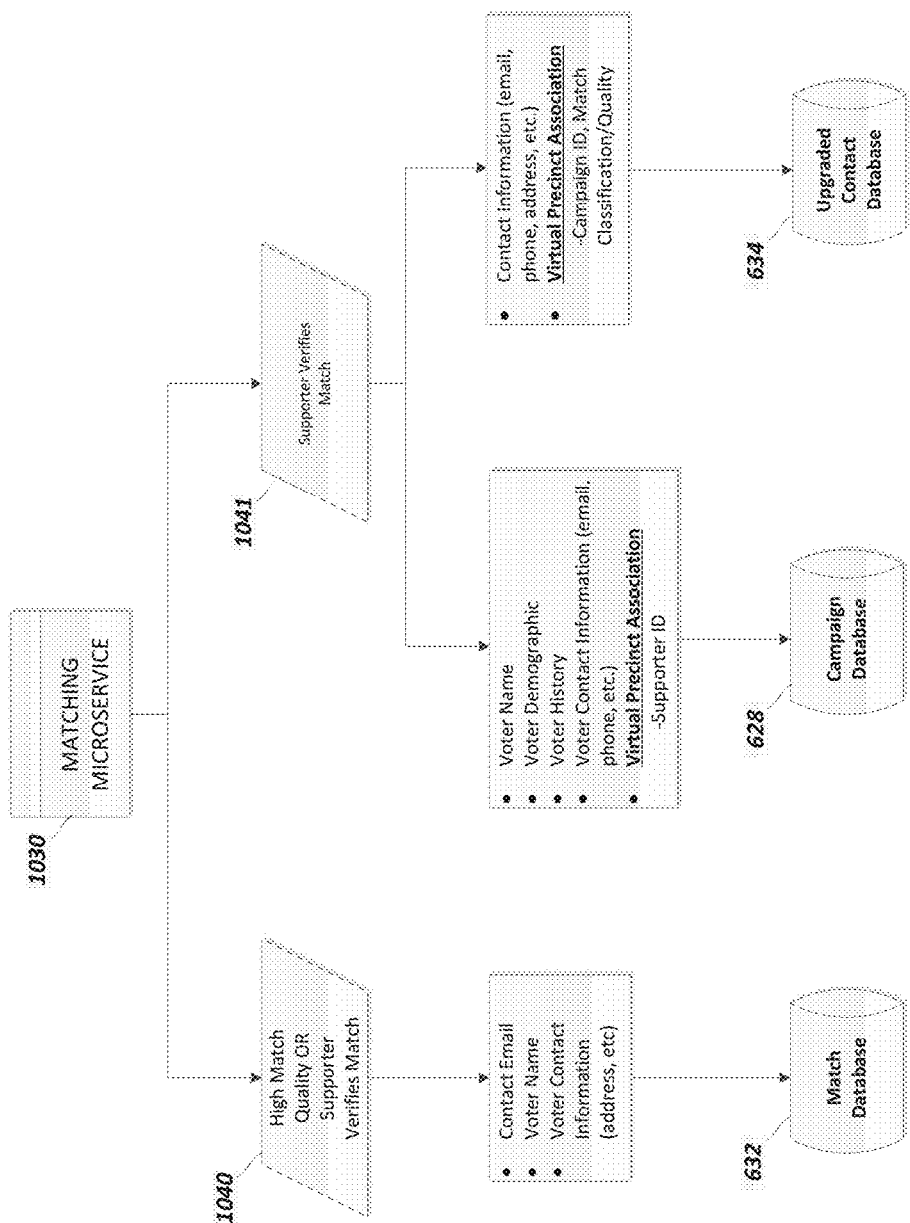
FIG. 10B is a block diagram that illustrates the integration of data items in one embodiment of the system.

FIG. 10B is a block diagram that illustrates the integration of data items in one embodiment of the system.

After microservice 1030 performs the matching of a contact against voters in a population dataset, there may be additional steps before the data items for the contact and the data items from the population dataset are integrated into the system. A match identified by the system will have varying accuracy depending on the matching technique or search rule used, as well as varying match quality that will also depend on the data items being matched. In some cases, the match may be of high match quality which suggests that match identified by the system has a high likelihood of being correct. Matches of lower quality may require the supporter that imported the contact dataset verify the match. In some cases, the supporter may be provided information from the population dataset in order to verify the match. For instance, the supporter may be provided the matched voter name and contact information from the population dataset, which can be compared to the name and contact information from the imported contact dataset.

At block 1041, once the supporter verifies the match, the related data items in includes contact information from the contact dataset and information from the population dataset may be integrated into system. As shown, the integration involves storing the related data items in separate databases. Associations are also generated between the related data items and stored with the data items in the separate databases. This allows the relationship between the data items to be preserved even when the data items are stored in separate databases, and it also provides a means for privacy by restricting user access to relevant data items based on those associations.

The voter name, demographic, history, and contact information from the population dataset are stored in the campaign database 628. A virtual precinct association is generated for those data items and also stored with those data items in the campaign database 628. This virtual precinct association is used as a link to the related data items that are stored in the upgraded contact database 634. The contact information from the contact dataset is stored in the upgraded contact database 634. A virtual precinct association is also generated for those data items and used as a link to the related data items stored in the campaign database 628. Thus, the corresponding virtual precinct associations in the campaign database 628 and the upgraded contact database 634 allow the contact information from the contact dataset that is related to the data items in the campaign database 628 to be easily located, even when that contact information is stored separately from those data items.

At block 1040, if the match between the contact and the population dataset is of high match quality, or once the supporter verifies the match, the contact email address from the contact dataset, as well as the voter name and contact information from the population dataset is added to the match database 632. Thus, the match database 632 stores data items from successful matches which can be used to improve further matches, such as by populating missing data items in imported contacts with data items from a previous match.

Figure 10C:
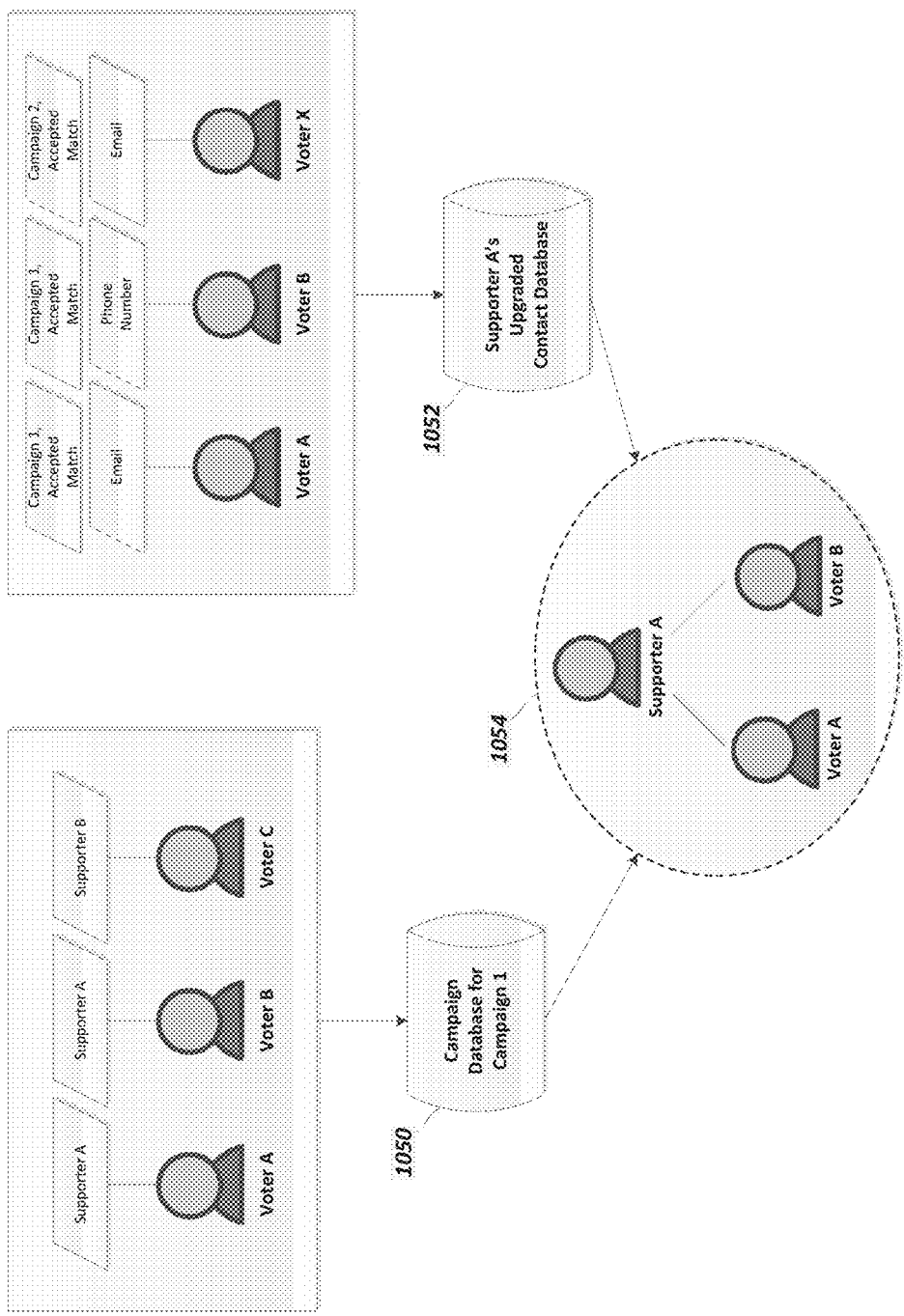
FIG. 10C illustrates the integration of data items in one embodiment of the system.

FIG. 10C illustrates the integration of data items in one embodiment of the system. More specifically, the figure illustrates abstractions of a virtual precinct and virtual precinct associations.

In the figure shown, the campaign database 1050 for Campaign 1 contains data items associated with individuals whose contact has been successfully matched to a voter. More specifically, the campaign database 1050 contains data items for Voter A, Voter B, and Voter C. Each voter may have one or more virtual precinct associations, but for the sake of simplicity each voter in the figure has only one virtual precinct association. Voter A's virtual precinct association is Supporter A, Voter B's virtual precinct association is Supporter A, and Voter C's virtual precinct association is Supporter B. Thus, Voter A and Voter B belong to Supporter A's virtual precinct and Voter C belongs to Supporter B's virtual precinct.

The upgraded contact database 1052 associated with Supporter A contains data items for individuals in the contact dataset imported by Supporter A, such as their contact information. As shown, the upgraded contact database 1052 contains data items for a Voter A, a Voter B, and a Voter X. The upgraded contact database 1052 has an email for Voter A, a phone number for Voter B, and an email for Voter X. This reflects the contact information that was available in the contact dataset imported by Supporter A, and it should be noted that Supporter A does not gain access to additional contact information that was not present in the imported contact dataset. For example, the upgraded contact database 1052 would not contain a phone number for Voter A that was not present in Supporter A's contact dataset but was provided in the contact dataset of different supporter. Thus, Supporter A is limited to contacting Voter A using the same contact information that Supporter A previously used to contact Voter A.

The upgraded contact database 1052 also contains one or more virtual precinct associations for each contact, since each contact could be relevant to more than one campaign. However, for the sake of simplicity, each contact is shown with a maximum of one virtual precinct association. Voter A's virtual precinct association states that Voter A was an accepted match in Campaign 1. Voter B's virtual precinct association also states that Voter B was an accepted match in Campaign 1. This means that Voter A and Voter B are part of Supporter A's virtual precinct in Campaign 1. It also means that related data items for Voter A and Voter B are stored in the campaign database 1050 for Campaign 1. Voter X's virtual precinct association states that Voter X was an accepted match in Campaign 2. This means that Voter X is part of Supporter A's virtual precinct in Campaign 2, which is separate from and unrelated to Campaign 1. Related data items for Voter X would be stored in a different campaign database specific to Campaign 2. Additionally, the upgraded contact database 1052 may also contain contact information for contacts, from any contact dataset imported by Supporter A, that have not been successfully matched for a campaign. For example, a contact may not be matched if the contact is outside the scope of the campaign, and thus the population database as well. A more specific example would be if the population database was limited to voters residing in a state and the contact was for an individual who lived outside the state, then there would be no match.

The virtual precinct associations result in the virtual precinct 1054, an abstraction of which is shown in the figure. A virtual precinct is a group that voters are assigned to, in which a supporter is tasked with managing the virtual precinct and sending messages to voters in their virtual precinct. The virtual precinct 1054 is Supporter A's virtual precinct within Campaign 1, and it contains Voter A and Voter B who are managed by Supporter A. The virtual precinct associations within the campaign database 1050 and the upgraded contact database 1052 serve as only one way in which a virtual precinct may be implemented. However, the virtual precinct associations as described herein allow related data items for the voters to be stored in separate databases while the relationship between those data items is maintained.

This allows for increased privacy and the ability to restrict user access to relevant data items, especially during the canvassing and distributed outreach process. Here, Voter A and Voter B have contact information in the upgraded contact database 1052, which is held separately from the other information for Voter A and Voter B stored in the campaign database 1050. A campaign manager does not have direct access to the contact information in the upgraded contact database 1052, and thus would not be able to contact Voter A and Voter B directly. However, the campaign manager could use the virtual precinct associations for Voter A and Voter B in the campaign database 1050 in order to determine that Voter A and Voter B belong to Supporter A's virtual precinct. Thus, Supporter A would have access to the contact information for Voter A and Voter B. The campaign manager could contact Supporter A and request that Supporter A relay a message to Voter A and Voter B.

Besides improved privacy, this feature also provides some practical, real-world benefits in the context of canvassing and distributed outreach. In this instance, Voter A and Voter B will receive a message from Supporter A, who they are already familiar with (presumably, since their contact information was in Supporter A's contact dataset). As a result, this message will carry more weight coming from a friend rather than from the campaign manager, who could be a stranger. Furthermore, a voter in a campaign may belong to more than one virtual precinct. That voter could receive multiple messages, one from each supporter that manages a virtual precinct the voter is a part of. In these cases, the recipient is more likely to read one of the messages and react favorably to it.

Figure 10D:
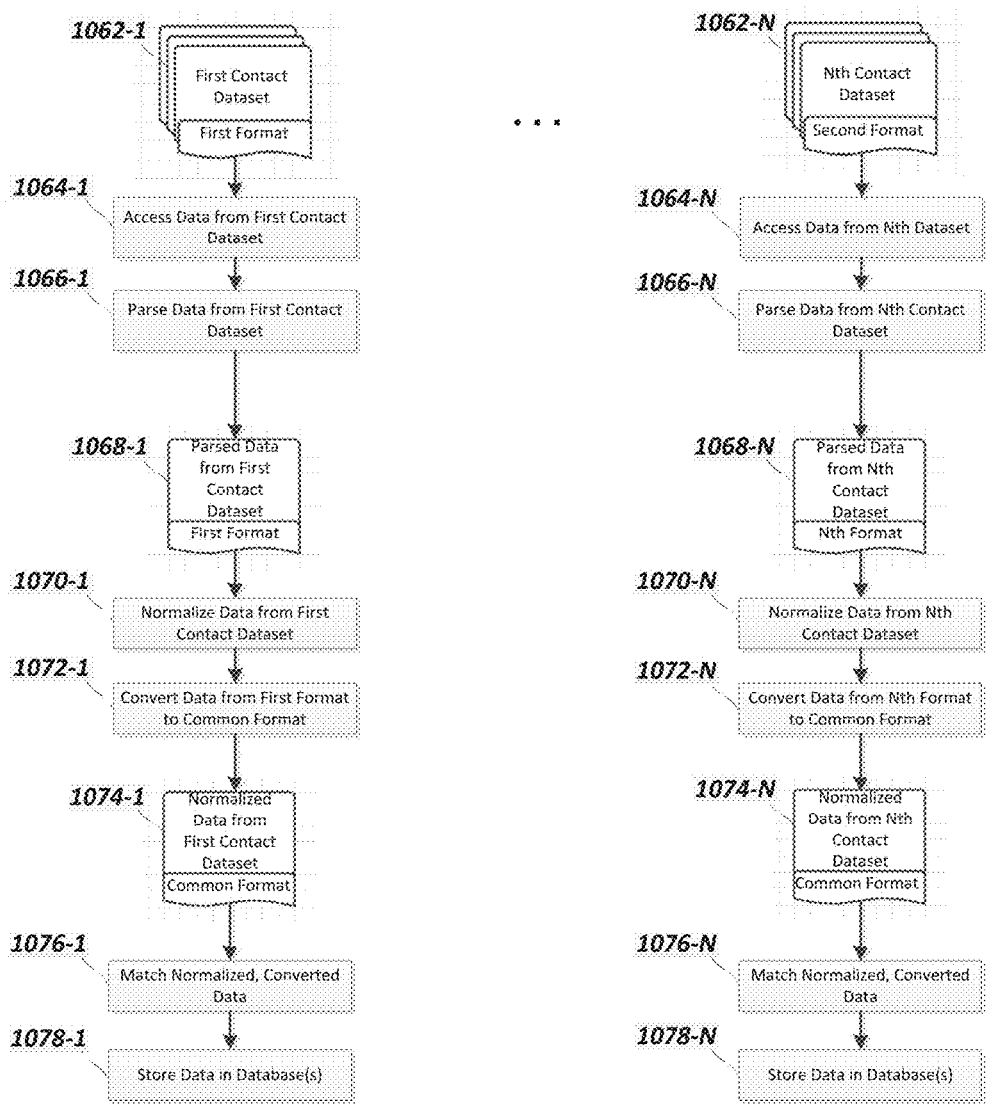
FIG. 10D is a flowchart illustrating an example operation in one embodiment of the database system.

FIG. 10D is a flowchart illustrating an example operation of one embodiment of the database system.

The system may be able to simultaneously access data items from a number of data sources, such as multiple contact datasets being imported by supporters. These multiple contact datasets are shown in the figure as contact datasets 1062-1 to 1062-N. As shown, there is a first contact dataset 1062-1 that provides data in a first format, and a Nth contact dataset 1062-N that provides data in a Nth format. In some cases, the data formats for these different contact datasets may be the same (e.g., the first format and the Nth format used by the first contact dataset and the Nth contact dataset may be the same). Some examples of data formats include plain text files (e.g., TXT), comma-separated text files (e.g., CSV), varian call format text files (e.g., VCF), spreadsheets (e.g., XLS), Extensible Markup Language (XML), and so forth.

At blocks 1064-1 to 1064-N, the system accesses data items from a particular contact dataset. As shown in block 1064-1, the system may access data items from the first contact dataset 1062-1 in the first format. At block 1064-N, the system may access data items from the Nth contact dataset 1062-N in the Nth format.

At blocks 1066-1 to 1066-N, the system parses any data items retrieved from the various contact datasets in order to produce parsed data 1068-1 to 1068-N. As shown in block 1066-1, the system may parse the data items retrieved from the first contact dataset 1062-1 in order to produce parsed data 1068-1. At block 1066-N, the system may parse the data items retrieved from the Nth contact dataset 1062-N in order to produce parsed data 1068-N. In some embodiments, a contact dataset may be parsed into the individual contacts within the contact dataset. As described previously, this allows the parsed data items for each individual contact to be processed separately and also allows for the use of microservices, resulting in improved speed, efficiency, and reliability.

At blocks 1070-1 to 1070-N, the system normalizes any data items retrieved from the various contact datasets. As shown, the parsed data 1068-1 to 1068-N from the various data sources may be normalized or pre-processed. For example, data items containing addresses may be normalized so that all the addresses containing the word "Street" are changed into the abbreviation "St." Any of the data items from the contact datasets may be changed into a common format that allows those data items to be easily compared to other data items. The normalizations performed may depend on the common format used for those data items, which can be arbitrary. The common format may also depend on the reference data items that will be used for comparison. In some embodiments, in which the contacts from the contact datasets are to be compared against a population dataset for matching purposes, the normalization may be performed on the data items in the contact datasets. Those data items may be normalized to be the same format as the data items in the population dataset, which allows for easy comparisons to be made.

Normalizing data items at this stage may improve the processing speed and efficiency of the system, especially if those data items are used repeatedly in comparisons. The system only needs to normalize those data items once, rather than having to do so repeatedly during the operation of the system. As shown in block 1070-1, the system normalizes the parsed data 1068-1 from the first contact dataset 1062-1. At block 1070-N, the system normalizes the parsed data 1068-N from the Nth contact dataset 1062-N.

At blocks 1072-1 to 1072-N, the system converts any data items retrieved from the various contact datasets into a common data format. In some embodiments, the system may be configured to perform analysis on data items that in a specific common data format, and the data may be integrated and stored internally in that common data format. A specific common data format may be chosen to improve processing speed, reduce storage size, allow for better data manipulation, and so forth. For example, the system may access data items from a contact dataset in a table format, such as a spreadsheet file. The file may take up more space and require more processing power to access than a different format, such as a tab-delineated text file. Thus, the system may take the contents of the spreadsheet and transfer them to a tab-delineated text file. At block 1072-1, the system may convert normalized, parsed data from the first contact dataset 1062-1 in the first format to the common format, in order to produce normalized data 1074-1 in the common format. At block 1072-N, the system may convert normalized, parsed data from the Nth contact dataset 1062-N in the Nth format to the common format, in order to produce normalized data 1074-N in the common format.

At blocks 1076-1 to 1076-N, the system may match the parsed, normalized and converted data items. For instance, a parsed set of data items may be for a single contact. After those data items have been normalized and converted, those data items may be easily compared to data items from a different database, such as a population database. Thus, the system may attempt to match data items to data items in the population database in order to determine related data items. At block 1076-1, the system may match the normalized, converted data items 1074-1 from the first contact dataset 1062-1 to data items in another database. At block 1076-N, the system may match the normalized, converted data items 1074-N from the Nth contact dataset 1062-N to database items in another database.

At blocks 1078-1 to 1078-N, once the system has matched data items to determine related data items, the system may integrate those related data items by storing those related data items across one or more databases. The system may also generate associations to be stored with the related data items, so that a relationship between the data items can be preserved even when they are stored across multiple databases. At block 1078-1, the system may store related data items, including the normalized data items 1074-1 from the first contact dataset 1062-1, and their associations across one or more databases. At block 1078-N, the system may store related data items, including the normalized data items 1074-N from the Nth contact dataset 1062-N, and their associations across one or more databases.

Figure 10E:
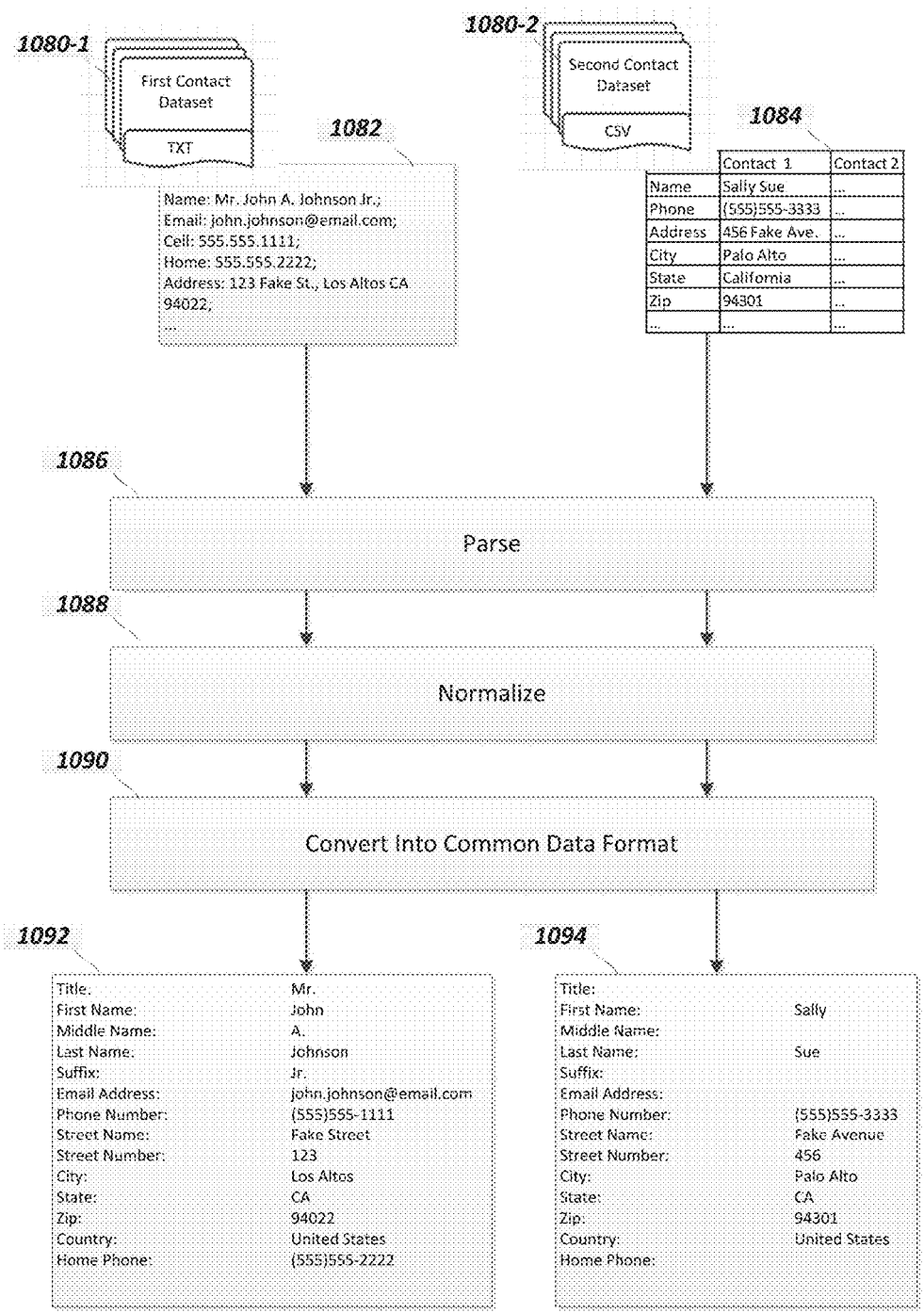
FIG. 10E is a flowchart illustrating an example operation of one embodiment of the system.

FIG. 10E is a flowchart illustrating an example operation of one embodiment of the system. More specifically, the figure illustrates two contact datasets of different formats being processed so that the data items can be integrated into the system under a common data format.

A first contact dataset 1080-1 may provide data items for contacts in a text format, which includes data items 1082. Data items 1082 are seen containing the name, email, cell phone number, home phone number, and address for a person named "John Johnson". The data items are separated out using semi-colons. It should be noted that the phone numbers are presented in a format using dots (e.g., 555.555.5555).

A second contact dataset 1080-2 may provide data items for contacts in a CSV format, which includes data items 1084. Data items 1084 are seen containing the name, phone, and address for a person named "Sally Sue". The data items can be seen as columns and rows of a table, although they could also be delineated by commas. It should be noted that the phone number is presented in a format using parentheses and dashes (e.g., (555)555-5555).

At block 1086, the system may parse the data items in the first contact dataset 1080-1 and the second contact dataset 1080-2, in order to obtain data items pertaining to individual contacts—such as data items 1082 and data items 1084. The system may also further parse the data items 1082 and data items 1084 in order to obtain the name of the contact, the email, and so forth.

At block 1088, the system may normalize the data items. For example, the system may recognize that the phone numbers in data items 1082 are presented using dots and instead change them to the format using parentheses and dashes. The address in data items 1082 uses the abbreviation "St.", which could be changed to "Street". The address in data items 1084 contains the abbreviation "Ave.", which could be changed to "Avenue".

At block 1090, the data items may be converted into a common data format. For example, it is hard to directly compare the data items 1082 and data items 1084. The information provided in each field varies and it is not readily apparent what information is missing in either the data items 1082 or the data items 1084. Thus, the system may convert the data items into a common, internal format. As shown, the data items are converted into the data items 1092 and the data items 1094, which have a tab-delineated format.

In the data items 1092 and the data items 1094, the name field is broken up into title, first name, middle name, last name, and suffix. Thus, the name provided in data items 1082 of "Mr. John A. Johnson Jr." can be separated out in those components when converted for the data items 1092. The data items 1092 and the data items 1094 can be seen also containing fields for email address, phone number, street name, street number, city, state, zip, country, and home phone number. Once the data items 1084 have been converted into the common format of the data items 1094, any missing information in the data items 1084 becomes readily apparent. For example, there is no title, middle name, suffix, email address, or home phone number available for "Sally Sue". If hypothetically, the data items 1092 had to be matched to the data items 1094, it is quickly determined that the common data items available for matching include the first name, the last name, the phone number, the street name, the street number, the city, the state, the zip, and the country.

Once the data items are in a common data format, the system may integrate these data items internally, along with any associations, by storing the data items within one or more databases. The example common data format shown in the illustration is for example purposes only, and may not be reflective of how the data items are actually stored within the various databases described herein. The data format may be any internal canonical format.

Example User Interfaces (FIGS. 11-23)

Figure 11:
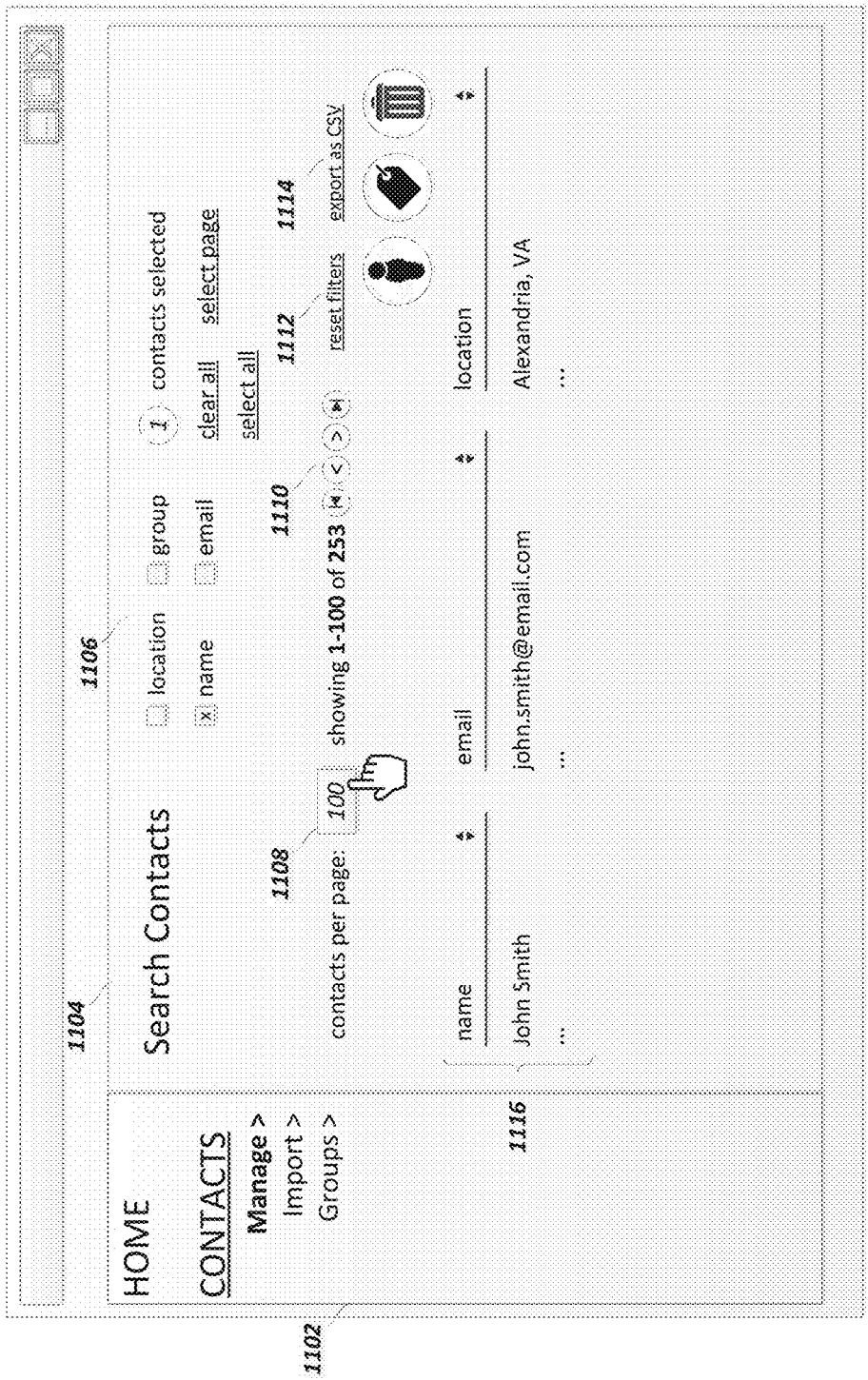

FIG. 11 is an example user interface in one embodiment of the database system.

In particular, FIG. 11 illustrates a user interface that allows contacts to be managed by a user, such as by a campaign manager. Window 1102 shows a menu associated with available options for the user. Clicking "Home" may bring the user to a home screen or dashboard. Under "Contacts", the menu presents the user with the ability to "Manage" or "Import" contacts. The menu also allows the user to manage "Groups" associated with any contacts. Window 1104 presents a user interface associated with managing contacts and searching through the list of contacts that have already been imported by the system. Checkboxes 1106 allow a user to filter through the contacts by location, name, group, email, and so forth. Field 1108 allows a user to set the number of contacts to show per page, while Buttons 1110 allow the user to navigate through the pages of contacts displayed below. Button 1112 allows the user to reset any filters applied to the list of contacts and Button 1114 allows the user to export the list of contacts as a CSV file.

User interface element 1116 shows a page of the resulting list of contacts associated with the user after any search filters have been applied. As shown in the figure, the name, email, and location of each contact is provided. For example, one contact has the name "John Smith", with the email "john.smith@email.com", and the location of "Alexandria, Va.". The contacts shown in user interface element 1116 can be re-arranged in order of name, email, and/or location. Thus, the user can utilize user interface element 116 in order to browse through the contacts in order to edit or delete specific contacts.

Figure 12:

FIG. 12 is an example user interface in one embodiment of the database system.

In particular, FIG. 12 illustrates a user interface through which contacts may be imported by a user, such as by a campaign manager. Window 1202 is configured to allow contacts to be imported from spreadsheets or CSV files. By clicking button 1204, a user may upload one of the supported file types containing a list of contacts and their associated contact information. The system may then take each of those contacts and match them against a population database as described in regards to FIG. 3B. Window 1208 may provide the user with additional information regarding the import procedure, such as the steps needed to obtain the CSV file (or any other supported format file) containing the desired contacts. Window 1206 may be configured to allow the user to import saved contacts from an external contact provider. In some embodiments, the contacts will be imported from a saved list of contacts associated with an account at an external email provider. For example, external providers #1-4 may be a list of various external email providers that the system has been pre-configured to interface with and download contacts from. As an even more specific example, the system may be pre-configured to grab contacts from Gmail accounts. The user may click Gmail as the external provider in Window 1206 and be presented the ability to seamlessly import contacts from the address book in their Gmail account without having to access the Gmail website and manually downloading those contacts (e.g., exporting them to CSV).

Figure 13:
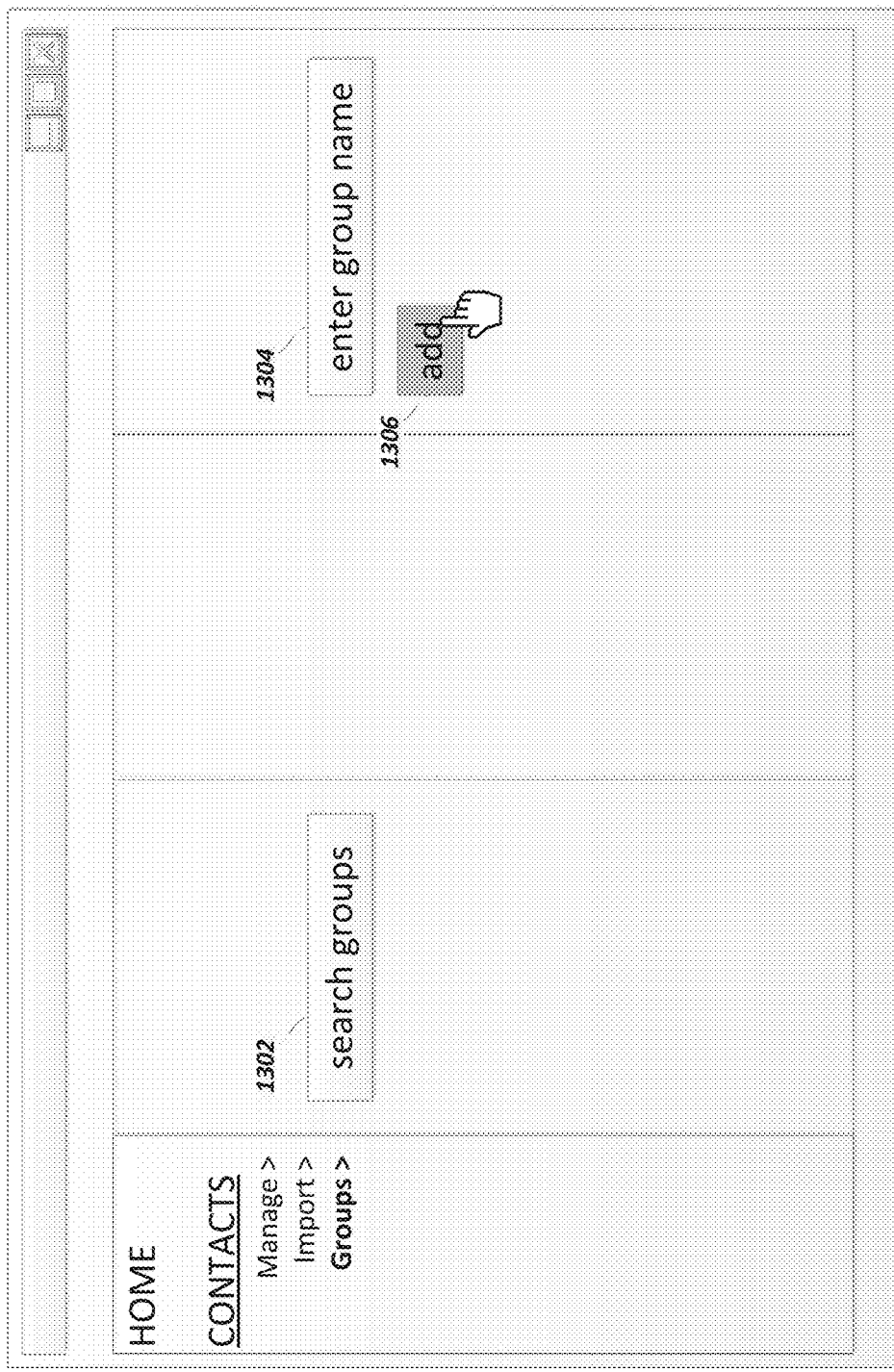

FIG. 13 is an example user interface in one embodiment of the database system. In particular, FIG. 13 illustrates a user interface that allows contacts to be grouped (e.g., by interest) by a supporter.

Field 1302 may be a searchable text field. The user may be able to type in the name of a group and the system may search for that group name through the entire list of available groups. Field 1304 is another text field that allows a user to specify the name for a new group of contacts. Once the user has typed in the desired name for the group into field 1304, the user may click button 1306 in order to add that group into the list of available groups.

Figure 14:
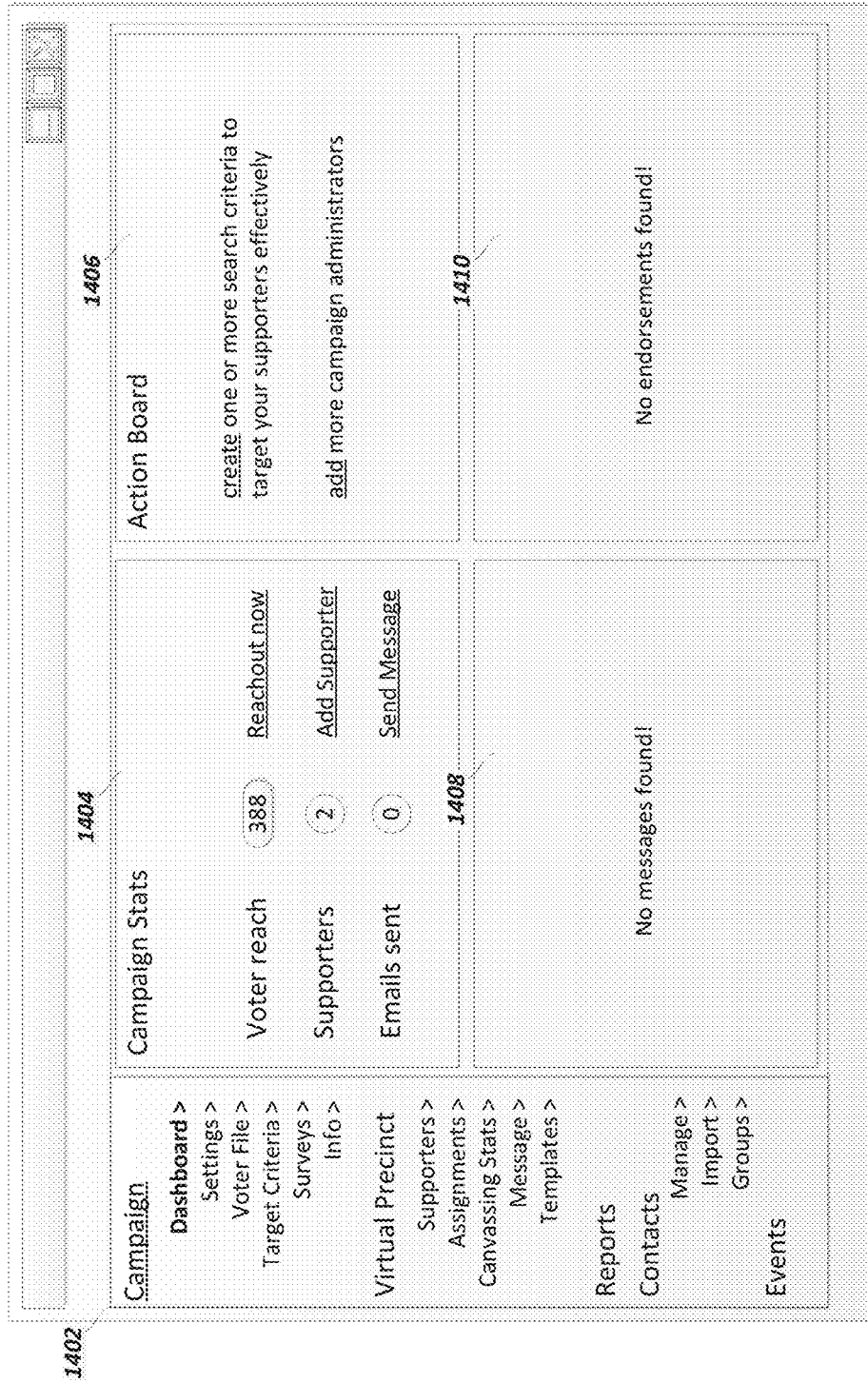

FIG. 14 is an example user interface in one embodiment of the database system.

In particular, FIG. 14 illustrates a user interface for a dashboard that a user, such as a campaign manager, would be presented with. Window 1402 shows a menu associated with available options for the user. Various menu headings are shown, which include "Campaign", "Virtual Precinct", "Reports", "Contacts", and "Events". The Under the "Campaign" heading, clicking "Dashboard" may bring the user to the dashboard currently shown in the figure. Clicking "Settings" may allow the user to modify the settings for the campaign. Clicking "Target Criteria" may allow the user to create a list of target criteria to perform a proxy search of the voters with, and the user interface associated with that option is shown in more detail in FIG. 15.

Under the "Virtual Precinct" heading, clicking "Supporters" may allow the user to browse or search through the list of available supporters for the campaign. The user interface associated with that option is shown in more detail in FIG. 18. Clicking "Assignments" may allow the user to see the assignments of the various voters and the assignment method used. In other words, the virtual precinct and the supporter that each voter is assigned to can be viewed along with the method used to create that assignment. The user interface associated with that option is shown in more detail in FIG. 17. Clicking "Message" may allow the user to create a draft message to be sent out to supporters who, in turn, send out a modified version of that message to voters. The user may be able to set various parameters associated with the message, as well as select a target group of voter recipients based on pre-defined target criteria. The user interface associated with that option is shown in more detail in FIG. 16.

In the figure shown, window 1404 provides the user a summary of campaign stats. The user can see the number of supporters, the number of voters, and the amount of emails sent—all in a quick glance. Links are provided for the user to quickly go to the user interfaces associated with increasing voter reach, adding supporters, or sending a message. The user may click these links to be brought to the same user interfaces that the menu options in window 1402 link to.

Window 1406 provides the user a list of action items for the campaign. For example, the window 1406 shown informs the user that they can create one or more search criteria to target supporters effectively, or add more campaign administrators. Links are also provided for the user to go to the user interfaces associated with specifying target criteria (e.g. FIG. 15) or adding campaign administrators. Thus, window 1406 may serve as a way to guide or instruct a user seeking to familiarize themselves with the system, provide helpful hints to the user, and describe the next steps in setting up use of the system.

Window 1408 provides the user information about messages associated with the campaign. The information may be associated with messages sent to supporters or voters, and/or messages received by the user. For example, supporters may message a campaign manager feedback about the campaign and that feedback would show up in window 1408 and catch the attention of the campaign manager. Finally, window 1410 provides the user information about any endorsements associated with the campaign.

Figure 15:
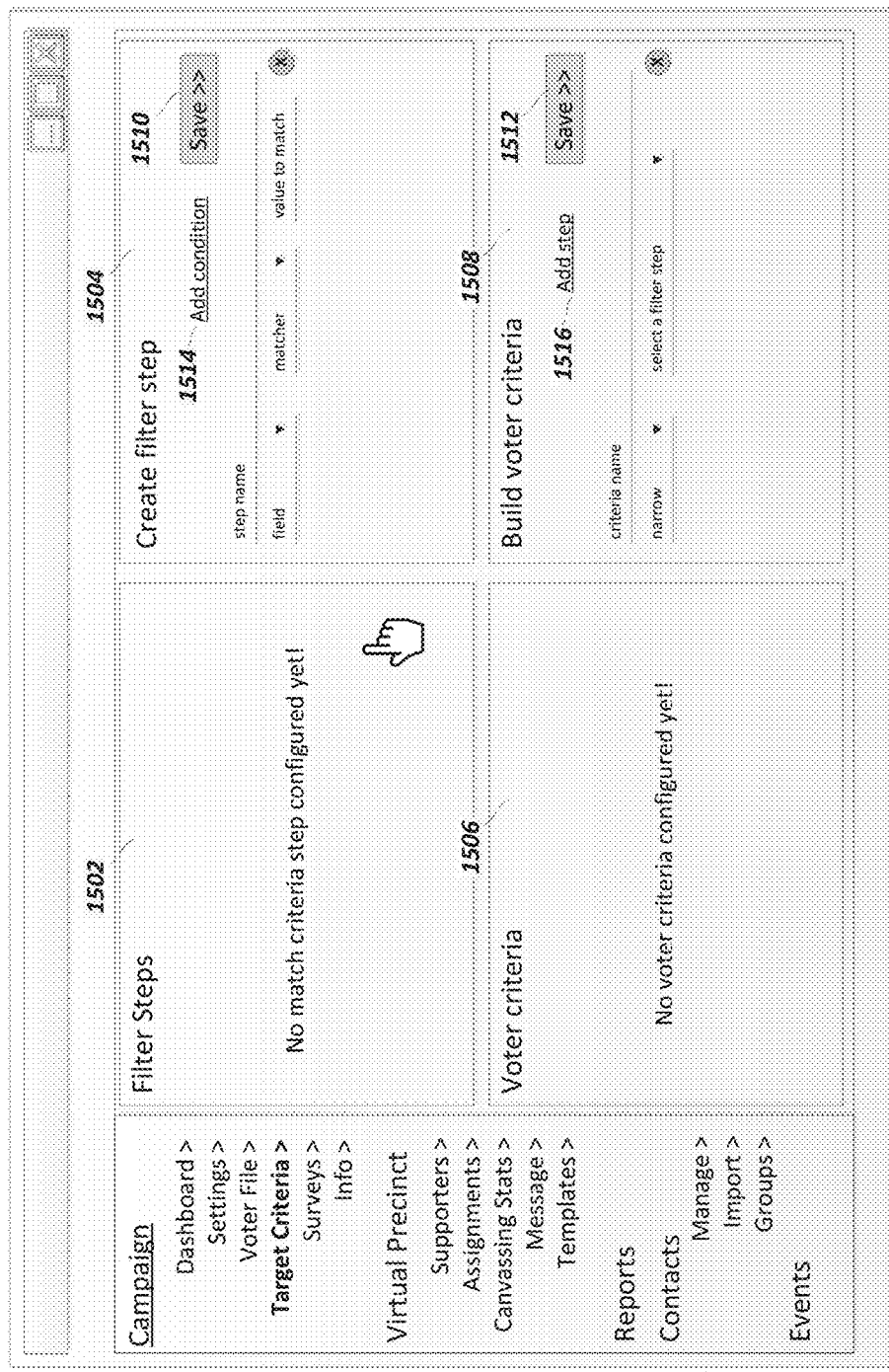

FIG. 15 is an example user interface in one embodiment of the database system.

In particular, FIG. 15 illustrates a user interface that allows a user, such as a campaign manager, to define search filters and target criteria in order to message voters that fit a specific set of target criteria.

At window 1502, the user may see a list of available filter steps. As shown, there are no filter steps defined within the campaign. At window 1504, the user may be able to create a new filter step. The filter step may be defined by a set of conditions and clicking button 1514 may add an additional condition to the filter step. The available conditions that may be defined by the user include any known parameter associated with the voters. For example, from the population database used to match voters with contacts, the system may obtain information regarding the voter's age, their location, and so forth. Thus, the user may create a filter step to filter for voters having an age between 20 years old and 30 years old, along with any other conditions. After naming the filter step, clicking button 1510 may save the filter step defined by the user and that saved filter step may show up in window 1502.

At window 1506, the user may see a list of available target criteria for voters (shown here as "voter criteria"). As shown, there are currently no voter criteria configured for use. At window 1508, the user may be able to build a set of voter criteria from the available filter steps. Clicking button 1516 may add an additional filter step to the voter criteria. The user may be able to specify each filter step to be used in the voter criteria. For example, the user may add a filter step to filter for voters having an age between 18 years old and 30 years old. The user may also add a filter step for voters within the state of Virginia if the locations of the voters are available as a filter condition (e.g., the system is configured to look for Virginia zip codes in the zip codes obtained from the population database). The user could name this set of voter criteria as "Young Voters in Virginia", and the voter criteria would be useable in the future to send targeted messages to voters in Virginia between 18-30 years old. After naming the voter criteria, clicking button 1512 may save the voter criteria defined by the user and that saved voter criteria may show up in window 1506.

Figure 16:
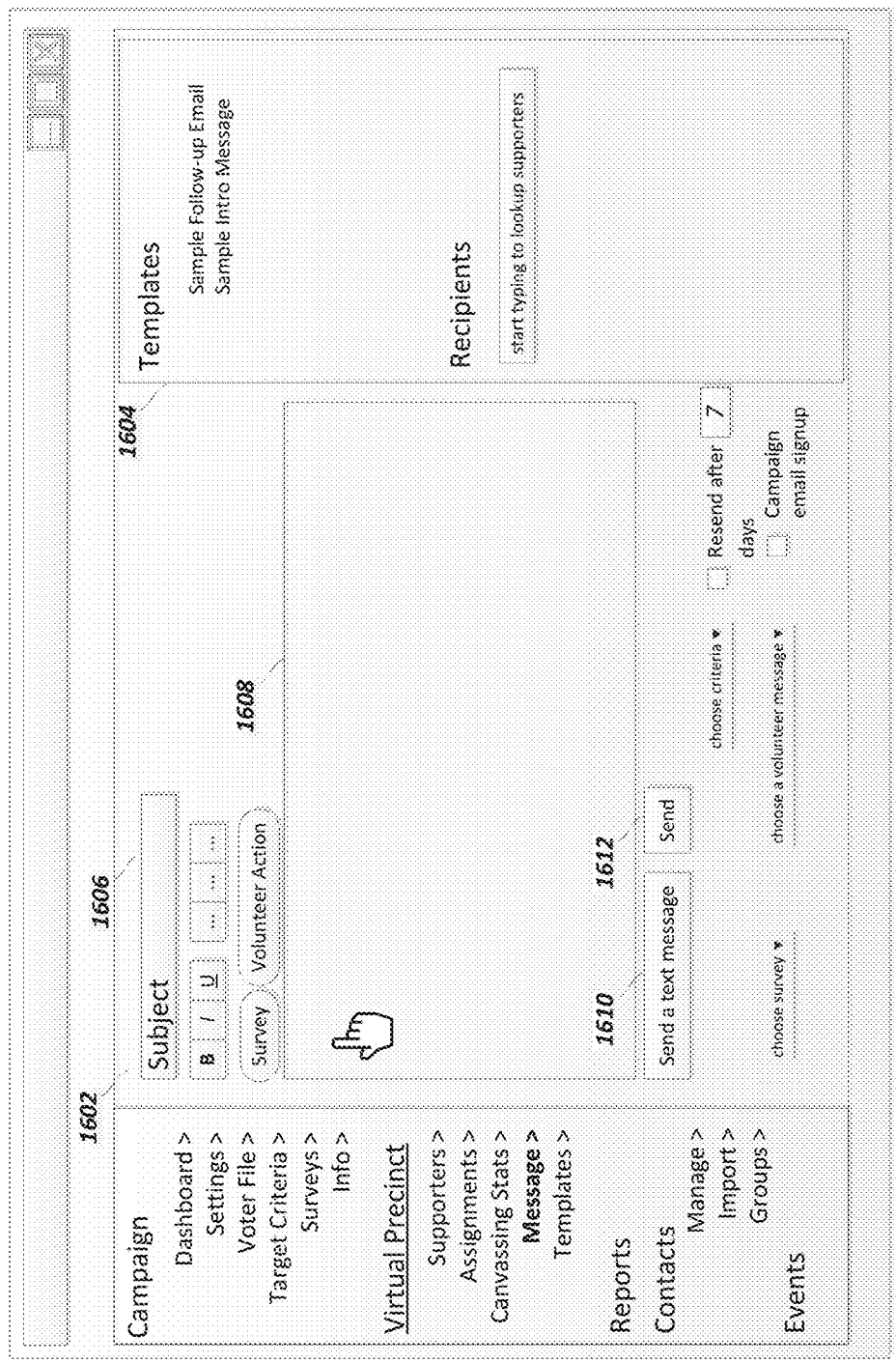

FIG. 16 is an example user interface in one embodiment of the database system.

In particular, FIG. 16 illustrates a user interface in which a user, such as a campaign manager, can draft a message to be sent out. In some embodiments, the message may be sent out to supporters, who may further customize the message before it is ultimately sent to the voters as the end-recipients.

In window 1602, the user may be able to create a draft message and select various parameters associated with the message. For example, window 1602 contains field 1606, in which the user could specify a subject for the message. In field 1608, the user could draft the message to be sent out. The user interface may show the message in typical what-you-see-is-what-you-get (WYSIWYG) fashion, and window 1602 may contain various tools that the user can use to stylize the draft message. As shown, window 1602 includes options for the user to bold, italicize, or underline text in the message, as well as any other options associated with word processors or text editors. Furthermore, window 1602 provides the options for the user to specify a survey to send within the message, how many days before resending the message (if it is to be resent at all), and whether the message will request the recipient to sign up to the campaign with their email. Furthermore, window 1602 also provides the user the ability to select previously defined voter criteria in order to target a specific group of voters, such as any voter criteria defined in the example user interface shown in FIG. 15.

The user may also be able to choose a specific message template for the draft message to work off of. There may be user interfaces, which can be accessed through the leftside menu (e.g., window 1402), that allow a user to define custom message templates. As shown in the figure, window 1604 shows some available message templates that include a sample follow-up email, as well as a sample intro message. If the user decides to use a template, the field 1608 may be populated with the template and the user may proceed to customize the text in field 1608. Window 1604 may also show a list of recipients, or categories of recipients, that are configured to receive the message. There may be a searchable text field that the user can use to lookup supporters to specify as recipients for the message. In some embodiments, once the user selects a voter criteria, the voter recipients or the voter criteria itself may be displayed under recipients in window 1604.

Once the user is satisfied with the draft message, the parameters of the message, and the desired recipients, the user may click button 1612 in order to send out the message to the recipients. The system may be configured to send that message out to the recipients, such as to the email accounts for those recipients. In some embodiments, if the recipients have an account with the system they may be able to receive and view the message through a user interface provided by the system. Alternatively, the user may click button 1610 in order to send out a text message (SMS) to the recipients. The system may be configured to automatically send that text message out to the phone numbers associated with the recipients (e.g., over a tele-communications network). Thus, the system is not limited to automatically reaching out to recipients solely through email and/or the Internet—any electronic communications method may be used, including ones not contemplated by this disclosure. These examples show how the proper association and grouping of data items (in this case, contacts and unique individuals) can be leveraged by in various ways—here, the system is further able to seamlessly integrate various methods of canvassing (e.g., email, SMS, phone, and so forth) and distributed voter outreach on top of the processing of data items.

Figure 17:
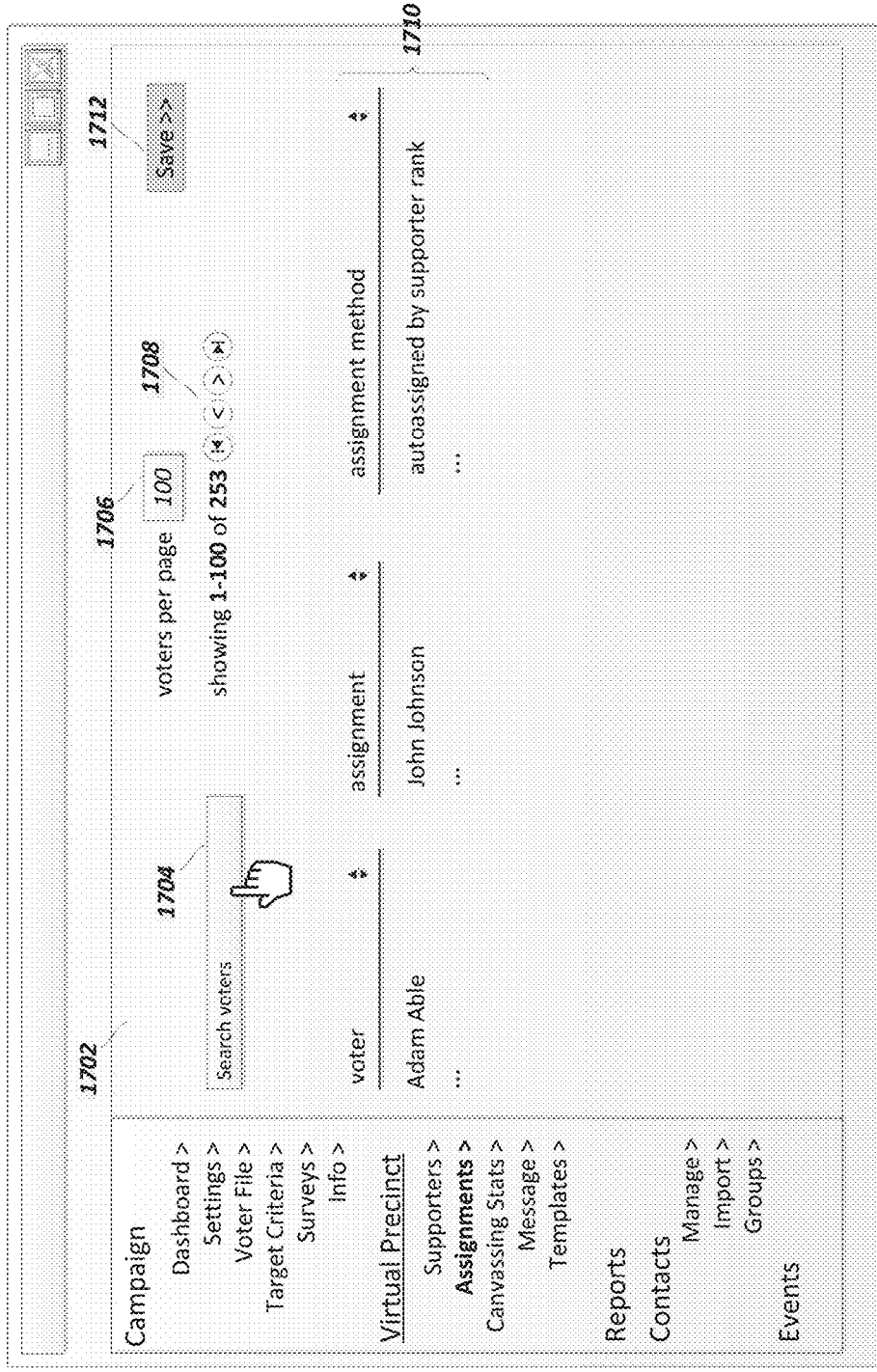

FIG. 17 is an example user interface in one embodiment of the database system.

In particular, FIG. 17 illustrates a user interface that allows a user, such as a campaign manager, to view the virtual precinct that each voter has been assigned to, as well as how that voter was assigned. Window 1702 provides a a list of voters associated with the campaign. Field 1704 is a searchable text field that the user can use to find a specific voter by typing a portion of the voter's name. Field 1706 is a text field that the user can specify how many voters to display on the page, while buttons 1708 allow the user to navigate the pages of voters.

User interface element 1710 presents the list of voters, as well as the supporter they are assigned to and the assignment method used. User interface element 1710 can be used to view the voters organized by name, the name of the assigned supporter, and assignment method. In the case where the voters are assigned to virtual precincts and a single supporter is in charge of a virtual precinct, the assigned supporter also informs which virtual precinct the voter has been assigned to. It is important to note that the voter's contact information are noticeable absent. The campaign manager cannot message voters directly, which protects the privacy of the voters while improving the efficacy of the system (such as by preventing campaign managers from spamming the voters with emails). Within user interface element 1710, the user may be able to change the assignment of a voter. For example, the illustration shows a voter with the name "Adam Able" who has been assigned to "John Johnson" through auto assignment. The user may be able to manually override "John Johnson" and reassign "Adam Able" to another supporter. Afterwards, the user may click button 1712 in order to save changes to all of the voter assignments.

FIG. 18 is an example user interface in one embodiment of the database system.

In particular, FIG. 18 illustrates a user interface that allows a user, such as a campaign manager, to view all the supporters for the campaign.

Window 1802 presents a list of supporters that are associated with the campaign. Within window 1802 is field 1804, which is a searchable text field in which the user may type a portion of the name (or email) of a supporter in order to narrow down the displayed supporters in element 1812 to matching supporters. At checkboxes 1806, the user may specify whether to filter through the supporters by name, email, and so forth. Field 1808 allows the user to specify how many supporters are displayed by page, while buttons 1810 allow the user to navigate between the pages of supporters. Within user element 1812, a paginated list of supporters is provided. The ranks of the supporters are visible, along with the supporter's name/email and how many voters are in that supporter's virtual precinct. For example, the supporter "John Johnson" has a rank of 1 and has 361 voters assigned to their precinct.

Figure 19:
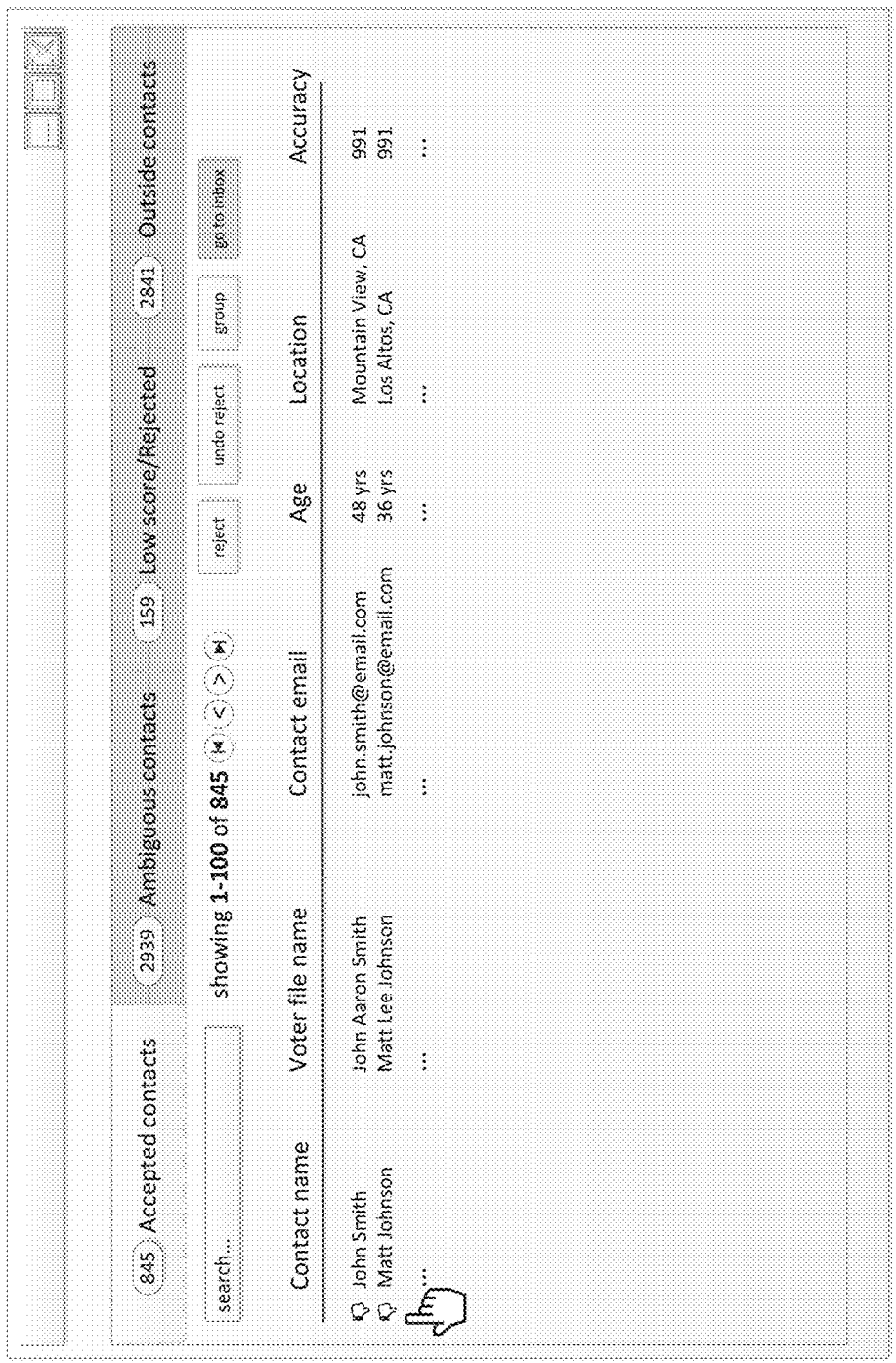

FIG. 19 is an example user interface in one embodiment of the system.

In particular, FIG. 19 illustrates a user interface that allows matches to be re-classified and verified by a user, such as by a supporter.

The user interface shown has selectable tabs to display "Accepted Contacts", "Ambiguous Contacts", "Low Score/Rejected Contacts", and "Outside Contacts". The "Accepted Contacts" tab is selected, which means the user interface is displaying the contacts that have been successfully matched to a voter in the population database. A successful match could be result of the system determining a high match quality between the contact and the voter, with the user verifying that match through this user interface. A successful match could also be the result of the system matching the contact to a few potential voters, classifying those matches under "Ambiguous Contacts", and the user selecting the correct match for the contact from those identified voters.

Once the match has been verified by the user, the details of the match are listed in this user interface. For example, the user interface shows a combination of data items from the contact dataset and the population dataset for the matches. A contact having the name "John Smith" and the contact email "john.smith@email.com" was matched with a voter in the population database having the name "John Aaron Smith". The age and location of that voter is also taken from the population database and released to the user, so that the user can make a better-informed decision on whether that contact is matched to the correct voter. The user interface may also display an accuracy associated with the match, and that accuracy may be dependent on the search rule or technique used to determine the match between the data items in the contact dataset and the data items in the population dataset. Higher accuracies may be associated with a higher likelihood that the system has automatically determined a successful match on its own.

FIG. 20 is an example user interface in one embodiment of the system.

In particular, FIG. 20 illustrates a user interface that allows matches to be re-classified and verified by a user, such as by a supporter.

The user interface shown has the "Ambiguous Contacts" tab selected, which means that the user interface is displaying the contacts that the system determined as having multiple voters as potential matches. For example, there may not be enough data items (e.g., types of contact information) in the contact dataset to narrow down the match to a single voter. For instance, this could happen if the contact only included a name and an email address. In some cases, the data items in the contact dataset may be quite common in the population dataset. For example, the contact may have a very common name that many voters in the population dataset have. As a result, the match is considered to be ambiguous.

In this user interface, information for the imported contact is provided alongside corresponding information from the potential matches, which is taken from the population dataset. For instance, the user in this case has provided the contact with the name "Gary Oldman" and the email of "gary.oldman@email.com". This person is 48 years old and lives in Mountain View, Calif. The system has determined that this contact could be matching a voter with the name "Gary Matt Oldman", the email "gary.m.oldman@email.com", the age of 49 years, and who lives in Palo Alto, Calif. The system has also determined that this contact could be matching a voter with the name "Gary Lee Oldman", the email "gl.oldman@email.com", the age of 52 years, and who lives in San Francisco, Calif. The user may determine which voter is the correct match and inform the system. A corrected match may be moved into "Accepted contacts". If the user cannot determine which voter is the correct match, the contact and the potential voters may stay in "Ambiguous contacts", or they could even be reclassified under "Low score/Rejected" if the user determines that none of the voters provided by the system match that contact.

FIG. 21 is an example user interface in one embodiment of the system.

In particular, FIG. 21 illustrates a user interface that allows matches to be re-classified and verified by a user, such as by a supporter.

The user interface shown has the "Low score/Rejected" tab selected, which means that the user interface is displaying the contacts that the system was either unable to match, or any matches that were rejected by the user. In the first case, the system may determine that a match was not found if no match exists, or if the accuracy of the match is too low and is below some threshold. In the second case, the user may see a match with voters in the "Accepted contacts" or with multiple potential voters in the "Ambiguous contacts" and determine that the match is incorrect. The user may click on a button in the user interface, which would move those contacts into this "Low score/Rejected" category.

Within this user interface shown, it can be seen that the contact of "Claire Matthews" was matched to a voter with the name "Clarence Matthews" having an age of 32 years and living in Mountain View, Calif. This is presumably not the same person, which is why the match is in the "Low score/Rejected" category. However, if for some reason the user determines that the match was actually correct (e.g., Claire and Clarence are the same person), then the user may click the button left of the name in this user interface in order to reclassify the match under "Accepted contacts".

Figure 22:
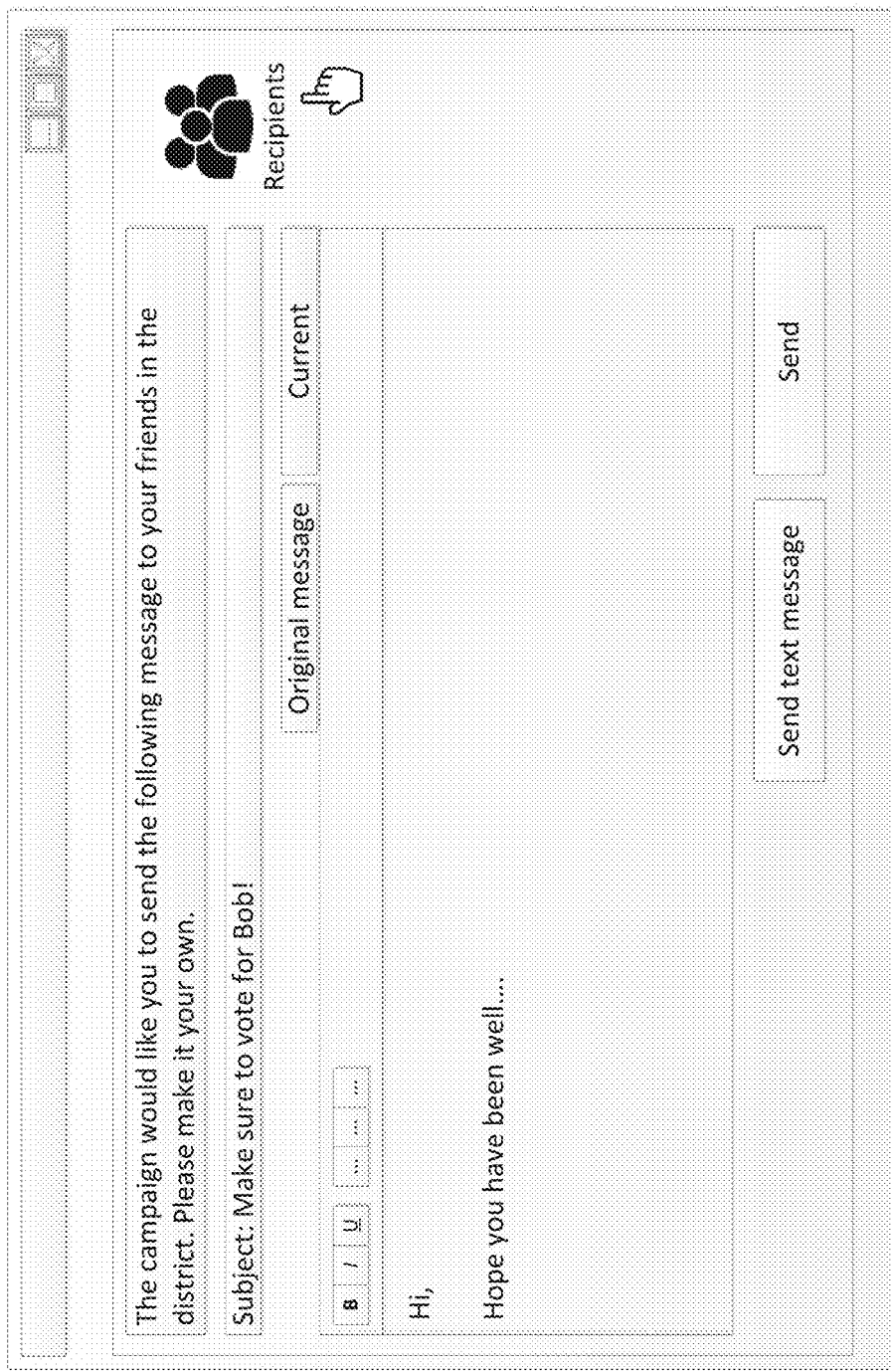

FIG. 22 is an example user interface in one embodiment of the system.

In particular, FIG. 22 illustrates a user interface that allows a user, such as a supporter, to receive and relay messages from the campaign manager. This figure may be better understood in the context of FIG. 16, which shows a user interface that the campaign manager may use to send messages to the supporter to be relayed to recipient voters.

A campaign manager may draft a message to target a specific group of voters, but the campaign manager cannot send the message directly. Instead, the messages must be sent by the supporters that manage the virtual precincts that each of those voters belong to. Thus, a supporter both manages their own virtual precinct and acts as a contact liaison for any voters belonging to their virtual precinct. The system can identify the virtual precincts each target voter belongs to, and then the campaign manager can send out the draft message to the supporters managing those virtual precincts for the supporters to resend to the target voters. Thus, each supporter is receiving both a message drafted by the campaign manager and a recipient list that includes the target voters within their virtual precinct.

As seen in the figure, the supporter has received a message drafted by the campaign manager with a subject line and a body. The user interface informs the user that the message can be customized and provides editing tools for customizing the message. Buttons are also available to see and compare the original draft message and the customized message. Within this user interface, the supporter can customize the message and tailor it towards the intended recipients. For example, the supporter may want to make the message less formal and make it seem like the supporter drafted the message to be sent out rather than the message being drafted by the campaign manager. After customizing the message, the supporter may then send out the message to the target voters in their virtual precinct (e.g., the recipients in the recipient list). There may be a button or option that allows the supporter to view the recipients of the message. Selecting that option may bring up a list, such as the one shown in FIG. 23.

Figure 23:
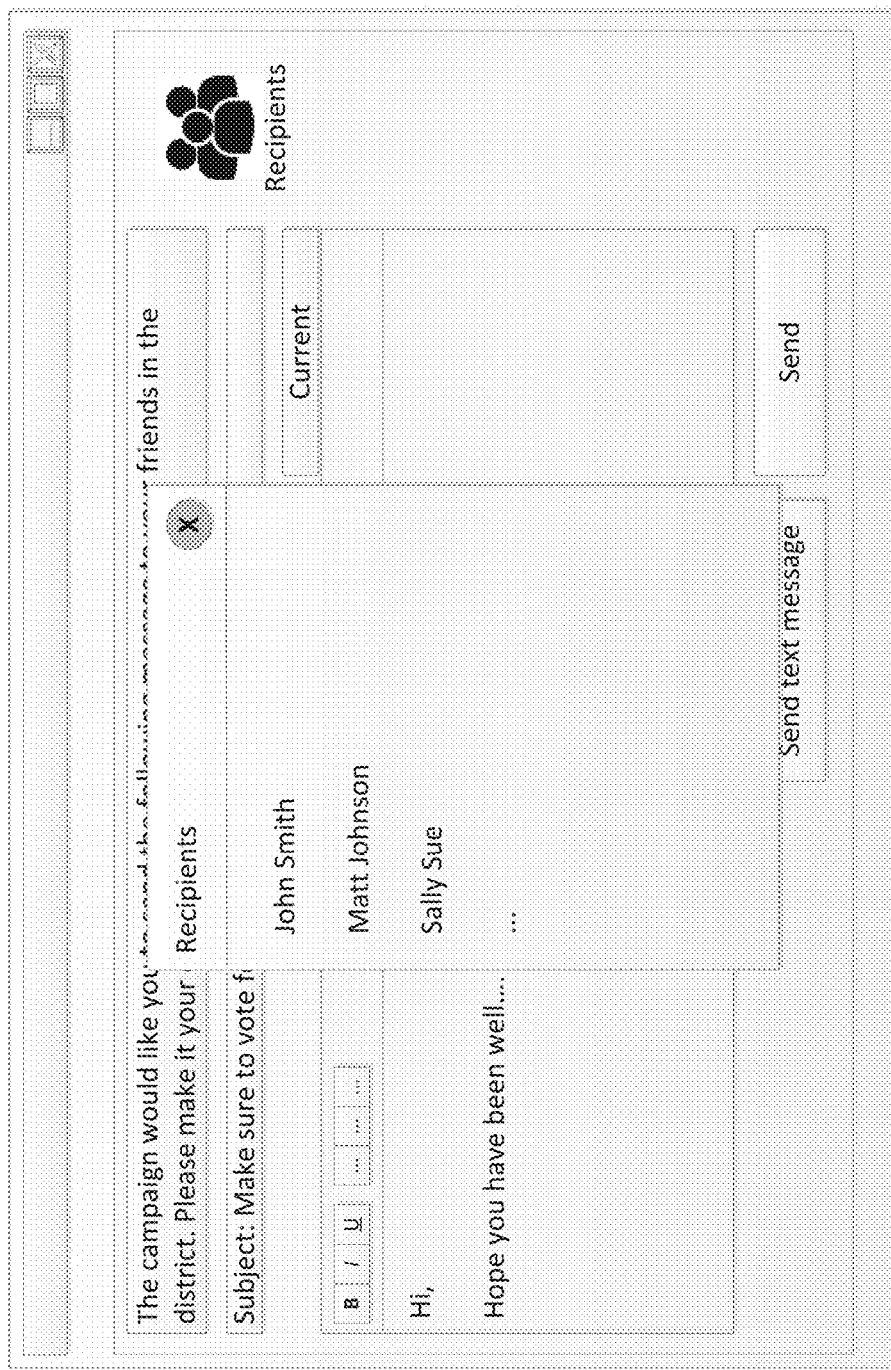

FIG. 23 is an example user interface in one embodiment of the system.

In particular, FIG. 23 illustrates a user interface, such as the one provided in FIG. 22, after the user has selected the option to view the recipient list.

As shown in the figure, the recipient list contains the names "John Smith", "Matt Johnson", and "Sally Sue". These are names of voters that are within the supporter's virtual precinct for the campaign, and they are individuals that the supporter knows the contact information for. The contact information for these individuals is stored within an upgraded contact database for the supporter, which can be accessed by the supporter in order to retrieve their contact information. Once the supporter has viewed the recipient list and seen who will be receiving the messages, the supporter may choose to send the customized message to those recipients. The system may automatically retrieve their contact information from the upgraded contact database and send out the message to those recipients on the supporter's behalf.

TERMINOLOGY

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. And the inventions illustratively disclosed herein suitably may be practiced in the absence of any element which is not specifically disclosed herein. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A database computing system comprising a plurality of databases for facilitating transmission of campaign information between a campaign manager and a large plurality of voters via a campaign supporter who has an association with the voters for a given campaign, the system preventing access by the campaign manager to voter communication information for privacy purposes, the system comprising:
    a network interface that is coupled to the internet network for receiving and transmitting one or more packet flows among the components of the system;
    a population dataset comprising public information about the voters including at least the name of each voter for a given campaign;
    a plurality of contact datasets, wherein the supporter gives the system access to at least one of the plurality of contact datasets, wherein that contact dataset contains at least one contact comprising data items associated with at least one type of contact information;
    a plurality of campaign databases, at least one of the campaign databases corresponding to the campaign;
    a plurality of upgraded contact databases, at least one of the upgraded contact databases corresponding to the supporter;
    a large plurality of voter computing devices;
    a plurality of supporter computing devices, wherein at least one of the supporter computing devices is used by the supporter;
    a campaign manager computing device used by the campaign manager
    a database system server comprising at least one computer processor; and
    a computer readable storage medium storing program instructions configured for execution by the computer processor in order to cause the computing system to:
        receive, over the network, the contact dataset and a request from the supporter to match the contact in the contact set with the voters for the given campaign;
        access the contact dataset to retrieve the contact;
        determine a relationship between the supporter and the contact;
        receive, over the network, the population dataset;
        access the population dataset to retrieve the voters; and
        perform a matching process between the contact and the voters from the population dataset without human intervention, the matching process comprising:
            determining a set of contact information available in the contact, the set of contact information including the at least one type of contact information of the contact;
            comparing the set of contact information with the public information for the voters in the population dataset to determine a matching voter;
            upon determining a matching voter, determining the relationship between the contact and the matching voter;
        storing in the campaign database for that campaign matching voter information including the matching voter name; and
        assigning within the campaign database the matching voter to a virtual precinct corresponding to the supporter by appending to the stored voter information a supporter identification configured to identify the supporter, wherein the virtual precinct comprises a plurality of matched voters from the supporter's contact dataset, each matched voter within the virtual precinct having appended to it the supporter identification, the supporter identification comprising a virtual precinct association;
        store within the campaign database for that campaign and other campaigns matching voter information for other matched voters generated from contact datasets received from other supporters other than the supporter, wherein the other matched voters have virtual precinct associations other than the supporter's virtual precinct association;
        store in the upgraded contact database for the supporter the contact from the contact dataset including the at least one type of contact information;
        append to the stored contact in the upgraded contact database a campaign identification configured to identify the given campaign, the campaign identification comprising a virtual precinct association; and
        prevent access by the campaign manager to the stored contact in the upgraded contact database;
        allow access by the supporter to the campaign database, based on the supporter's virtual precinct association, only to the matching voter information of the supporter's matched voters;
        prevent access by the supporter to the other matched voters in the campaign database;
        receive a message template from the campaign manager and a request to send a message to at least some of the voters in the virtual precinct of the supporter, wherein the message is sent by the supporter or on behalf of the supporter and not by the campaign manager;
        generate a message recipient list using the campaign database and the upgraded contact database;
        transmit the message template and the message recipient list to the supporter; and
        transmit the message to the voters without human intervention or access by the campaign manager.

2. The system of claim 1, wherein the program instructions configured for execution by the computer processor further cause the computing system to:
    generate user interface data for displaying a user interface on the supporter computing device used by the supporter, wherein the user interface is configured to allow the supporter to verify the matching voter; and
    wherein determining the relationship between the contact and the matching voter involves checking that the supporter has verified the matching voter.

3. The system of claim 1, wherein the matching voter may be assigned to more than one virtual precinct, each virtual precinct corresponding to a single supporter.

4. The system of claim 3, wherein the matching voter may only be assigned to virtual precincts in which the corresponding supporter provided a contact used to determine the matching voter in the population dataset.

5. The system of claim 1, wherein the matching process is a real-time, automated matching process.

6. The system of claim 1, wherein the matching process is performed using one or more microservices.

7. The system of claim 1, wherein the program instructions configured for execution by the computer processor further cause the computing system to:
   send the contact to a persistent subrequest queue; and
   retrieve the contact from the persistent subrequest queue.

8. The system of claim 7, wherein the program instructions configured for execution by the computer processor further cause the computing system to:
   pre-process the contact retrieved from the persistent subrequest queue to modify the at least one type of contact information of the contact.

9. The system of claim 8, wherein the program instructions configured for execution by the computer processor further cause the computing system to:
   send the pre-processed contact to a pre-processed subrequest queue, wherein the pre-processed subrequest queue is distinct from the persistent subrequest queue; and
   retrieve the pre-processed contact from the pre-processed subrequest queue.

\* \* \* \* \*